(12) United States Patent
Sundararam

(10) Patent No.: US 9,286,035 B2
(45) Date of Patent: Mar. 15, 2016

(54) CODE REMEDIATION

(75) Inventor: Sudhir Hulikunte Sundararam, Bangalore (IN)

(73) Assignee: Infosys Limited, Bangalore (IN)

( * ) Notice: Subject to any disclaimer, the term of this patent is extended or adjusted under 35 U.S.C. 154(b) by 863 days.

(21) Appl. No.: 13/212,992

(22) Filed: Aug. 18, 2011

(65) Prior Publication Data

US 2013/0007701 A1    Jan. 3, 2013

(30) Foreign Application Priority Data

Jun. 30, 2011   (IN) .......................... 2217/CHE/2011

(51) Int. Cl.
*G06F 9/44* (2006.01)
*G06F 11/36* (2006.01)

(52) U.S. Cl.
CPC .............. *G06F 8/30* (2013.01); *G06F 11/3604* (2013.01)

(58) Field of Classification Search
None
See application file for complete search history.

(56) References Cited

U.S. PATENT DOCUMENTS

| | | | | |
|---|---|---|---|---|
| 4,553,205 A * | 11/1985 | Porchia | ........................ | 717/136 |
| 5,640,576 A * | 6/1997 | Kobayashi et al. | ................ | 704/9 |
| 5,898,872 A * | 4/1999 | Richley | ......................... | 717/121 |
| 5,905,894 A * | 5/1999 | De Bonet | ....................... | 717/146 |
| 6,071,317 A * | 6/2000 | Nagel | ........................... | 717/128 |
| 6,427,228 B1 * | 7/2002 | Wigger | .......................... | 717/111 |
| 6,611,846 B1 | 8/2003 | Stoodley | | |
| 7,426,474 B2 | 9/2008 | Schoenbaum et al. | | |
| 7,428,494 B2 | 9/2008 | Hasan et al. | | |
| 7,565,364 B1 * | 7/2009 | Darcy et al. | ............ | 707/999.101 |
| 7,617,078 B2 | 11/2009 | Rao et al. | | |
| 7,716,040 B2 | 5/2010 | Koll et al. | | |
| 7,725,330 B2 | 5/2010 | Rao et al. | | |
| 7,752,035 B2 | 7/2010 | Oon | | |
| 7,801,786 B2 | 9/2010 | Smith et al. | | |
| 8,265,952 B1 * | 9/2012 | Smith | ............................... | 705/2 |
| 8,407,066 B2 | 3/2013 | Gentry et al. | | |
| 8,407,071 B2 | 3/2013 | Lesswing et al. | | |
| 8,620,698 B2 | 12/2013 | Hu et al. | | |
| 2002/0007483 A1 * | 1/2002 | Lopez | .............................. | 717/3 |
| 2004/0194072 A1 * | 9/2004 | Venter | ........................... | 717/140 |
| 2005/0223109 A1 | 10/2005 | Mamou et al. | | |

(Continued)

FOREIGN PATENT DOCUMENTS

EP    1939785    7/2008
JP    2003 050868    2/2003

OTHER PUBLICATIONS

Infosys, "Infosys Technologies Introduces iTransform Product Suite, One of Industry's First End-to-End Solution to Accelerate HIPPA 5010 and ICD-10 Transitions", Jun. 2009, retrieved from: http://web.archive.org/web/20100116134207/http://www.infosys.com/newsroom/press-releases/Pages/iTransform-ICD-10.aspx.*

(Continued)

*Primary Examiner* — Jue Louie
(74) *Attorney, Agent, or Firm* — Klarquist Sparkman, LLP

(57) ABSTRACT

Various technologies related to code remediation are presented. Code to be remediated can be annotated with language-independent annotations. From the annotations, remediated code in a particular language can be generated. A wide variety of change types can be supported. Automatic or custom remediation can be achieved. Custom remediation can provide a user with control over the remediation process via helpful user interfaces. Considerable efficiency improvements can be realized without surrendering control of the remediation process.

18 Claims, 53 Drawing Sheets

(56) References Cited

U.S. PATENT DOCUMENTS

| | | | |
|---|---|---|---|
| 2006/0015856 A1* | 1/2006 | Lotter | 717/136 |
| 2006/0123017 A1* | 6/2006 | Berg et al. | 707/100 |
| 2006/0123384 A1* | 6/2006 | Nickell et al. | 717/100 |
| 2006/0149784 A1 | 7/2006 | Tholl et al. | |
| 2007/0044012 A1* | 2/2007 | Suver et al. | 715/513 |
| 2007/0055966 A1* | 3/2007 | Waddington et al. | 717/144 |
| 2008/0015896 A1 | 1/2008 | Reynolds | |
| 2008/0201166 A1 | 8/2008 | Warner et al. | |
| 2008/0275731 A1 | 11/2008 | Rao et al. | |
| 2008/0275737 A1 | 11/2008 | Gentry et al. | |
| 2009/0048877 A1 | 2/2009 | Binns et al. | |
| 2009/0125878 A1* | 5/2009 | Cullum et al. | 717/106 |
| 2009/0222799 A1* | 9/2009 | Stewart et al. | 717/143 |
| 2009/0259487 A1 | 10/2009 | Rao et al. | |
| 2010/0070301 A1 | 3/2010 | Tolan et al. | |
| 2010/0153915 A1* | 6/2010 | Schneider | 717/110 |
| 2010/0169263 A1 | 7/2010 | Korpman et al. | |
| 2010/0235197 A1 | 9/2010 | Dang | |
| 2010/0306135 A1 | 12/2010 | McCallum et al. | |
| 2010/0306218 A1 | 12/2010 | Bacon | |
| 2011/0112851 A1 | 5/2011 | Poley | |
| 2012/0303383 A1 | 11/2012 | Smith | |
| 2013/0006683 A1 | 1/2013 | Rao | |
| 2013/0007701 A1 | 1/2013 | Sundararam | |
| 2013/0035947 A1 | 2/2013 | Sundararam et al. | |
| 2013/0073301 A1 | 3/2013 | Rao et al. | |

OTHER PUBLICATIONS

"Testing Times: Ensuring a Successful HIPAA 5010 Implementation," Infosys View Point, Sep. 2010, 8 pages.
"HIPAA 4010 to 5010 and ICD-9 to ICD-10: more than just a conversion," http://blogs.datadirect.com/2009/03/hipaa-4010-to-5010-and-icd-9-to-icd-10.html visited Feb. 24, 2011, 1 page.
"'Step-Up Step-Down' Strategies for HIPAA 4010A1 to 5010 Migration," http://www.edifecs.com/downloads/Edifecs5010-StepUp-StepDown.pdf visited Feb. 24, 2011, 12 pages.
"Infosys iTransform: The Smoothest Road to ICD-10 Compliance for Payers," www.infosys.com, visited Feb. 24, 2011, 2 pages.
"Infosys iTransform: The Smoothest Road to ICD-10 Compliance for Providers," www.infosys.com, visited Feb. 24, 2011, 2 pages.
Bhuttar, "Reducing risks Maximizing Returns from HIPAA 5010 Transition," www.infosys.com, Sep. 2009, 8 pages.
"Infosys Technologies Introduces iTransform Product Suite, One of Industry's First End-To-End Solution to Simplify and Accelerate HIPAA 5010 and ICD-10 Transitions," www.infosys.com, visited Feb. 24, 2011, 1 page.
"ICD-10 Transition Services," www.infosys.com, visited Feb. 24, 2011, 1 page.
"Infosys Technologies Introduces iTransformTM Product Suite," Jun. 15, 2009, 2 pages.
iTransformTM ICD-10 Payout Simulator, Infosys Website, archived by Wayback Machine on May 10, 2011, 3 pages.
3M "3M Advanced Analyzer Software," May 27, 2011, 2 pages.
Infosys, www.infosys.com/offerings/products-and-platform/pages/index.aspx, Jun. 17, 2010, 3 pages.
Infosys, "Infosys selected by Blue Cross and Blue Shield Association (BCBSA) as Vendor for ICD-10 Transition," Jun. 13, 2011, 2 pages.
Industry Offerings, ICD-10 Transition Services, Infosys Technologies Limited, printed May 30, 2011, 1 page.
Definition of Diagnosis-related group, en.wikipedia.org/wiki/Diagnosis-related_group, printed Jun. 29, 2011, 4 pages.
Anderson, "Top 10 sectors that will benefit from health insurance exchanges," Healthcare Payer News.com, Jul. 12, 2011, 2 pages.
Bhuttar, "Crosswalk Options for Legacy Systems: Implementing Near-Term Tactical Solutions for ICD-10," Journal of AHIMA 82(6): pp. 34-37, Jun. 1, 2011, 6 pages.
"Case Study: HIPAA 5010 Impact Analysis for a California-based Medicaid and Medicare Plan," Infosys, Nov. 2009, 4 pages.
De, "Financial Neutrality: Address it before the calendar turns '2013'," ICD-10 Hub Blog, May 23, 2011, 3 pages.
De, "Payment reform with ICD-10: It's the research time . . . " ICD-10 Hub Blog, Jun. 28, 2011, 2 pages.
"Engaging with digital consumers: Insights from Infosys survey," Infosys.com, Jun. 13, 2011, 2 pages.
"Infosys Technologies Introduces iTransform™ Product Suite, One," Bloomberg Business Wire, Jun. 15, 2009, 3 pages.
"Infosys Technologies Introduces iTransform Suite," CXOtoday.com, Jun. 15, 2009, 2 pages.
Lawrence, "Getting Up to Code," Healthcare Informatics.com, Oct. 27, 2008, 3 pages.
Mitchell, "The Connection Between ICD-10 and Meaningful Use," for the Record Mag.com, vol. 22, No. 22, p. 20, Dec. 6, 2010, 3 pages.
Yin, "Guest Commentary: The pros and cons of transitioning to ICD-10 via a tactical approach," FierceHealthPayer.com, Sep. 24, 2010, 4 pages.
"Infosys iTransform™ Mapping+: A bridge to tomorrow," Infosys Technologies Limited, Oct. 2011, 2 pages.
"Infosys iTransform™ ICD-10 Reimbursement Simulator: Achieving revenue neutrality," *Infosys Technologies Limited*, Oct. 2011, 2 pages.
"Infosys iTransform™ ICD-10 Payout Simulator: Achieving revenue neutrality," Infosys Technologies Limited, Oct. 2011, 2 pages.
"iTRANSFORM®: 'The 3-dimensional transition to ICD10,'" *Infosys Technologies Limited*, Mar. 2009, 6 pages.
"Infosys iTransform™ ICD-10 Coding Helper: Helping you adjusting to a vast new world," Infosys Technologies Limited, Oct. 2011, 2 pages.
"Infosys introduces iTransform," CiOL.com, Jun. 15, 2009, 3 pages.

\* cited by examiner

05 ASTR_N3_ID PIC X (30) BB0B23X 88 A1-ADDENDA VALUE ....
2700
| IMPACTED VARIABLE | FILE NAME | CHANGE TYPE |
|---|---|---|
| ASTR_N3_ID | CBL19089 | SIZE_CHANGE |
2710
| IMPACTED VARIABLE | FILE NAME | NEW FILE NAME | CHANGE TYPE |
|---|---|---|---|
| ASTR_N3_ID | D:\SRC\CBL19089.CBL | D:\DEST\CBL19089.CBL | SIZE_CHANGE |
2730
FIG. 27

| IMPACTED VARIABLE | FILE NAME | ANNOTATION APPLIED |
|---|---|---|
| ASTR_N3_ID | D:\DEST\CBL19089.CBL | ITREM { <br>   CHANGE { <br>     TOKEN : ASTR_N3_ID; <br>     ASTR_N3_ID.PARAMETER : CHANGE_TYPE; <br>     CHANGE_TYPE.VALUE : 1001; <br>     ASTR_N3_ID.PARAMETER : STMT_TYPE; <br>     STMT_TYPE.VALUE : 2001; <br>     ASTR_N3_ID.PARAMETER : IMPACT_LINE; <br>     IMPACT_LINE.VALUE:161; <br>     ASTR_N3_ID.VARIABLE : NEWSIZE; <br>     NEWSIZE.VALUE : 60; <br>     SIZECHANGE(NEWSIZE,IMPACT_LINE); <br>   } <br> } |

| ANNOTATION APPLIED | ANALYZER OUTPUT |
|---|---|
| ITREM{<br><br>CHANGE{<br><br>TOKEN: ASTR_N3_ID;<br><br>ASTR_N3_ID.PARAMETER: CHANGE_TYPE;<br><br>CHANGE_TYPE.VALUE: 1001;<br><br>ASTR_N3_ID.PARAMETER: STMT_TYPE;<br><br>STMT_TYPE.VALUE: 2001;<br><br>ASTR_N3_ID.PARAMETER: IMPACT_LINE;<br><br>IMPACT_LINE.VALUE: 161;<br><br>ASTR_N3_ID.VARIABLE: NEWSIZE;<br><br>NEWSIZE.VALUE: 60;<br><br>SIZECHANGE(NEWSIZE,IMPACT_LINE);<br><br>}<br><br>} | parentnormaltext : normaltext+ ;<br><br>normaltext : plaintext (annotation \| plaintext)* ;<br><br>annotation : ITREM '{' change+ '}' -> ^( ITREM change+ ) ;<br><br>change : CHANGE '{' block+ '}' -> ^( CHANGE block+ );<br><br>block : blockdtls WS? changetype -> ^(':' changetype blockdtls)<br><br>;<br><br>blockdtls<br><br>    : tokendef WS? paramdef+ ->^(':' tokendef paramdef+)<br><br>;<br><br>tokendef: name ':' assignedValue ';' -> ^(':' name assignedValue)<br><br>;<br><br>paramdef<br><br>    :name ':' parameterValue ';' name ':' assignedValue ';' -> ^(':' parameterValue assignedValue )<br><br>;<br><br>variabledef: newsize ':' assignedValue ';' -> ^(':' name assignedValue)<br><br>;<br><br>sizechange<br><br>    :name WS? '(' WS? text ',' text ')' ';' -> ^( name text text )<br><br>; |

| ANNOTATION APPLIED | ANALYZER OUTPUT | COMPILER OUTPUT |
|---|---|---|
| ITREM{<br><br>CHANGE {<br><br>TOKEN : ASTR_N3_ID;<br><br>ASTR_N3_ID.PARAMETER : CHANGE_TYPE;<br><br>CHANGE_TYPE.VALUE : 1001;<br><br>ASTR_N3_ID.PARAMETER : STMT_TYPE;<br><br>STMT_TYPE.VALUE : 2001;<br><br>ASTR_N3_ID.PARAMETER : IMPACT_LINE;<br><br>IMPACT_LINE.VALUE:161;<br><br>ASTR_N3_ID.VARIABLE : NEWSIZE;<br><br>NEWSIZE.VALUE : 60;<br><br>SIZECHANGE(NEWSIZE,IMPACT_LINE);<br>}<br>} | parentnormaltext : normaltext+ ;<br><br>normaltext : plaintext (annotation \| plaintext)* ;<br><br>annotation : ITREM '{' change+ '}' -> ^( ITREM change+ ) ;<br><br>change : CHANGE '{' block+ '}' -> ^( CHANGE block+ );<br><br>block : blockdtls WS? changetype -> ^(':' changetype blockdtls)<br><br>;<br><br>blockdtls<br><br>    : tokendef WS?<br>paramdef+ ->^(':' tokendef paramdef+)<br><br>;<br><br>tokendef: name ':' assignedValue ';' -> ^(':' name assignedValue)<br><br>;<br><br>paramdef<br><br>    :name ':'<br>parameterValue ';' name ':'<br>assignedValue ';' -> ^(':'<br>parameterValue assignedValue )<br><br>;<br><br>variabledef: newsize ':'<br>assignedValue ';' -> ^(':' name<br>assignedValue)<br><br>; ... | 05 ASTR_N3_ID<br>PIC X (60)<br>BB0B23X 88 A1-<br>ADDENDA<br>VALUE.... |

| OLD source code | REMEDIATED source code |
|---|---|
| 05 ASTR_N3_ID PIC X (30) BB0B23X 88 A1-ADDENDA VALUE .... | 05 ASTR_N3_ID PIC X (60) BB0B23X 88 A1-ADDENDA VALUE .... |

3100

```
public String identifyQualifier(String strCodeQualifier) {
    if (strCodeQualifier.equals("21")) {
        return "HIN";
    } else if(strCodeQualifier.equals("AD")) {
        return "BCBSAPC";
    } else if(strCodeQualifier.equals("FI")) {
        return "FT Identification Number";
    } else if(strCodeQualifier.equals("NI")) {
        return "NAIC Identification";
    } else if(strCodeQualifier.equals("PI")) {
        return "PayorIdentification";
    } else if(strCodeQualifier.equals("PP")) {
        return "PP Number";
    } else if(strCodeQualifier.equals("XV")) {
        return "HCFA National Plan Id";
    }
    return "UNKNOWN";
}
```

| IMPACTED VARIABLE | FILE NAME | CHANGE TYPE |
|---|---|---|
| strCodeQualifier | L2100REQ.JAVA | CODE_CHANGE |
| IMPACTED METHOD | | |
| public String identifyQualifier(String strCodeQualifier) | | |
3300
| IMPACTED VARIABLE | FILE NAME | NEW FILE NAME | CHANGE TYPE |
|---|---|---|---|
| strCodeQualifier | D:\SRC\L2100REQ.JAVA | D:\DEST\L2100REQ.JAVA | CODE_CHANGE |
3310
FIG. 33

| IMPACTED VARIABLE | FILE NAME | ANNOTATION APPLIED |
|---|---|---|
| strCodeQualifier | D:\SRC\ L2100REQ.JAVA | iTREM { <br><br> CHANGE { <br><br> TOKEN : strCodeQualifier; <br><br> strCodeQualifier.PARAMETER : CHANGE_TYPE; <br><br> CHANGE_TYPE.VALUE : 1009; <br><br> strCodeQualifier.PARAMETER : STMT_TYPE; <br><br> STMT_TYPE.VALUE : 2003; <br><br> strCodeQualifier.PARAMETER : IMPACT_LINE_LST; <br><br> IMPACT_LINE_LST.VALUE : 28,29,31,33,35,37,39,41; <br><br> strCodeQualifier.VARIABLE : CD_CHG_TYPE; <br><br> CD_CHG_TYPE.VALUE : DELETE; <br><br> strCodeQualifier.VARIABLE : CD_LST; <br><br> CD_LST.VALUE : 21,AD,FI,NI,PP; <br><br> CODECHANGE(IMPACT_LINE_LST, CD_CHG_TYPE, CD_LST); <br><br> } <br><br> } |

```
public String identifyQualifier(String strCodeQualifier) { if(strCodeQualifier.equals("PI")) {
            return "PayorIdentification";

} else if(strCodeQualifier.equals("XV")) {
            return "HCFA National Plan Id";
        }
        return "UNKNOWN";
    }
```

3600

```
public String identifyQualifier(String
strCodeQualifier) {
if (strCodeQualifier.equals("21")) {
return "HIN";
} else if(strCodeQualifier.equals("AD")) {
return "BCBSAPC";
} else if(strCodeQualifier.equals("FI")) {
return "FT Identification Number";
} else if(strCodeQualifier.equals("NI")) {
return "NAIC Identification";
} else if(strCodeQualifier.equals("PI")) {
return "PayorIdentification";
} else if(strCodeQualifier.equals("PP")) {
return "PP Number";
} else if(strCodeQualifier.equals("XV")) {
return "HCFA National Plan Id";
}
return "UNKNOWN";
}
```
3700

```
public String identifyQualifier(String
strCodeQualifier) { if(strCodeQualifier.equals("PI")) {
return "PayorIdentification";
} else if(strCodeQualifier.equals("XV")) {
return "HCFA National Plan Id";
}
return "UNKNOWN";
}
```
3710

FIG. 37

Add New Function

Function Name: SIZE CHANGE

Function Variable Mapper

[Add New]

| Map Variable | Position | Action |
|---|---|---|
| SIZE | 1 | [Edit] [Delete] |
| IMPACTLINE | 2 | [Edit] [Delete] |

Preview

SIZECHANGE(SIZE,IMPACTLINE)

[Save Function]

FIG. 47

CODE REMEDIATION

CROSS REFERENCE TO RELATED APPLICATIONS

This application claims the benefit of Indian Application No. 2217/CHE/2011, filed in India on Jun. 30, 2011, which is incorporated herein by reference.

BACKGROUND

A recurring problem plaguing software systems is change. Software development typically proceeds with a certain set of requirements and specifications. Although programmers attempt to anticipate likely changes, it is impossible to accurately predict the future. Inevitably, changes in the outside world alter the requirements and specifications, rendering the software obsolete or useless.

A particularly challenging area is the healthcare industry. Modern healthcare legislation can specify protocols for communicating information within the healthcare industry. For example, Title II (Administrative Simplification provisions) of the Health Insurance Portability and Accountability Act (HIPAA), enacted by the U.S. Congress in 1996, requires the establishment of national standards for electronic healthcare transactions and national identifiers for providers, health insurance plans, and employers. After Jul. 1, 2005, most medical providers that file electronically were required to file their electronic claims using the HIPAA standards to be paid.

On Jan. 1, 2012, the newest version of HIPAA, version 5010, becomes effective, replacing version 4010. Among various changes, HIPAA 5010 allows for the larger field size of the International Classification of Diseases, 10th Revision, Clinical Modification (ICD-10-CM), provided by the Centers for Medicare and Medicaid Services (CMS) and the National Center for Health Statistics (NCHS), for medical coding and reporting in the United States. The ICD-10-CM is a morbidity classification for classifying diagnoses and reasons for visits in healthcare settings. The ICD-10-CM is based on the ICD-10, the statistical classification of disease published by the World Health Organization (WHO), which replaces ICD-9.

Inevitably, there will be further changes to HIPAA and similar legislation in the future.

SUMMARY

A variety of techniques can be used for code remediation.

A language-independent approach can be used during remediation to support a plurality of programming languages. For example, code to be remediated can be annotated with language-independent annotations.

Analysis can generate a pre-translation analysis tree, which can be used to translate the code into remediated code.

A wide variety of change types can be supported. So, the technologies can solve a wide variety of remediation scenarios.

Automatic remediation as well as custom remediation can be supported. Thus, users can take advantage of some of the technologies described herein without surrendering control of the remediation process.

Considerable efficiency improvements in the remediation process can be realized.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIGS. 27, 28, 29, 30, and 31 illustrate an exemplary execution of code remediation technologies.

FIGS. 32, 33, 34, 35, 36, and 37 illustrate another exemplary execution of code remediation technologies.

FIGS. 45, 46, 47, and 48 are screen shots of exemplary user interfaces for configuring annotation types.

DETAILED DESCRIPTION

Example 1

Exemplary Overview

The technologies described herein can be used for a variety of code remediation scenarios. The code remediation technologies can make use of language-independent annotations as described herein. Automatic and custom (e.g., preview) remediation can be supported. Adaptation of the technologies can provide an efficient technique for implementing code remediation in a variety of fields, including the healthcare field.

Example 2

Exemplary System Employing a Combination of the Technologies

Figure 1:
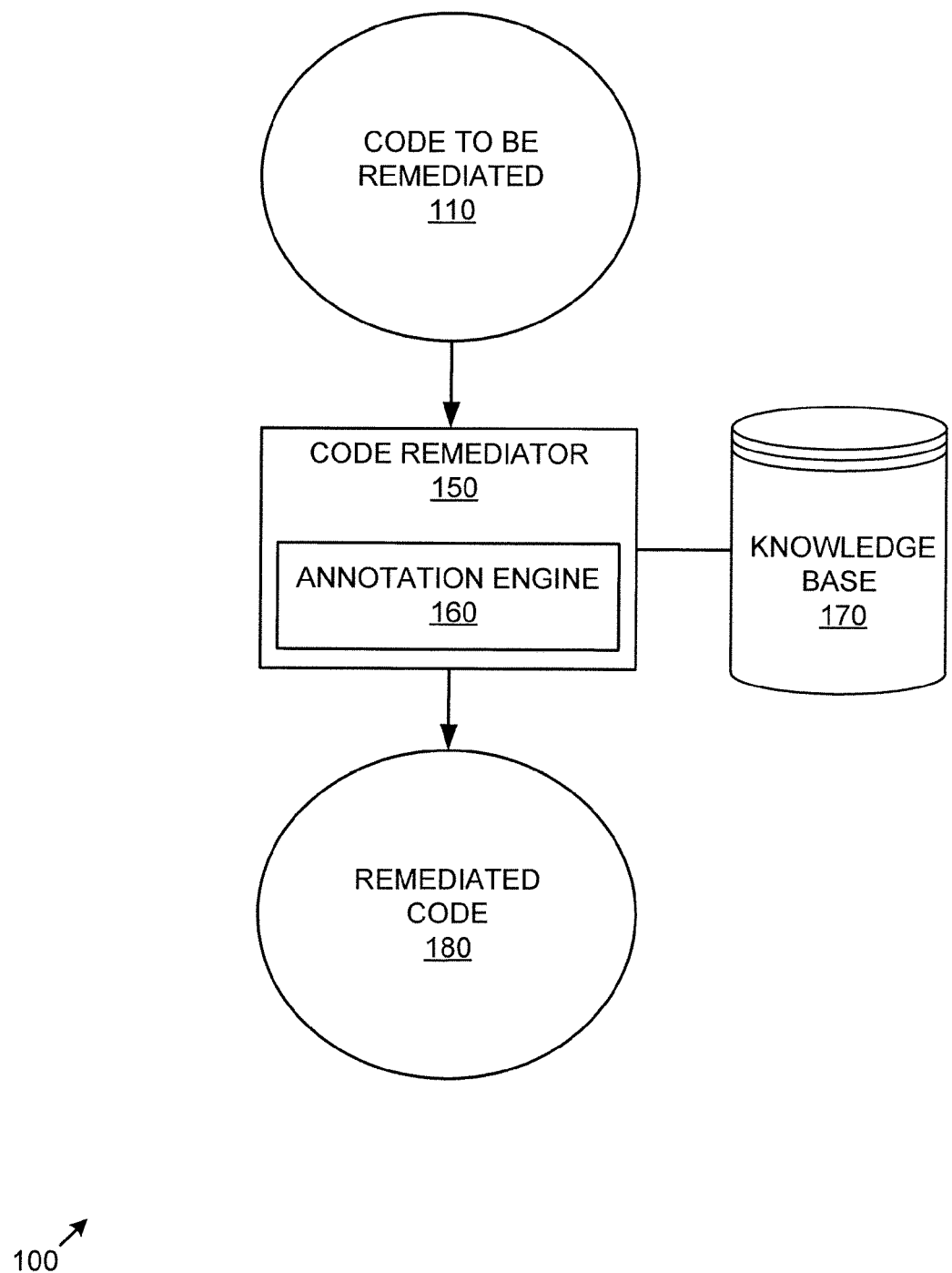
FIG. 1 is a block diagram of an exemplary system implementing the code remediation technologies described herein.

FIG. 1 is a block diagram of an exemplary system 100 implementing the code remediation technologies described herein. In the example, one or more computers in a computing environment implement a code remediator 150 that accepts as input code to be remediated 110.

The code remediator 150 can include an annotation engine 160 as described herein operable to generate annotations. The code remediator 150 is operable to generate remediated code 180 (e.g., via the knowledge base 170).

In practice, the systems shown herein, such as system 100 can be more complicated, with additional functionality, more complex remediations, and the like.

In any of the examples herein, the inputs, outputs, and knowledge base 170 can be stored in one or more computer-readable storage media.

Example 3

Exemplary Method of Applying a Combination of the Technologies

Figure 2:
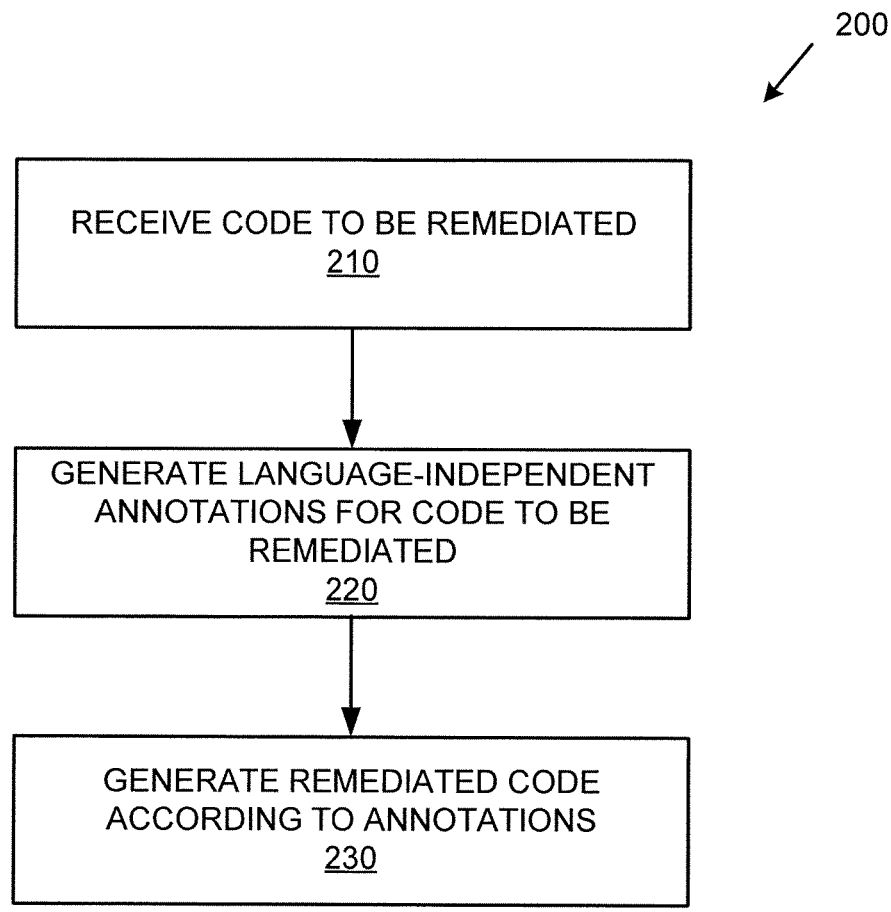
FIG. 2 is a flowchart of an exemplary method of implementing the code remediation technologies described herein.

FIG. 2 is a flowchart of an exemplary method 200 of implementing the code remediation technologies described herein and can be implemented, for example, in a system such as that shown in FIG. 1. The technologies described herein can be generic to the specifics of operating systems or hardware and can be applied in any variety of environments to take advantage of the described features.

At 210, code to be remediated can be received. Any of the examples of code described herein can be used and can include source code to be remediated in light of a regulation set affecting logic of the source code. The code can be in any of a variety of programming languages as described herein.

At 220, language-independent annotations are generated for the code to be remediated. The annotations can be in any of a variety of formats, including those described herein. Such annotations can be applied (e.g., inserted into) the code to be remediated (e.g., as comments).

At 230, a remediated version of the code is generated according to the language-independent annotations. Generation can include outputting lines of remediated source code in an appropriate (e.g., the same) programming language. Thus, at some point, the language of the code to be remediated can be identified. The remediated version compiles with the regulation set.

The method 200 and any of the methods described herein can be performed by computer-executable instructions stored in one or more computer-readable media (e.g., storage or other tangible media) or one or more computer-readable storage devices.

Example 4

Exemplary System Employing a Combination of the Technologies

Figure 3:
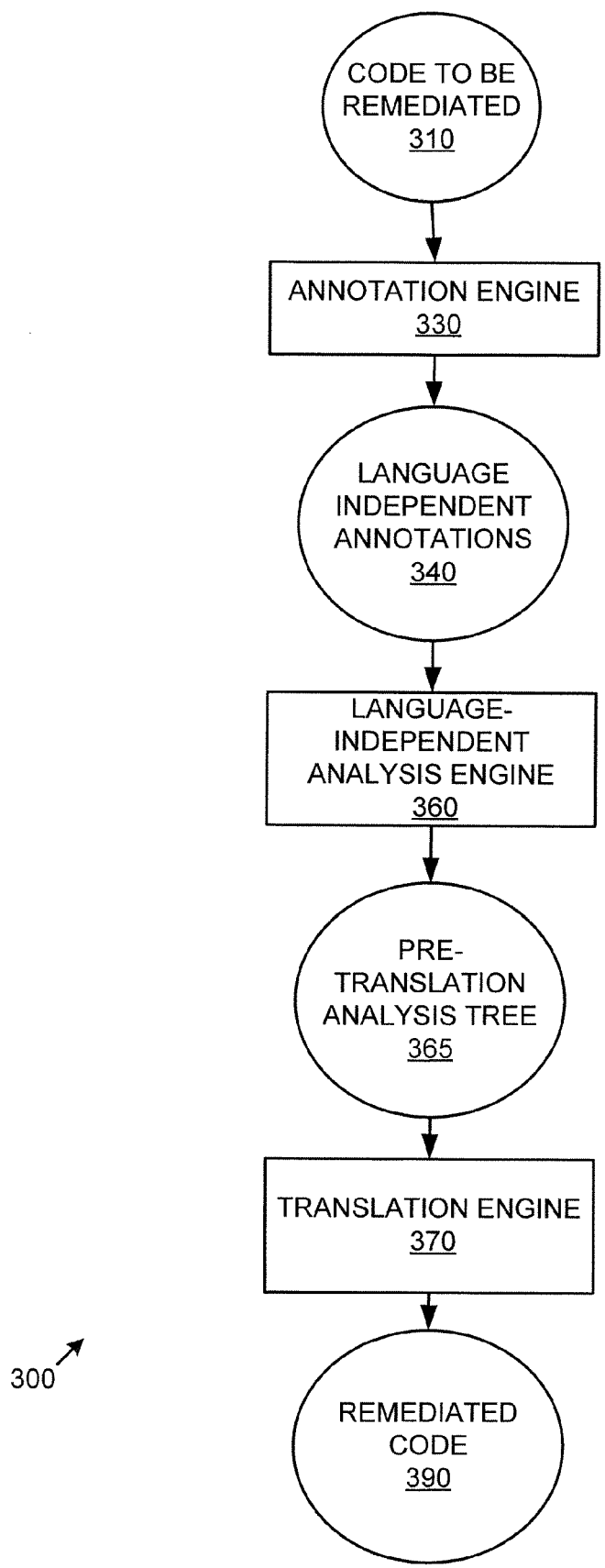
FIG. 3 is a block diagram of an exemplary system implementing the code remediation technologies described herein via an annotation engine and a translation engine.

FIG. 3 is a block diagram of an exemplary system 300 implementing the code remediation technologies described herein via an annotation engine and a translation engine. In the example, one or more computers in a computing environment implement an annotation engine 330 that accepts as input code to be remediated 310. Although not shown, a scanning engine and/or other software (e.g., impact analyzer) can also be included to handle pre-annotation tasks such as scanning through the code to find and/or process impact points, displaying the impact points for consideration by a user, and the like.

The annotation engine 330 provides language-independent annotations 340 to a language-independent analysis engine 360, which outputs a pre-translation analysis tree 365, which comprises an organized form of the annotation.

The translation engine 370 accepts the pre-translation analysis tree 365 as input and outputs remediated code 390.

Example 5

Exemplary Method of Applying a Combination of the Technologies

Figure 4:
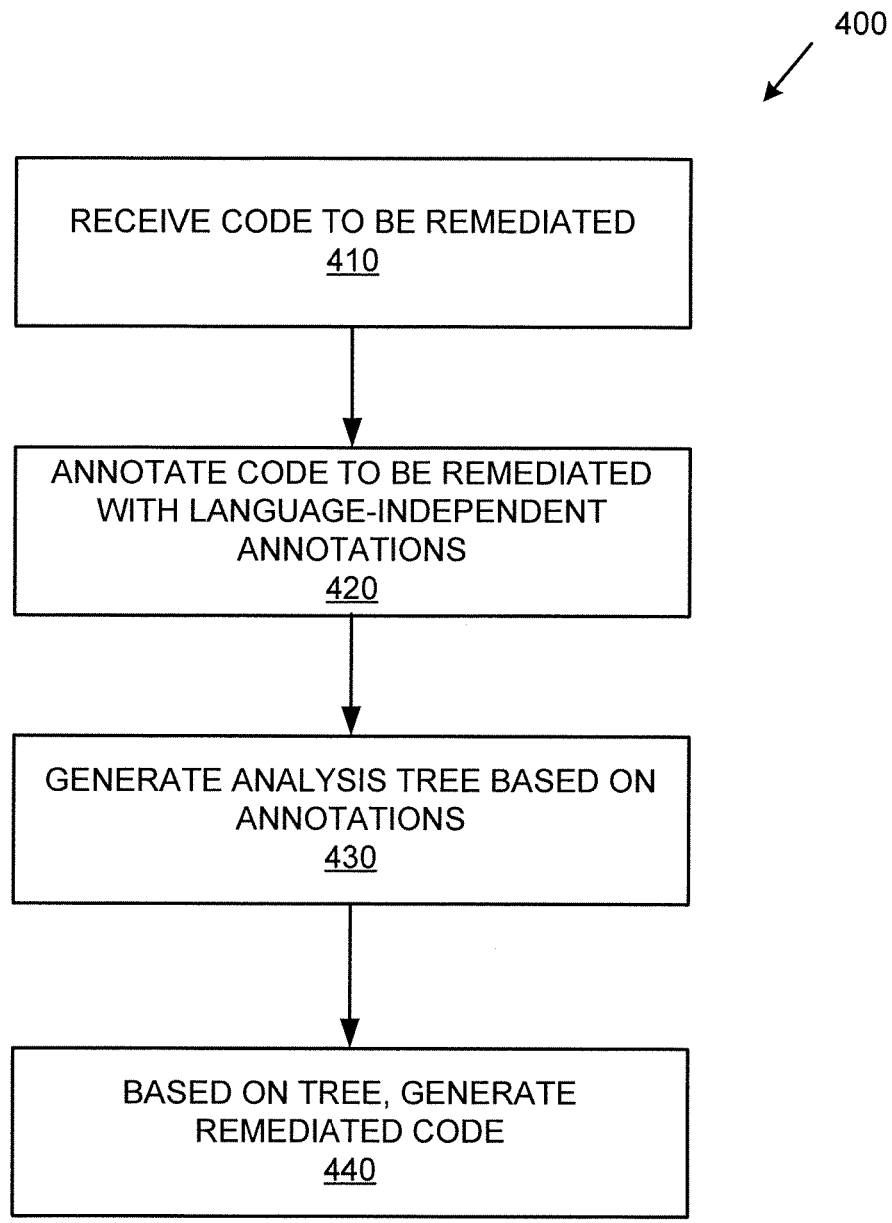
FIG. 4 is a flowchart of an exemplary method of implementing the code remediation technologies described herein via language-independent annotations.

FIG. 4 is a flowchart of an exemplary method 400 of implementing the code remediation technologies described herein via language-independent annotations and can be implemented, for example, in a system such as that shown in FIG. 3.

At 410, code to be remediated is received.

At 420, the code to be remediated is annotated with language-independent annotations.

At 430, a pre-translation analysis tree is generated based on the annotations.

At 440, based on the tree, remediated code is generated.

Example 6

Exemplary Technique of Remediating Code by Sections

Figure 5:
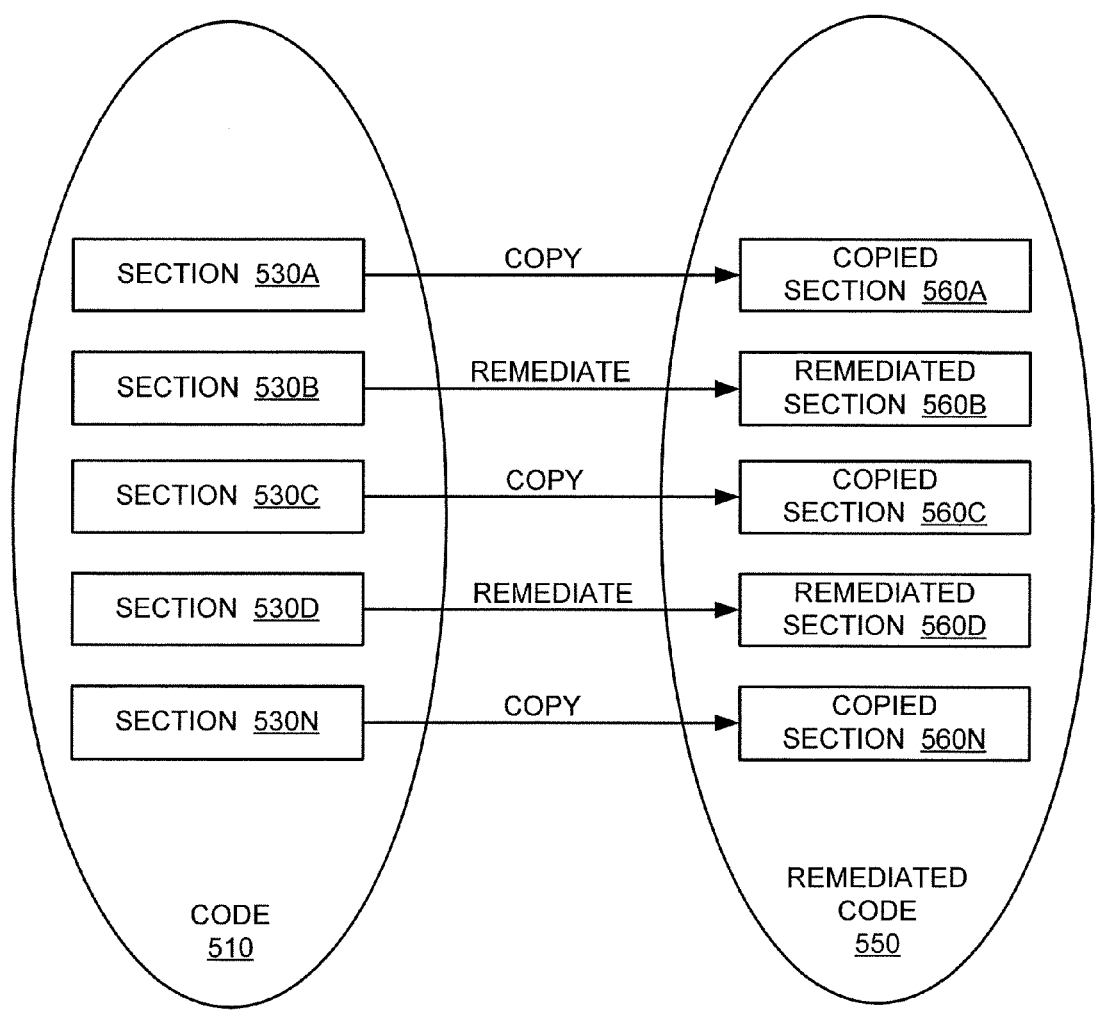
FIG. 5 is a block diagram of an exemplary technique of remediating code by sections.

FIG. 5 is a block diagram of an exemplary technique 500 of remediating code by sections and can be implemented in any of the examples herein. In the example, code to be remediated 510 is modified to generate remediated code 550. Any of the techniques described herein can be applied on a section-by-section basis.

The code to be remediated 510 can comprise a plurality of sections 530A-N. The sections can be copied or remediated to generate corresponding sections 560A-N in the remediated code 550.

In practice, a variety of methods can be implemented to implement the illustrated technique. For example, the sections can be copied from the code remediated 510 to the remediated code 550. Certain of the sections to be remediated can be annotated. Out of those, at least one of the annotated sections can be remediated. Annotations can subsequently be deleted to clean up the code.

Copies of the code to be remediated can be made before remediation to keep a record of the code as it was before remediation. If the remediation process does not proceed as desired, the process can be restarted by copying the original code to be remediated again.

The shown sections can be lines, statements, loops, or the like. Typically, the code is stored in files, but code can also be stored in a variety of other ways (e.g., in a database).

Example 7

Exemplary System Implementing Code Remediation Via Annotation Engine

Figure 6:
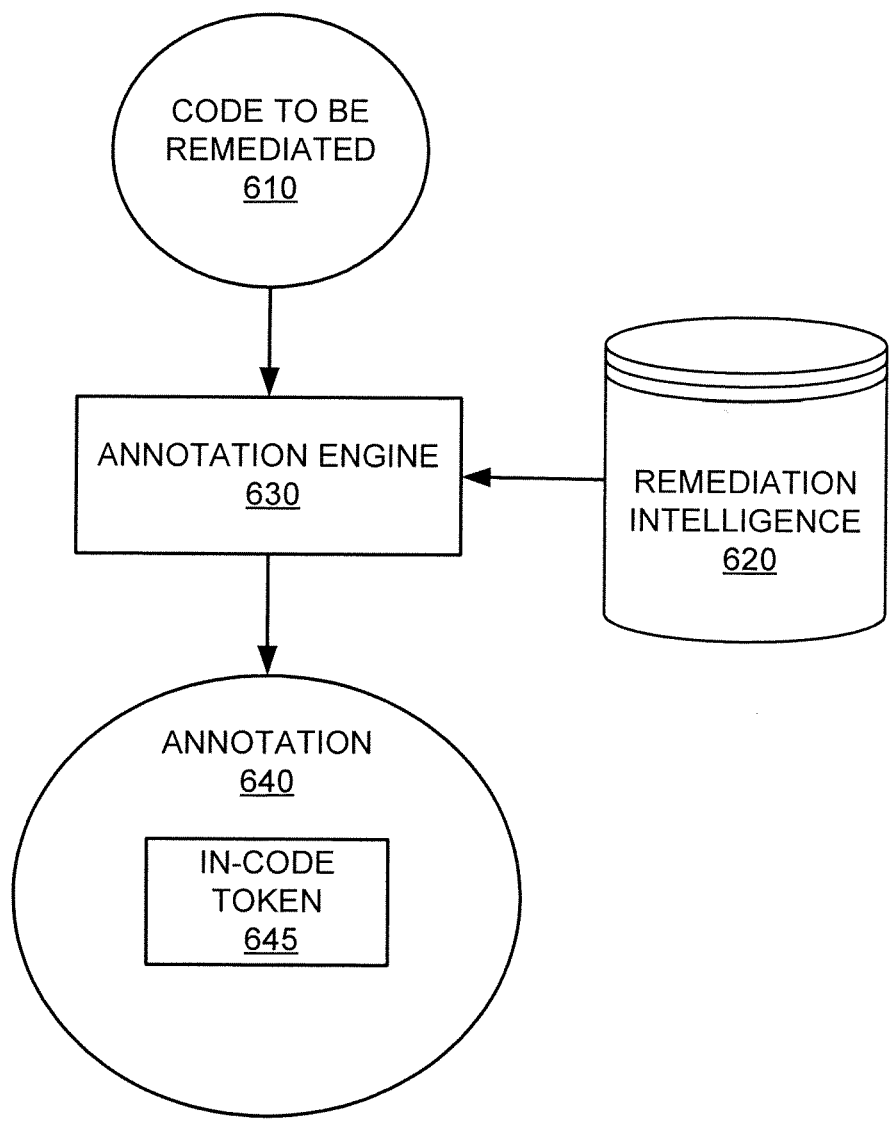
FIG. 6 is a block diagram of an exemplary system implementing the code remediation technologies described herein via an annotation engine.

FIG. 6 is a block diagram of an exemplary system 600 implementing the code remediation technologies described herein via an annotation engine. In the example, one or more computers in a computing environment implement an annotation engine 630 that accepts as input code to be remediated 610. The engine 630 can also make use of remediation intelligence 620 (e.g., token search patterns and the like). Input can also include a list of impact points generated outside the annotation engine. The engine 630 can output a language-independent annotation 640, which includes an in-code token 645 (e.g., an occurrence of a token search pattern in the code 610).

Functionality for finding occurrences of token search patterns and generating the annotations can be separated into different components of the system if desired.

Example 8

Exemplary Code

In any of the examples herein, the code processed by the technologies herein can be source code, XML, and the like. In practice, source code to be remediated can be used as input to a remediation tool, which outputs remediated source code. Remediation can be done in place on files, so the output source code is inserted into the remediated source code files.

An entire application can be remediated by remediating the source code files, support files, and the like. For example, an application for hospital claim processing under HIPAA 4010 can be remediated to be HIPAA 5010 compliant via the technologies described herein. Source code implementing electronic claim processing logical according to an old version of healthcare regulations can be remediated to comply with claim processing in light of a new version of healthcare regulations.

The remediation technologies described herein can be applied to the application as a whole by remediating files of the application, regardless of their language or if they are of different languages (e.g., a mix of languages).

As described herein, the code can be in any of a variety of programming languages (e.g., COBOL, JAVA, Visual C, PHP, XML, and the like). The annotations can be implemented as language-independent annotations for remediation.

Example 9

Exemplary Impact Points

In any of the examples herein, impact points can be tracked during code remediation. An impact point can be a location in code that is impacted by the new regulation set. Impact points can be represented as an indication of the code location and further details (e.g., an associated token that matched a token search pattern, a change type, a transaction set, loop, and the like). A reference to a place where the code can be retrieved can also be included.

Such impact points can be stored as impact point records that indicate a variable name or constant name affected by migration to the new regulation set and a location in the source code at which the name occurs. Such points can be generated responsive to finding an instance of a token search pattern.

Example 10

Exemplary Knowledge Base

In any of the examples herein, various information for use during code remediation can be stored in a knowledge base for use by a code remediation tool, which can be a web or standalone application.

Results of remediation analysis (e.g., impact points) can be stored in the knowledge base, or references to another repository (e.g., code analysis result repository, impact analysis repository, impact point repository, or the like) can be placed in the knowledge base that point to results of remediation analysis.

For example, if a token search pattern is used and impact analysis indicates that there are 20 lines of code with the token search pattern, those lines can be indicated as impact points and put into the code analysis result repository. Impact points can be represented in the remediation knowledge base with references to the repository.

Example 11

Exemplary Remediation Intelligence

In any of the examples herein, remediation intelligence can be stored (e.g., in a knowledge base) and relied upon during remediation.

Such intelligence can include token search patterns, change functions, rules for applying annotations, and the like. The intelligence can be arranged as stored data, executable functions, parameter-controlled actions, and the like.

The intelligence can comprise tables that hold conversion information between the old regulation set and the new regulation set. Changes can be categorized (e.g., as loops, segments, elements, and sub-elements).

Relationships between the impact points and the changes can also be stored. So, an indication of how the new regulation set impacts (e.g., what is the relationship between an impact and a loop) the code can be represented.

The remediation intelligence can indicate how to map elements (e.g., variable or constants) and values for such elements appearing in the code handling the old regulation set to elements and values for such elements to be included in code for the new regulation set. For example, in a migration from an old regulation set to a new regulation set, it may be known that a particular disease has a certain disease code under the old regulation set. For example, if the variable is admit disease and its value is chosen from old disease codes (e.g., AA, BB, CC), under the new regulation set, new disease codes may be involved. So, "AA" may map to "A1" due to migration from the old regulation set to the new regulation set. The remediation tool can identify and remediate such changes.

Example 12

Exemplary Remediation Intelligence Categories

In any of the examples herein, changes represented by remediation intelligence can be placed into categories (e.g., loops, segments, elements, and sub-elements). Loops can be the outer most parts of a claim transaction. For example, in the case of XML, the final enclosing tag defines a loop. Loops are typically related to overall information about a particular transaction.

Within a loop, there can be segments. Segments can carry individual information for each claim transaction type. For example, an 837 transaction (e.g., under HIPAA) between a payer and a provider is a particular transaction type. A loop will have information about hospital reimbursement, hospital type, and the like. Segments can drill down further and have information about the hospital (e.g., hospital ward, number of beds, etc.).

Within segments there can be elements. Elements can be implemented as key/value pairs. They can carry the individual data points and the data information. And, an element can have a sub-element.

A particular translation (e.g., under HIPAA) can be represented via such four categories, and the changes from one version of HIPAA to another can be so categorized. For example, if there is a change in a loop between HIPAA 4010 to HIPAA 5010, the remediation intelligence can represent such a change and indicate that it occurs at 837 I, for a particular loop, and the change is in a particular segment, and the element value was changed from one particular value to another particular value. So, the changes can thus be represented in the knowledge base as remediation intelligence.

Example 13

Exemplary Token Search Patterns

In any of the examples herein, token search patterns can specify a search pattern against which variables or constants in the source code are checked. An occurrence of the token search pattern in the source code (e.g., an in-code token) indicates an impact point. Such impact points can be found by the remediation tool or separate software. In addition to variable names and constant names, the token search pattern technologies can also be applied to numeric codes (e.g., disease codes), XML tags, and the like.

Token search patterns can be implemented as regular expressions. Matches to token search patterns can be found as any variable or constant in the code that contains the regular expression. In effect, wildcards can be placed at the beginning and end of the token search pattern to match any variables or constants that contain the token search pattern.

The token search pattern specifies a pattern that is configured to match variables or constants affected by migration to the new regulation set. For example, if regulations affect a constant such as "CLAIM_VERSION," token search patterns such as "CLM_VERS" "CLAIM_V" "CL\w_VER\w" and the like can be specified. Upon match, an impact point is identified, and an appropriate annotation can be generated as described herein.

Example 14

Exemplary Tokens

In any of the examples herein, a token can be an in-code occurrence of a token search pattern. To track impact points, they can be indexed by the token, which is typically a constant name or variable name appearing in source code. As described herein, tokens can also be numeric codes (e.g., disease codes), XML tags, and the like.

Example 15

Exemplary Remediation Techniques

In any of the examples herein, automatic or custom (e.g., manual, guided, or the like) remediation can be supported. In custom remediation, a remediation tool can give a user control over how and what impact points to remediate and allow the user to step in at different stages (e.g., scanning, annotation, analysis, translation, and the like). The tool can present an option to step in at different stages, see what is happening during the remediation process, and accept changes from the user (e.g., in the case remediation is not happening as desired, according to the user's knowledge). The tool can accept input from a user that specifies approval or rejection of proposed changes, impact points, and the like. Thus, a user can assert control over the remediation exercise.

In automatic remediation, the remediation intelligence decides how to remediate the code and just converts it into remediated code. The resulting files can be provided for browsing by a user. Similar stages can be involved, but without user input between the stages.

Example 16

Figure 7:
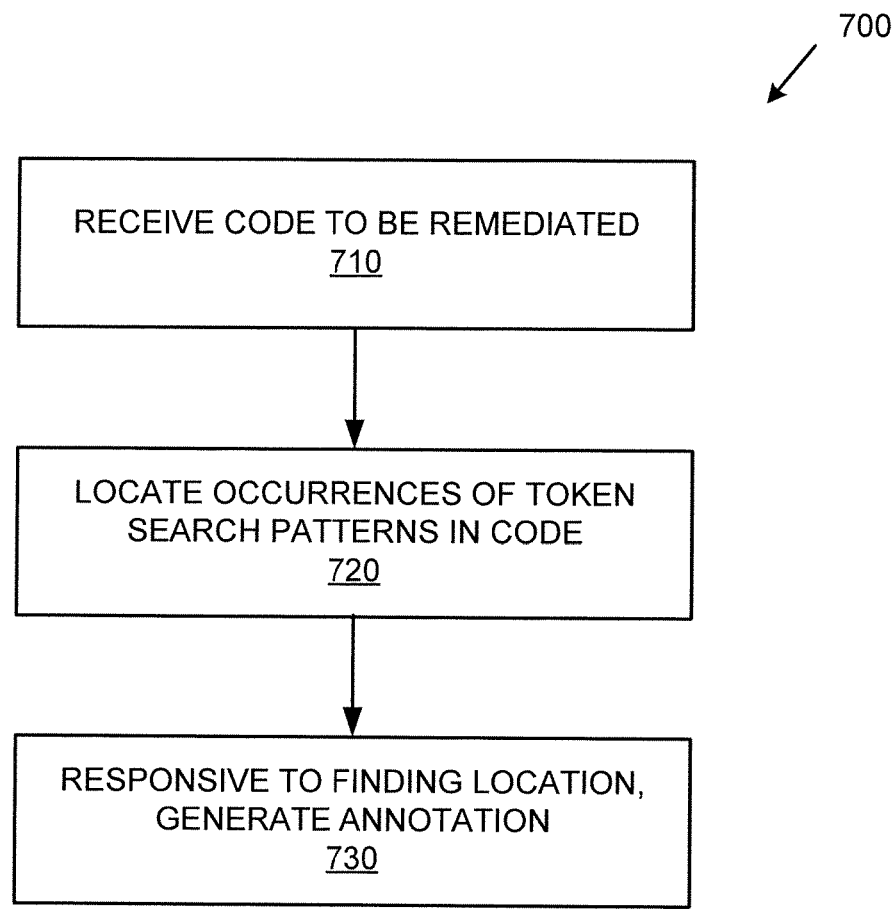
FIG. 7 is a flowchart of an exemplary method of implementing the code remediation technologies described herein via token search patterns.

Exemplary Method of Applying a Combination of the Technologies Via Token Search Patterns FIG. 7 is a flowchart of an exemplary method 700 of implementing the code remediation technologies described herein via token search patterns and can be implemented, for example, in a system such as that shown in FIG. 6.

At 710, code to be remediated is received. The technologies can support any of the exemplary code described herein.

At 720, locations of occurrences of token search patterns in the code are found. For example, the code can be searched for occurrences (e.g., instances) of token search patterns. Alternatively, other software can find such locations, and the annotation engine can navigate to such locations. Such patterns can indicate a variable name of constant name affected by migration to a new version of regulations.

At 730, responsive to finding such locations, a language-independent annotation is generated. The language-independent annotation can be based on remediation intelligence in a knowledge base, the contents of the code to be remediated, and the like. Generating an annotation can be accomplished by first generating an impact point record. The annotation can then be generated to indicate information in the impact point record. Filtering or other processing can be done on the impact point record to influence the remediation process.

Subsequently, a remediated version of the code can be generated as described herein. For example, parameters can be applied to change functions. The resulting remediated code can comply with the new version of regulations.

Example 17

Exemplary Language-Independent Annotations

Figure 8:
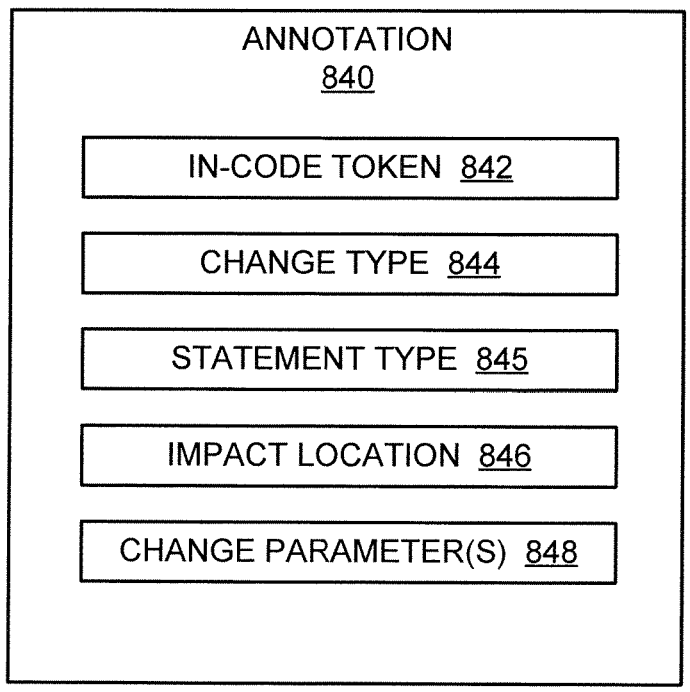
FIG. 8 is a block diagram of an exemplary language-independent annotation for code remediation.

FIG. 8 is a block diagram of an exemplary language-independent annotation 840 for code remediation and can be implemented in any of the examples herein. The annotation 840 can be associated with a section of the code (e.g., indicated by an impact point) to be remediated and used by the remediation tool to implement remediation of the code. In practice, the annotation indicates a modification to be made to the code so that the code is remediated according to the new regulation set.

Programming-language-independent annotations (or simply "language-independent" annotations) can be of a format that is independent of any programming language. The format has its own grammar that forms an executable language of its own. The executable language can include change functions and associated parameters that result in output of remediated code in a particular language according to the annotation.

The actual format of the annotations can be different from the format of the annotation 840 shown. For a given change type and impacted variable, the annotation applied can be the same irrespective of whether the source code having the impacted variable is in COBOL, JAVA, or the like. Thus, language-independence exhibits itself in that the content of the annotation can be the same for two programming languages having completely different syntax. For example, a change function name in an annotation can be the same and accomplish implementation of the same aspect of a new regulation set for two different languages, but when translated (e.g., by the change function particular to the programming language), the annotation will result in different source code. Although the annotation content is programming-language independent, the specifics of inserting the annotation may be particular to the programming language (e.g., using a comment syntax particular to the programming language).

The annotation 840 can include an in-code token 842. For example, the in-code token 842 can be a constant or variable name appearing in the code (e.g., at the impacted section) and corresponding to (e.g., found via) a token search pattern.

The annotation 840 can also include a change type 844 indicating the type of change to be implemented to achieve remediation of the code to be remediated. Alternatively, or in addition to the change type 844, a change function can be indicated (e.g., via name).

The annotation 840 can also include a statement type 845. For example, the statement type 845 can indicate the type of statement appearing at the affected section.

The annotation 840 can also include an impact location 846. For example, the impact location 846 can indicate a location (e.g., section, line number, or the like) at which the annotation is applied (e.g., at which the section to be remediated via the annotation appears in the code to be remediated).

The annotation 840 can also include one or more change parameters 848. The change parameters 848 can be used in conjunction with the change type 844 or a change function to achieve remediation. For example, if a change is to be made, the change parameters 848 can provide details, such as a new value (e.g., variable size), or the like.

Other information can be included to achieve remediation via the annotation.

Example 18

Exemplary Rules for Applying Annotations

In any of the examples herein, remediation intelligence can comprise rules for applying annotations. Based on token search patterns detected, a rule associated with the token search pattern can be invoked, and the rule specifies what annotation is to be applied.

A token search pattern name and token mapping to a change type (e.g., code change in 'Benefit Maintenance' transaction with respect to a Member Relation Code element) can be stored as Token Search Criteria.

Token Search Results can specify the impact location and impacted source code details (e.g., statement type, such as IF, FOR, Declaration, or the like; source code language, such as Java, Visual Basic, COBOL, or the like). The Token Search Criteria and the Token Search Results together can provide sufficient information to trigger rules in the knowledge base that specify what annotation is to be applied.

Example 19

Exemplary Change Types

The code remediation technologies can support a wide variety of change types. In addition to the size_change examples, other types such as the following can be implemented: code_added, code_deleted, element_added, element_deleted, loop_added, loop_deleted, name_changed, repeat_count_changed, segment_added, segment_deleted, subelement_added, subelement_deleted, usage_type_ changed.

Example 20

Exemplary Remediated Code

In any of the examples herein, the remediated version of code can be implemented as a version of the to-be-remediated version that has been remediated (e.g., the code has been changed to comply with a new regulation set).

Example 21

Exemplary System Implementing Code Remediation Via Analysis Engine

Figure 9:
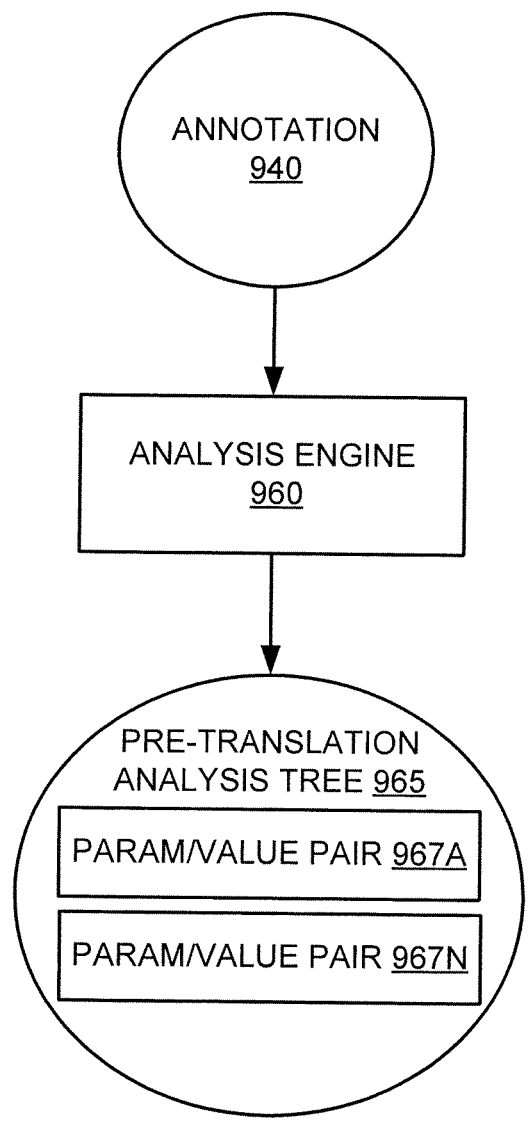
FIG. 9 is a block diagram of an exemplary analysis engine for implementing code remediation via an analysis tree.

FIG. 9 is a block diagram of an exemplary analysis engine 960 for implementing code remediation via an analysis tree. In the example, one or more computers in a computing environment implement an analysis engine 960 that accepts as input one or more annotations 940.

As shown in the example, analysis engine 960 can output a pre-translation analysis tree 965, which includes one or more parameter/value pairs 967A-N. As described herein, the parameter/value pairs can be used to generate remediated lines of code. For example, parameters to change functions can be implemented as such.

Example 22

Figure 10:
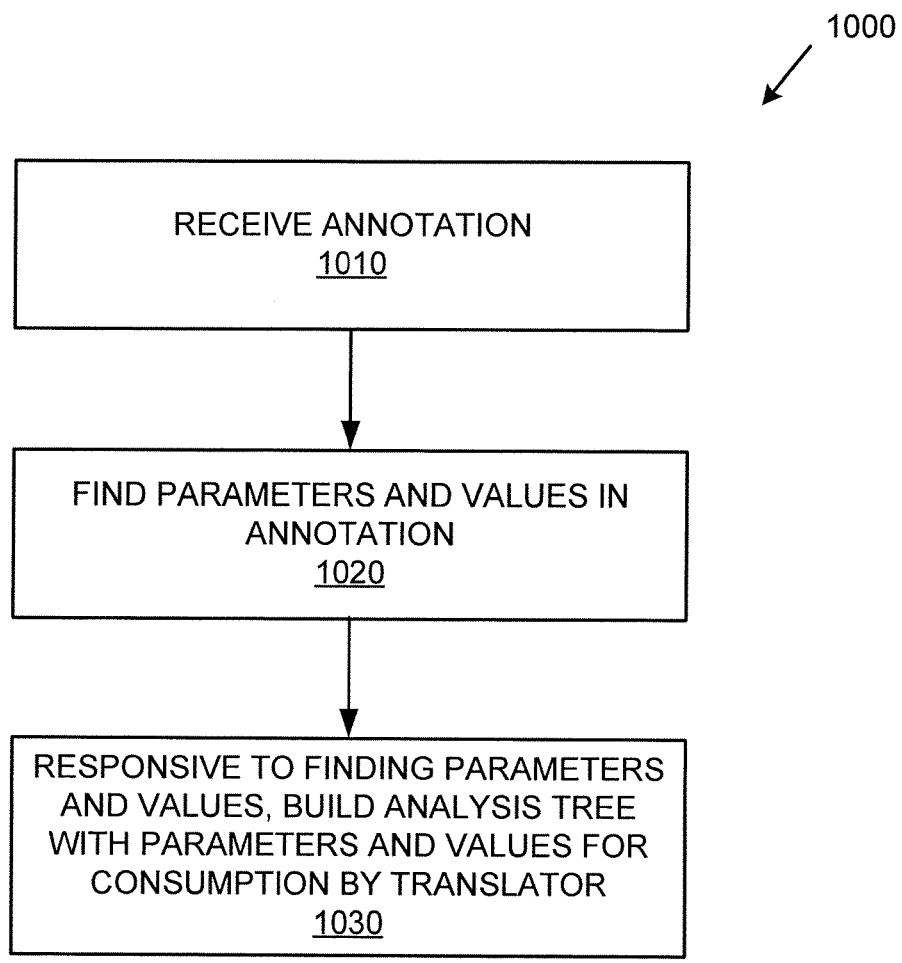
FIG. 10 is a flowchart of an exemplary method of implementing code remediation via an analysis tree.

Exemplary Method of Applying a Combination of the Technologies Via Analysis Tree FIG. 10 is a flowchart of an exemplary method 1000 of implementing the code remediation technologies described herein via an analysis tree and can be implemented, for example, in a system such as that shown in FIG. 9.

At 1010, a language-independent annotation is received.

At 1020, parameters and values are found in the annotation.

At 1030, responsive to finding the parameters and values in the annotation, an analysis tree is built with the parameters and values for consumption by a translator.

Example 23

Exemplary Analysis Tree

In any of the examples herein, an analysis tree can be arranged as a hierarchical data structure with nodes for consumption by the translator. Nodes can specify an associated token for an annotation, a change type for the annotation, a type of statement for the annotation, and parameters for use in change functions. For example, parameters such as line number, operations to be performed on the code, search strings, and the like can be arranged on the analysis tree.

The analysis tree can be arranged such that specific parameters are placed at the leaf nodes, and upper nodes specify additional parameters or functions to be performed. The language-specific change functions can consume the parameters and then apply the functions when navigating upward through the tree. In this way, a language-independent analysis tree can be efficiently converted into source code of a specific programming language.

The tree can serve as a stack onto which parameters are pushed and then consumed (e.g., popped) by the translator at a later time. The tree can establish relationships between commands (e.g., change functions) in the tree. The tree can also establish relationships between commands and associated parameters.

Example 24

Exemplary System Implementing Code Remediation Via Translation Engine

Figure 11:
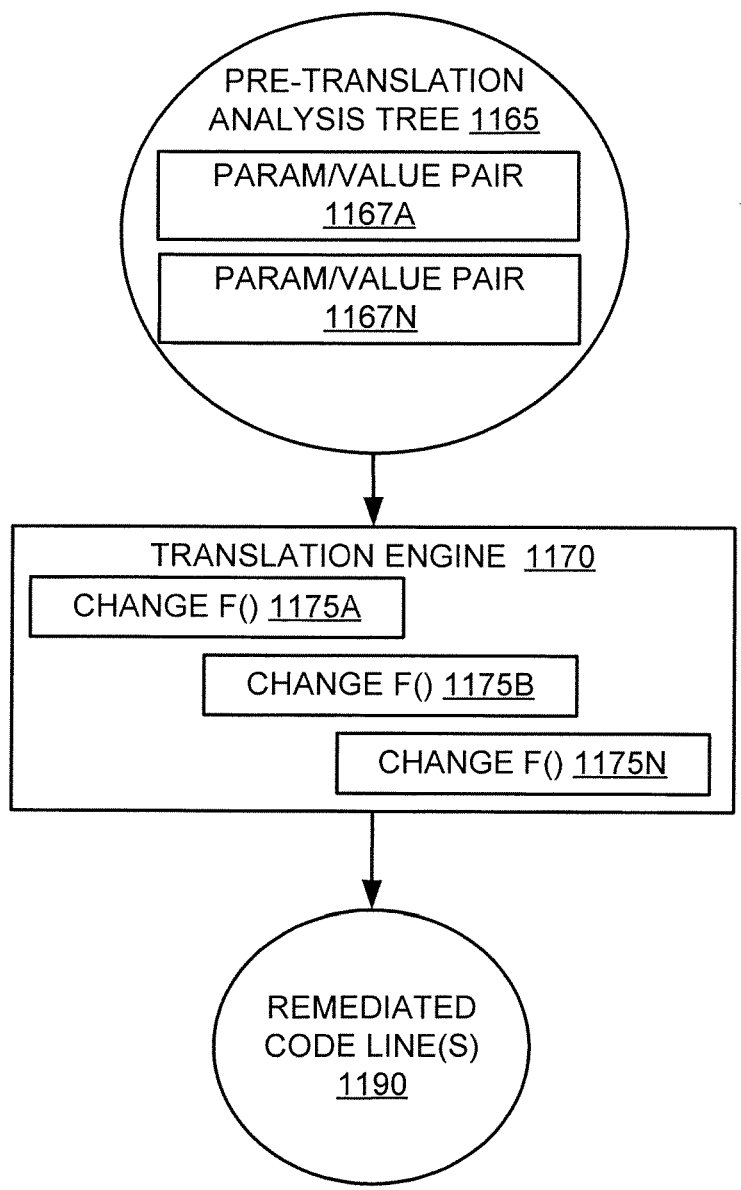
FIG. 11 is a block diagram of an exemplary system implementing code remediation via a translation engine with change functions.

FIG. 11 is a block diagram of an exemplary system 1100 implementing the code remediation technologies described herein via a translation engine 1170. In the example, one or more computers in a computing environment implement a translation engine 1170 that accepts as input a pre-translation analysis tree 1165. As shown, the tree 1165 can comprise one or more parameter/value pairs 1167A-N.

The translation engine 1170 can implement one or more change functions 1175A-N to achieve remediation. As described herein, the change functions 1175A-N can generate lines of remediated code (e.g., according to the parameter/values pairs 1167A-N in the tree 1165). In a remediator supporting different programming languages, there can be different change functions for the different languages, or the change function can determine which language is involved and function accordingly.

The output of the translation engine 1190 is one or remediated code lines, sections, or the like. Although the annotation and the pre-translation analysis tree can be language independent, the resulting code lines 1190 are of a particular programming language (e.g., that of the input source code).

Example 25

Figure 12:
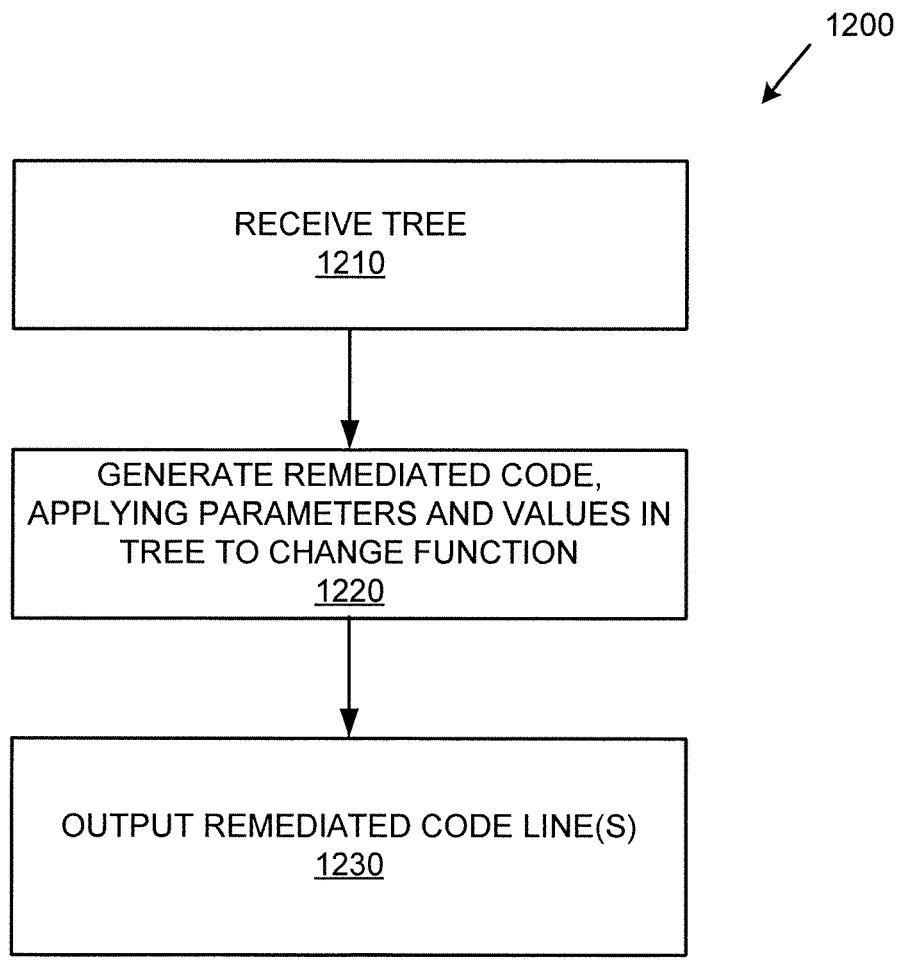
FIG. 12 is a flowchart of an exemplary method of generating remediated code via change functions.

Exemplary Method of Applying a Combination of the Technologies Via Change Functions FIG. 12 is a flowchart of an exemplary method 1200 of implementing translation described herein via change functions and can be implemented, for example, in a system such as that shown in FIG. 11.

At 1210, an analysis tree is received.

At 1220, remediated code is generated, applying parameters and values in the tree to a change function.

At 1230, remediated code lines are output. For example, the code lines can be placed in the program to be remediated to replace lines that are being remediated. The code lines are of the target programming language (e.g., the same programming language of the source code that was annotated). After translation, the file can be cleared up (e.g., the annotations deleted).

Example 26

Exemplary Change Functions

In any of the examples herein, change functions can perform the actions related to generating remediated source code. Such actions can include deleting code, adding code, and modifying code to be syntactically correct in the target programming language. Annotations can include reference to such change functions (e.g., by name).

For example, if a change function of type CODECHANGE for JAVA code is invoked based on an annotation, it can perform actions such as deleting lines of code. If a conditional statement (e.g., "if" block) is involved, the change function can also modify remaining lines to form a syntactically correct conditional statement in accordance with the JAVA syntax.

A change function can be specified by a language-independent change function name, such as "CODECHANGE." However, when invoked, the remediation tool will determine the appropriate change function logic to execute based on the target language. There can be different change function implementations of the same change function name for different languages.

Thus, generating the remediated version of source code can comprise generating source code according to the syntax of a particular programming language (e.g., the programming language of the code to be remediated) with a change function indicated by a language-independent change function name.

Example 27

Exemplary IT-Impacting Regulations

In any of the examples herein, code can be remediated to comply with IT-impacting regulations. Such regulations can include legislation, administrative rule-making, and the like, typically implemented on a national scale in such areas as healthcare. A regulation set can include one or more such regulations. Such regulations can be new regulations implementing a migration from an old regulation set to the new regulations.

Such regulations can impact various aspects of information technology, such as information collection, reporting requirements, communication format requirements, and the like. Compliance with such regulations is typically not voluntary, and failure to comply can result in strict penalties. Thus, such regulations can impact the logic of source code associated with processing information affected by the regulations.

An area in which regulation changes have become pressing is in the healthcare arena. Changes from HIPAA 4010 to HIPAA 5010 and changes from ICD 9 to ICD 10 are examples of new regulation sets that can require code remediation for compliance. Failure to comply can result in nonpayment of claims (e.g., claims for reimbursement by a healthcare provider, insurance company, and the like).

So, for example, the token search patterns described herein can indicate a variable name or constant name affected by claim processing migration to a new version of healthcare regulations. Similarly, impact points (e.g., in the form of an impact point record) can indicate a variable name or constant name affected by claim processing migration to a new version of healthcare regulations and a location in the source code at which the name occurs.

Language-independent annotations can indicate the variable name or constant name affected by claim processing migration to the new version of healthcare regulations, the location in the source code at which the name occurs, a change function, and one or more parameters associated with the change function.

Generating a remediated version of source code can comprise applying such parameters to the change function. The change function can generate source code in the appropriate programming language based on the source code to be remediated, and such generated source code can comply with claim processing in light of the new version of healthcare regulations according to the language-independent annotation.

Example 28

Exemplary Representations of Candidate Remediations

During a preview process that implements manual remediation, candidate or proposed remediations can be shown for consideration by a user. For example, candidate remediations can take the form of a list with a name of impacted variable/constant, a list of proposed code changes, a list of proposed new code, or the like. Individual candidate remediations can be specified (e.g., selected for further processing) via a user interface.

Indication (e.g., de-selection) that the candidate remediation is not be processed can be received. Not processing can comprise not annotating, not changing the code, and the like. Responsive to receiving an indication that the candidate remediation in not to be processed, further remediation processing for the candidate remediation can be omitted (e.g., halting remediation processing for the candidate remediation).

A user can be given an option to edit proposed code, proposed remediated code, and the like. Responsive to receiving a modification, the source code can be remediated according to the modification (e.g., immediately or in later stages of manual remediation).

Example 29

Exemplary Stages

Figure 13:
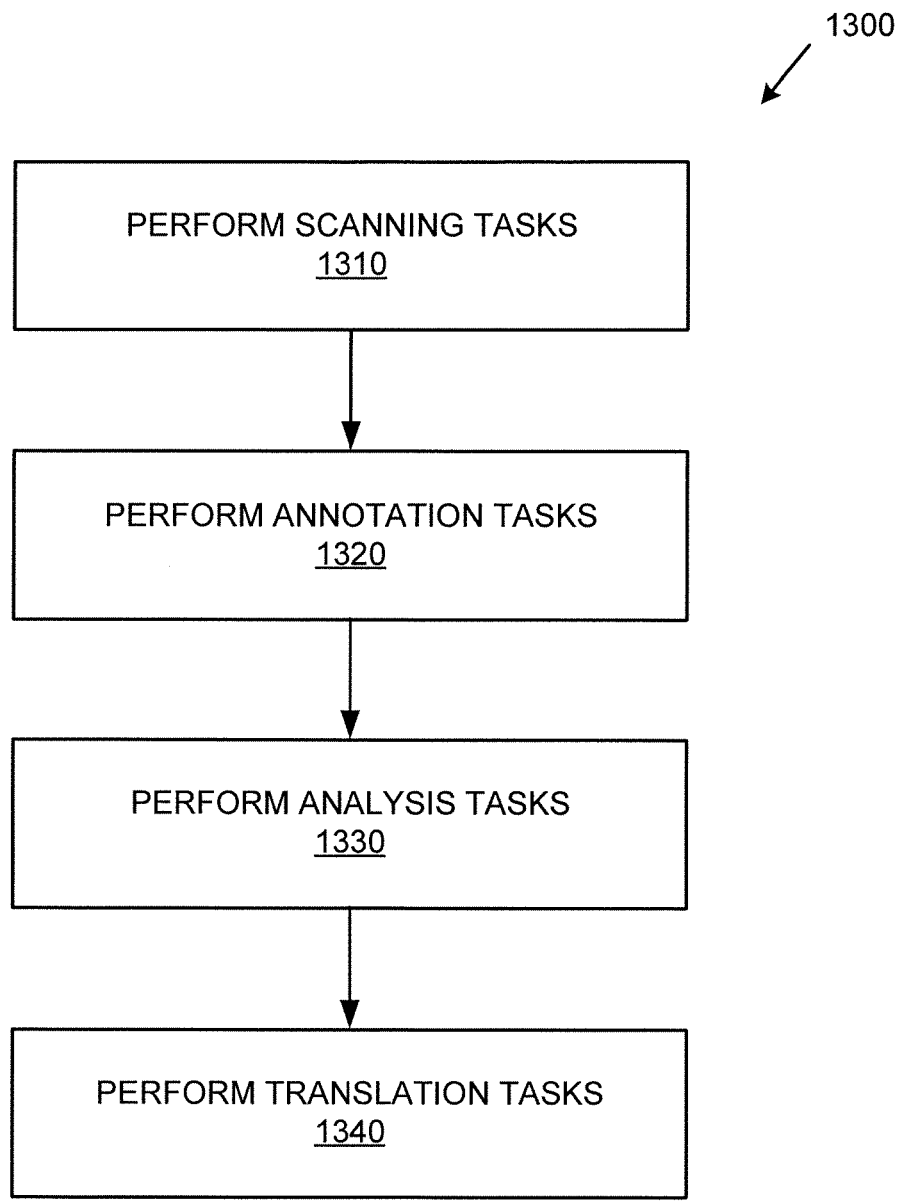
FIG. 13 is a flowchart of an exemplary method of implementing code remediation tasks in stages.

FIG. 13 is a flowchart of an exemplary method of implementing code remediation tasks in stages implemented by an exemplary remediation tool. Although four stages are shown, the functionality can be arranged in one or more stages in any number of other ways.

Some work can be performed (e.g., pre-scanning tasks) by another tool, or such work can be incorporated into the tool. Exemplary pre-scanning tasks can include identifying impact points and the like.

At 1310, scanning tasks are performed. Due to the number of tasks during scanning, the tasks can be implemented in the background. A copy of the actual source file (e.g., for remediation) can be created during scanning. Scanning can examine code to find exceptions and determine which impact points are to be annotated. In the case of custom remediation, a list of impact points can be presented for consideration and selection by a user as described herein. Such a list can be organized by type (e.g., conditional, loop construct, etc.).

At 1320, annotation tasks are performed. Language-independent annotations can be generated for the code. Although an implementation can have separate annotation, in the example, annotation comprises placing annotations into the code itself.

At 1330, analysis tasks are performed. Analysis can include analysis of the annotations and construction of an analysis tree.

At 1340, translation tasks are performed. Such tasks are sometimes called "compilation," although they need not involve conventional source code compilation. Instead, the annotations (e.g., as represented in the analysis tree) are translated into the specific programming language of the code. Actual remediated code is created (e.g., from annotation details) and is ready for inclusion into the remediation file (e.g., a copy of the source file).

The stages are helpful for design, illustration, and organizational purposes, but functionality can be rearranged into different stages without affecting the usefulness of the technologies.

Example 30

Exemplary User Interface

In any of the examples herein, various user interfaces can be presented to guide a user through the remediation process. Automation level can vary from automatic to custom (e.g., manual) remediation. Previewing can also be supported to implement custom remediation.

In the case of previewing, a user interface can be used to control scope of the remediation tasks. The tasks can be performed iteratively until remediation reaches a satisfactory level. For example, some token search patterns can be applied first, others later, and so forth.

During different stages of the remediation, user interfaces can be used to further control scope. For example, token search pattern matches can be listed, and the user interface can be used to receive an indication of which token search pattern matches should be selected for annotation. Only the selected token search pattern matches (e.g., impacted variables) are then annotated. A list of impact points can be presented, and remediation limited to those impact points that are selected via the user interface.

The user interface can present detected impact points of the source code to be remediated in a list comprising user interface elements for indicating respective of the impact points of the source code as to be omitted from further remediation processing. Further remediation processing is halted according to the user interface elements (e.g., if a user deselects an impact point).

At the tree building and translation stages, a list of annotations can be presented. Only the selected annotations will have a tree built and translated code (e.g., proposed remediated code) generated. A list of annotations can be presented, and translation limited to those annotations that are selected via the user interface.

Finally, a list of proposed remediated code lines can be presented, and remediation can be limited to those code lines that are selected via the user interface. Only the selected code will be remediated in the code to be remediated. At such a stage, the proposed remediated code can be manually edited if desired.

After the changes are implemented, a list of remediated files can be presented. Files in the list can be selected to open the file and see the remediation changes. A code browser can jump to remediated points (e.g., and highlight them) seriatim.

Progress for various impact points can be tracked separately. Thus, remediation can be performed in parts. Status of the impact points can be displayed to assist a user in determining whether further work need be performed. Remediation can be restarted if desired.

Example 31

Exemplary User Interface Implementation

FIGS. 14-26 are screenshots of exemplary user interfaces for an implementation of code remediation technologies and can be applied to any of the examples described herein. The examples can be applied to the ICD 9 to ICD 10 migration remediation, HIPAA 4010 to HIPAA 5010 migration remediation or other migration remediations. User interface functionality can be arranged into categories of setup, code analysis results, and remediated tokens (e.g., remediation progress).

As shown in the examples, the user interfaces can be implemented as web pages for display in a web browser. The user interfaces can be presented by a user interface orchestrator. Alternatively, remediation can be implemented by a stand alone tool.

Example 32

Exemplary User Interface: Setup

Figure 14:
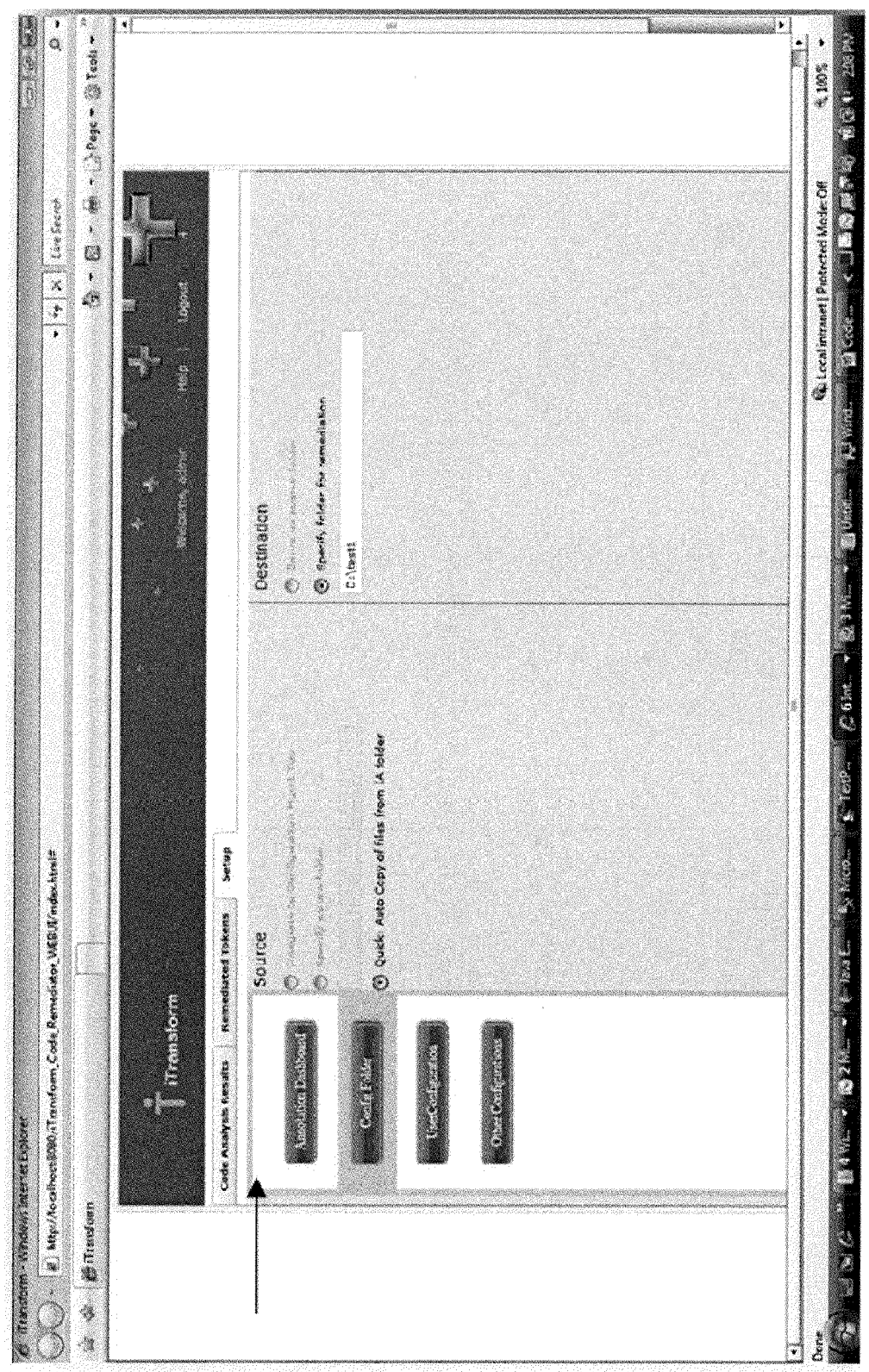
FIG. 14 is a screen shot of an exemplary user interface for code remediation setup.

FIG. 14 is a screen shot of an exemplary user interface 1400 for code remediation setup. Setup can be restricted to administrative users.

The interface 1400 can include a user interface element for entering the code base source (e.g., the folder in which the code to be remediated resides). A destination folder can be specified where the remediated code will be stored. Such an approach helps prevent direct editing of the source code and prevents unforeseen errors due to remediation. The language of the code to be remediated can be identified during setup (e.g., based on file names, contents of the files, or the like) or when encountering specific files (e.g., if the files are of different languages).

A click of a "Config Folder" button on a setup page can be received.

The destination folder for remediation can be received.

Remediation can then proceed according to the specified information.

Example 33

Exemplary User Interface: Users

Figure 15:
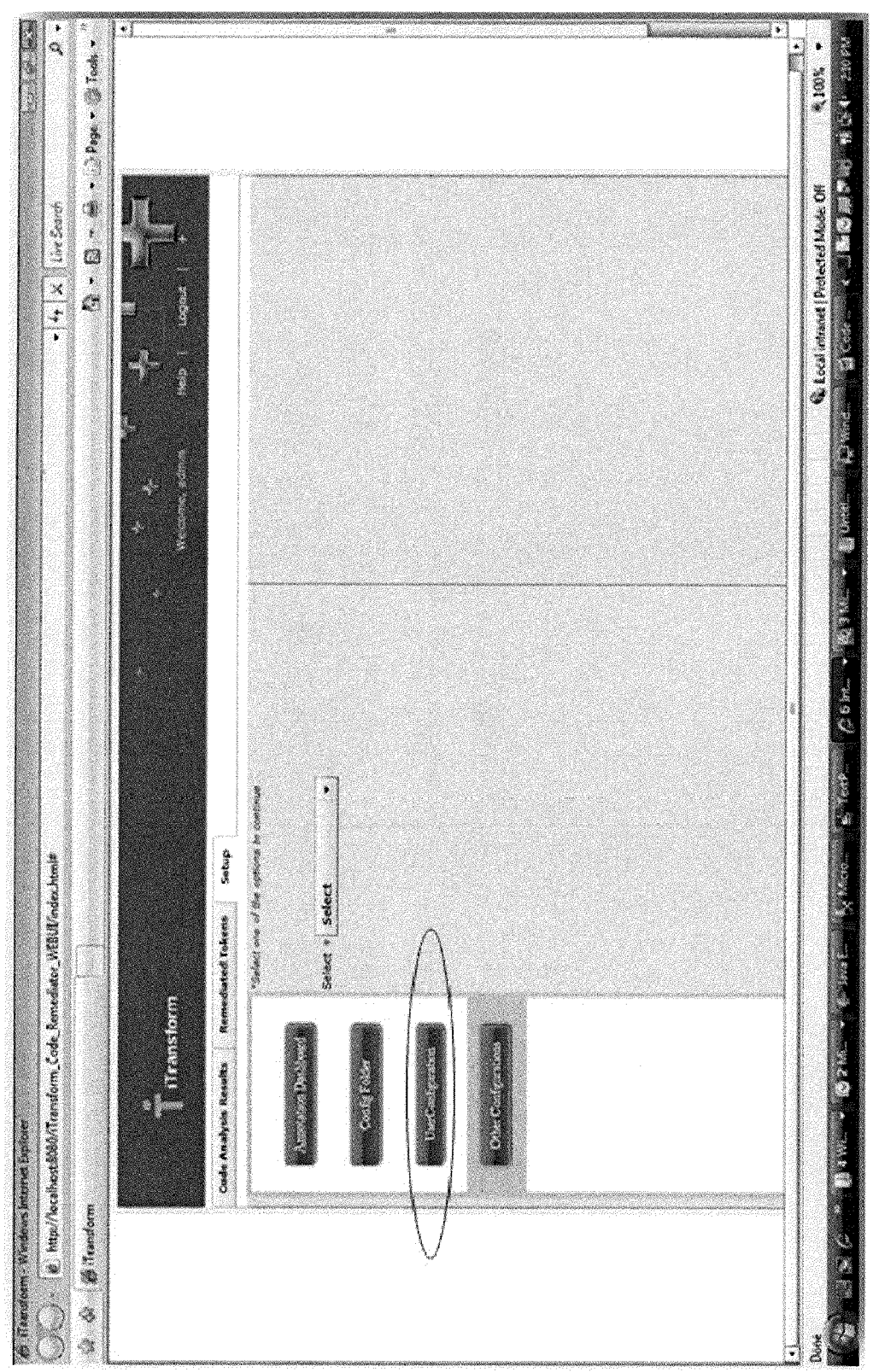
FIG. 15 is a screen shot of an exemplary user interface for configuring users.

FIG. 15 is a screen shot of an exemplary user interface 1500 for configuring users of the remediation tool. New users can be created or existing users can be modified.

In the interface 1500, a new user can be created by receiving "Create User" from a drop down menu.

An existing user can be created by receiving "Modify User" from the drop down menu and receiving the user name.

Example 34

Exemplary User Interface: Impact Points

Figure 16:
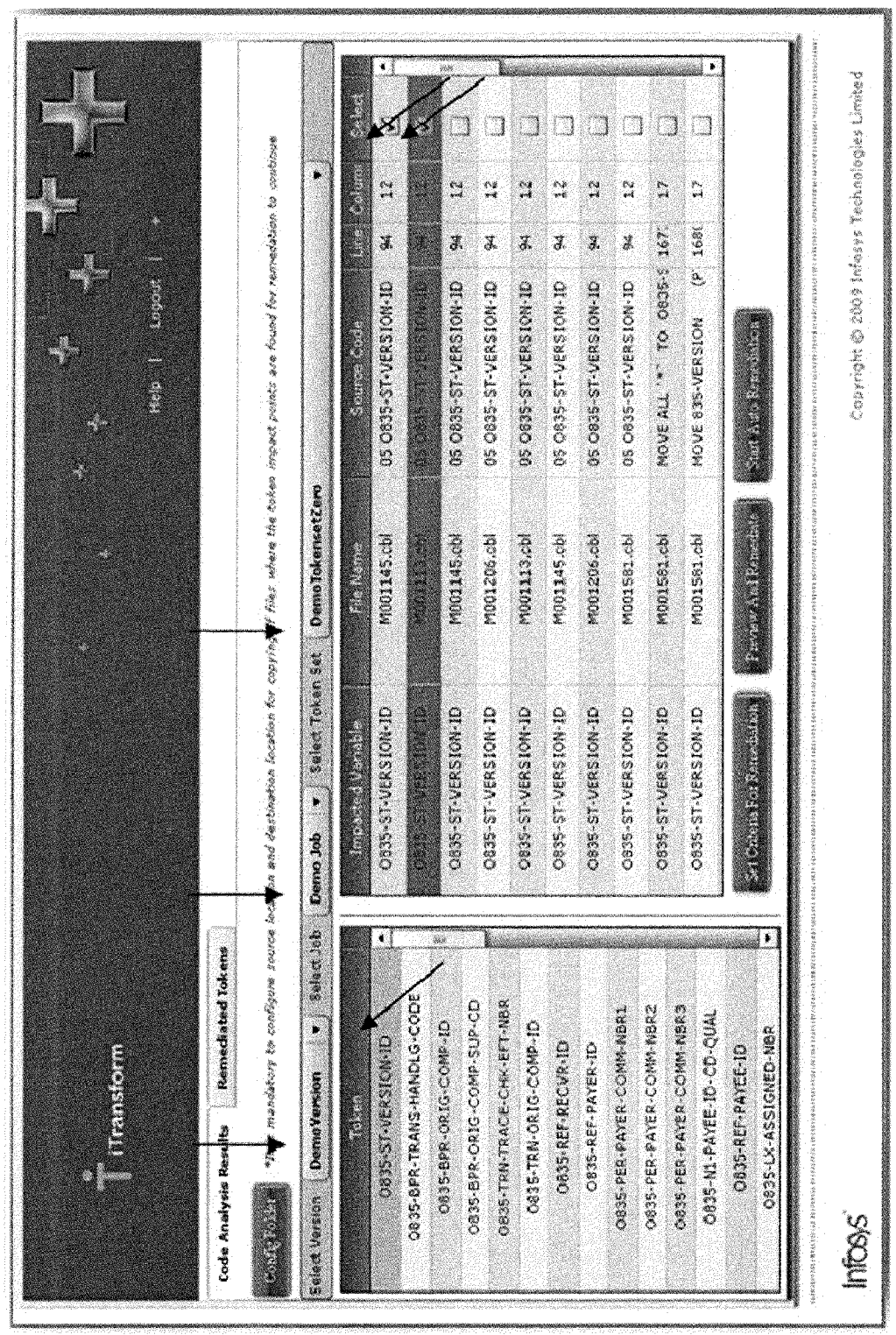
FIG. 16 is a screen shot of an exemplary user interface for selecting impact points for remediation.

FIG. 16 is a screen shot of an exemplary user interface 1600 for selecting impact points for remediation. The interface 1600 can serve as a landing page after an initial code analysis is performed.

Selections of version, job, token set, and token can be received. A selection of one or more impact points for remediation can be received.

Activation of a particular impact point (e.g., via double clicking) can show details regarding the impact point (e.g., in a pop up window). Details can include a token summary showing the token name and token set name; location information including the file name, line number, column, source code type, and a source code snippet; and transaction set information, showing a transaction set, change type, and loop & segment information.

Navigation to the code analysis results landing page can be achieved (e.g., automatically after analysis, by selection of the "code analysis tab," or the like).

Token search pattern matches can be listed as impact points, and the user interface can be used to receive an indication of which impact points should be selected for annotation. Only the selected impact points (e.g., impacted variables) will be annotated. Remediation can thus be limited to those impact points that are selected via the user interface. In the example, a checkbox is used to select impact points for remediation.

Previewing can be achieved via the interface 1600 (e.g., by selecting "Preview And Remediate"). Or, automatic remediation can be achieved via the interface 1600 (e.g., by selecting "Start Auto Remediation").

In manual remediation, remediation stages of scanning, annotating, and compiling are broken up and displayed (e.g., shown to the user) in a step by step manner. The interface allows cancelation of the process anytime or changes to be made in addition to the remediation performed by the tool.

Manual remediation can be accomplished by receiving a selection of impact points and receiving selection of the "Preview And Remediate" button. The specified impact points will be further processed for remediation.

Figure 17:
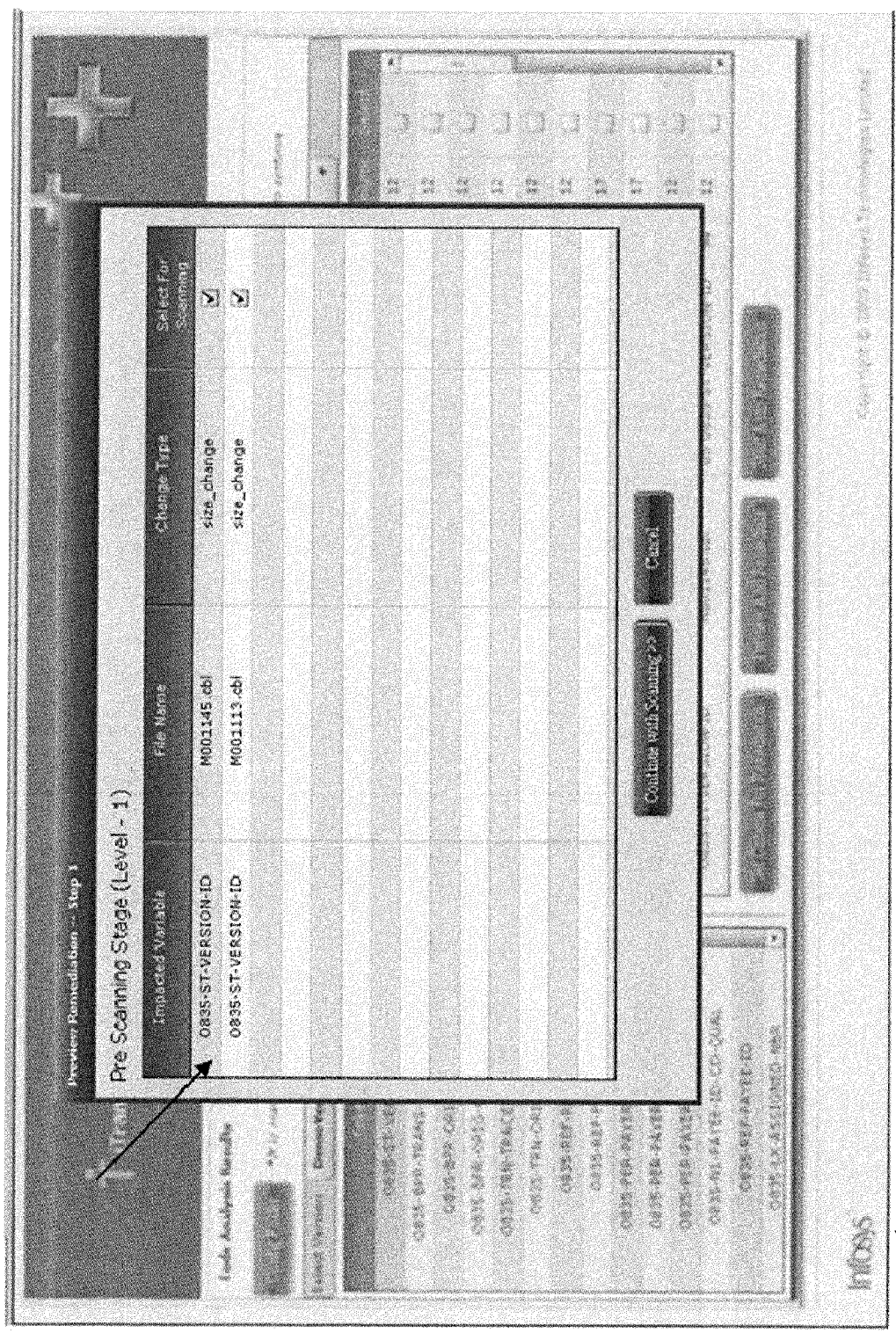
FIG. 17 is a screen shot of an exemplary user interface for a pre-scanning stage.

A wizard-like popup can open which contains the selected points. The wizard can take the user through the process from beginning to end. FIG. 17 is a screen shot of an exemplary user interface for a pre-scanning stage (e.g., part of the wizard that displays selected impact points) by which remediation can be previewed.

An impacted variable, file name, and change time are displayed in a list of impacted variables. A selection for proceeding further in the process (e.g., scanning) can be accepted for the listed impacted variables. Deselecting an impacted variable will inhibit further remediation on impact points associated with the impacted variables in the file listed (e.g., according to change type). Per-impacted-variable remediation, per-impacted-file remediation, or per-impacted-variable-per-file remediation can thus be achieved.

The scanning stage can be initiated via selection of the "Continue with Scanning" button.

Criteria for remediation can be set via selection of the "Set Criteria for Remediation" button. For example, criteria can specify a file, change type, or both. Impact points can be filtered according to the criteria.

Example 35

Exemplary User Interface: Scanning

Figure 18:
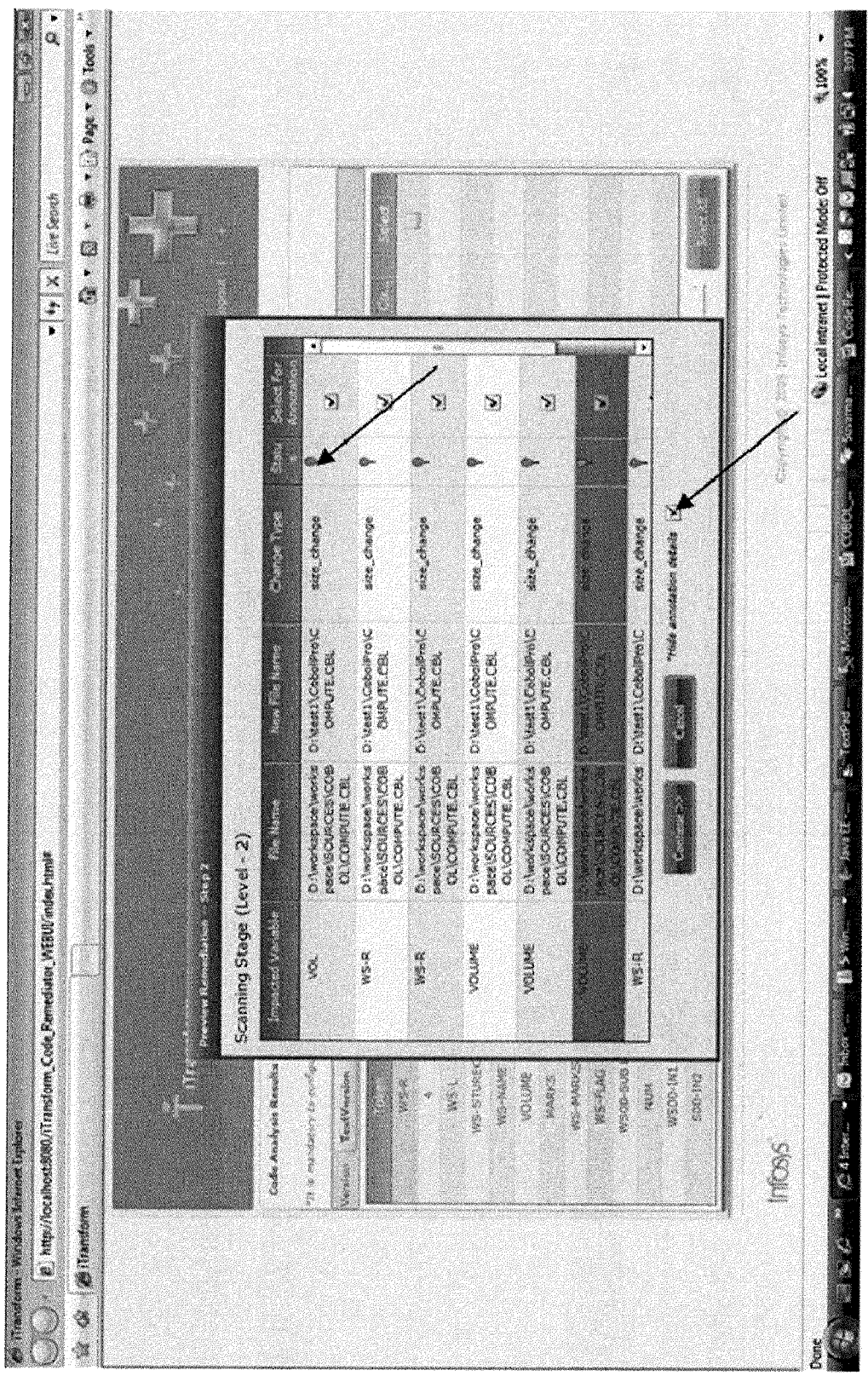
FIG. 18 is a screen shot of an exemplary user interface for annotation details.

FIG. 18 is a screen shot of an exemplary user interface 1800 for a scanning stage. In the example, impacted variables, file names, change types, and status are displayed for respective impact points. Scanning can raise exceptions (e.g., detected problems or code that cannot be remediated by the tool logic). A displayed status can indicate whether there were any exceptions for a respective impact point from previous processing. The tool can restrict further remediation for impact points that have exceptions. Color coding can be used (e.g., green for no exceptions, red for any exceptions, and the like).

In the list of impact points, an indication of selection of one or more points can be received (e.g., from a user). Selection can be by default. If an impact point is deselected, further processing is not performed on the impact point.

In the example, the "Hide annotation details" box is selected. Responsive to deselection of the box, annotation details will be shown when progressing to the next interface.

Example 36

Exemplary User Interface: Annotation Details

Figure 19:
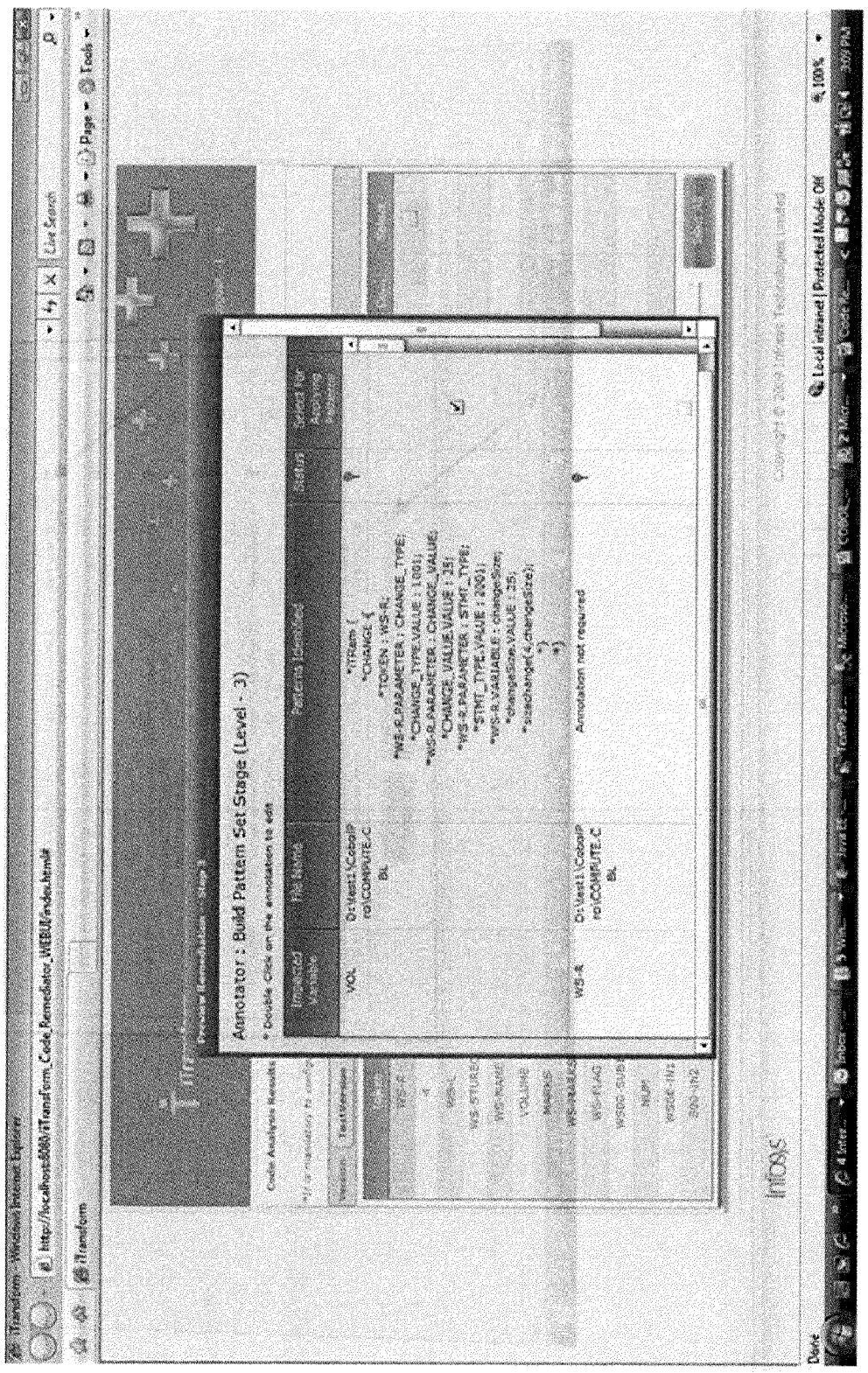
FIG. 19 is a screen shot of an exemplary user interface for an annotation stage.

FIG. 19 is a screen shot of an exemplary user interface 1900 for annotation details. In the example, the details of annotations are shown under the "Patterns Identified" column. In the list of annotations, individual annotations can be selected for further remediation processing (e.g., "select for applying patterns").

Figure 20:
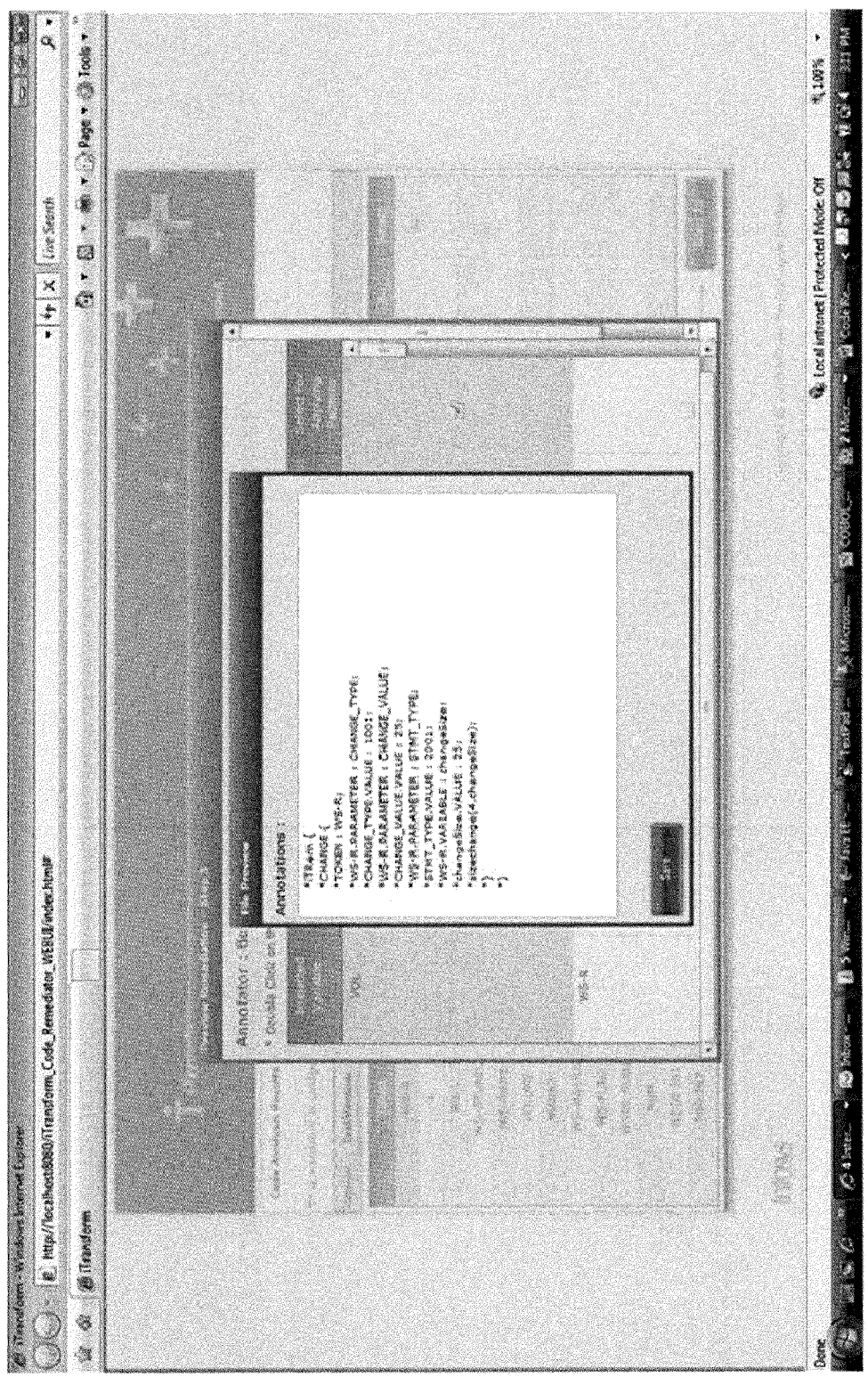
FIG. 20 is a screen shot of an exemplary user interface showing an exemplary annotation.

Upon receiving selection (e.g., double clicking) of a particular annotation, user interface 2000 in FIG. 20 for editing the annotation is displayed. In the example, editing adheres to a predefined format (e.g., label/value pairs).

Example 37

Exemplary User Interface: Translation

Figure 21:
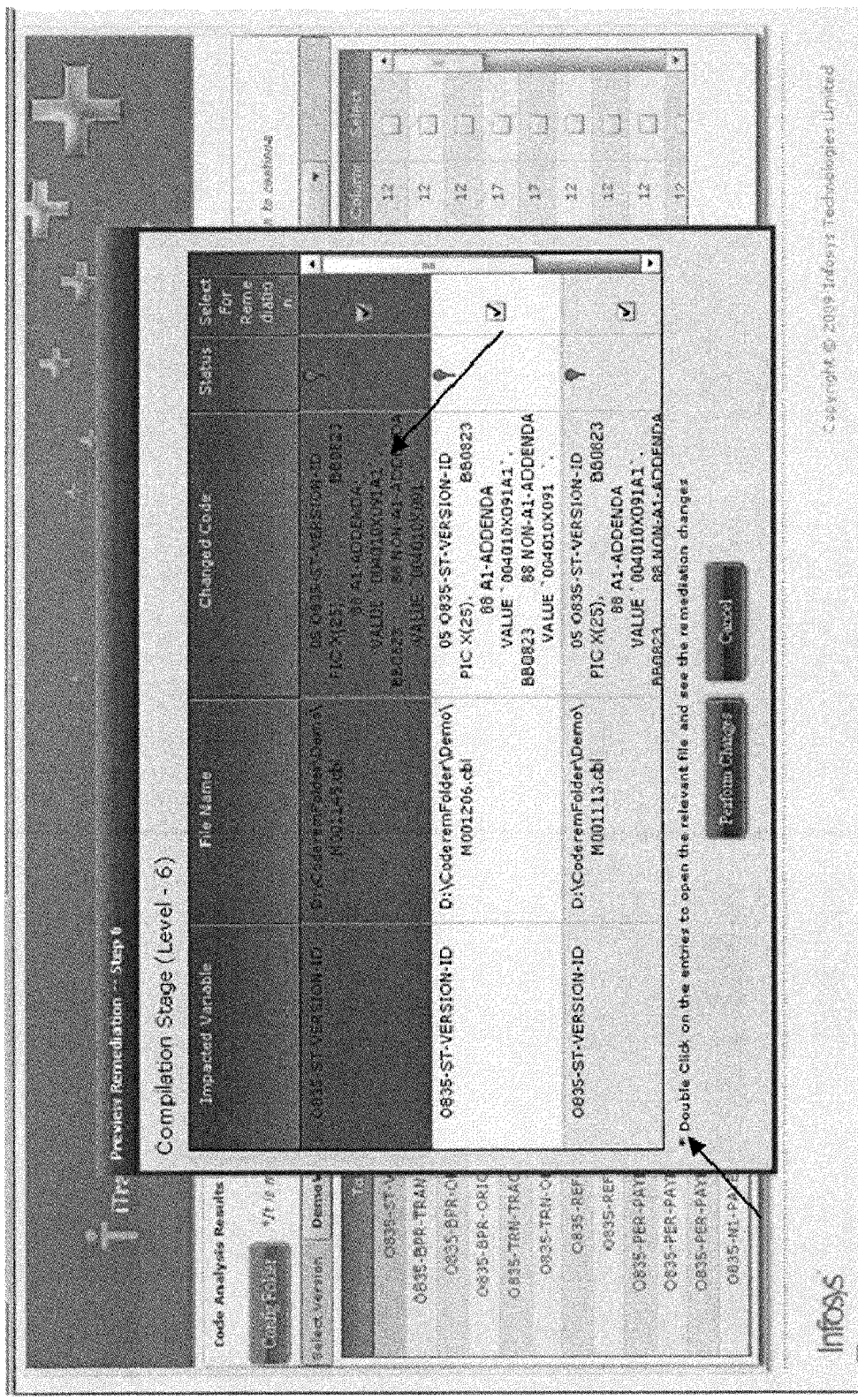
FIG. 21 is a screen shot of an exemplary user interface for a translation stage.

FIG. 21 is a screen shot of an exemplary user interface 2100 for a translation stage. In the example, a list of impacted variables, file names, proposed remediated code, and status are shown for respective impact points. A selection per impact point can be received to indicate whether remediation should continue. Selection can be by default. Only those impact points that are selected will be remediated. Thus, a user can control, per impact point, whether remediation takes place. Those that are deselected will not be remediated.

Figure 22:
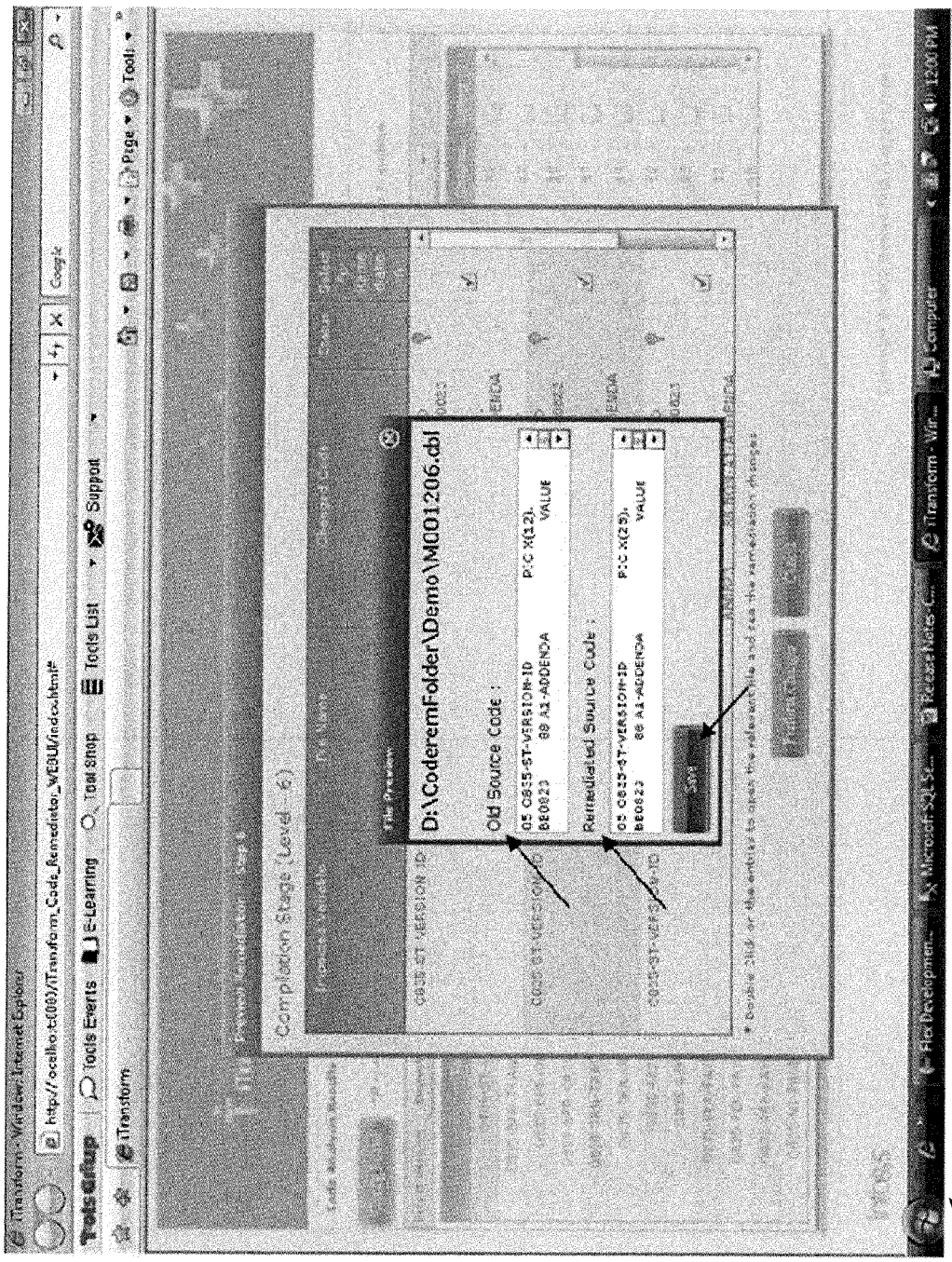
FIG. 22 is a screen shot of an exemplary user interface for editing proposed remediated source code.

Upon receipt of a selection (e.g., double click) of an impact point, a display of the old source code (e.g., original, before remediation) and the proposed remediated source code can be displayed in a user interface 2200 of FIG. 22. The interface 2200 can support editing of the proposed remediated source code.

Responsive to receiving selection of the "Perform Changes" button in the interface 2100, the selected remediations can be made (e.g., including any user modifications to the remediations) to the source code. The interface for indicating remediated files can next be displayed as described herein.

Example 38

Exemplary User Interface: Remediated Files

Figure 23:
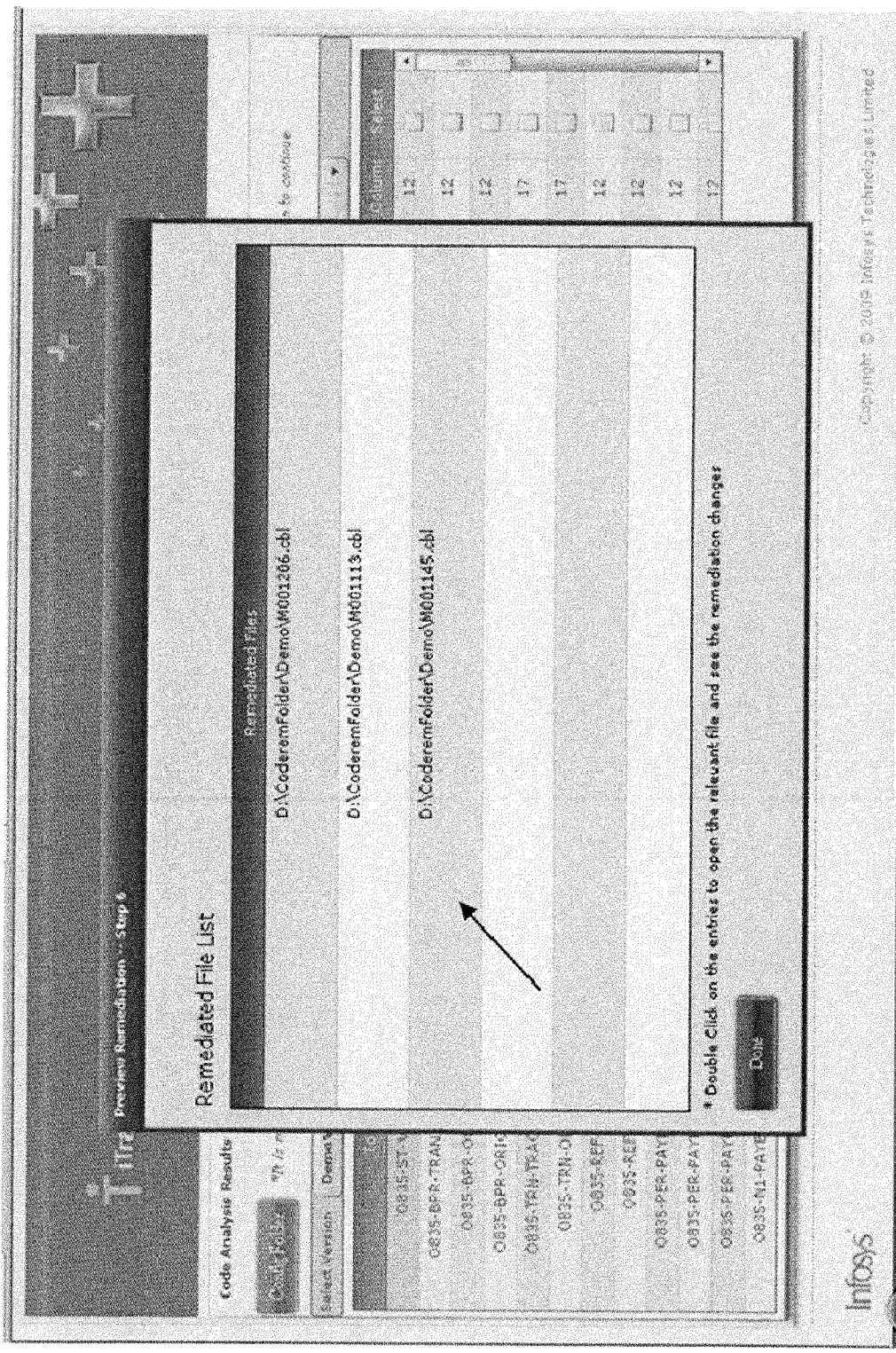
FIG. 23 is a screen shot of an exemplary user interface for indicating remediated files.

FIG. 23 is a screen shot of an exemplary user interface 2300 for indicating remediated files. The list of files in which remediation has been done is shown. Upon receipt of a selection (e.g., double click) of a listed file, an interface for navigating through remediated sections of code can be shown as described herein.

Example 39

Exemplary User Interface: Navigating Remediated Code

Figure 24:
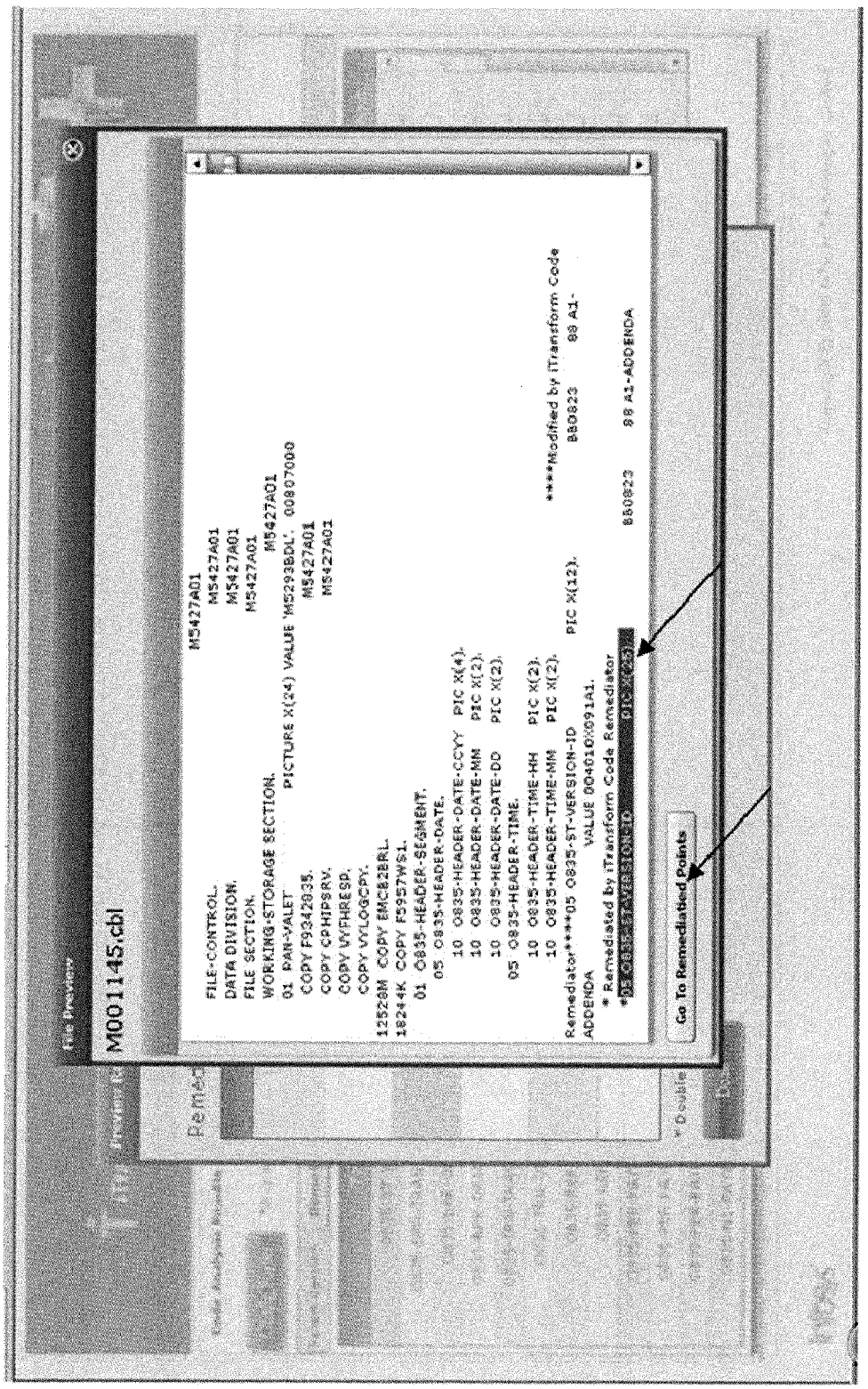
FIG. 24 is a screen shot of an exemplary user interface for navigating through remediated sections of code.

FIG. 24 is a screen shot of an exemplary user interface 2400 for navigating through remediated sections of code. The user interface 2400 can serve as a code browser that can jump to remediated points seriatim (e.g., one after the other in a serial sequence). Upon completion, the remediated file list of FIG. 23 can be shown again.

Example 40

Exemplary User Interface: Automatic Remediation

Figure 25:
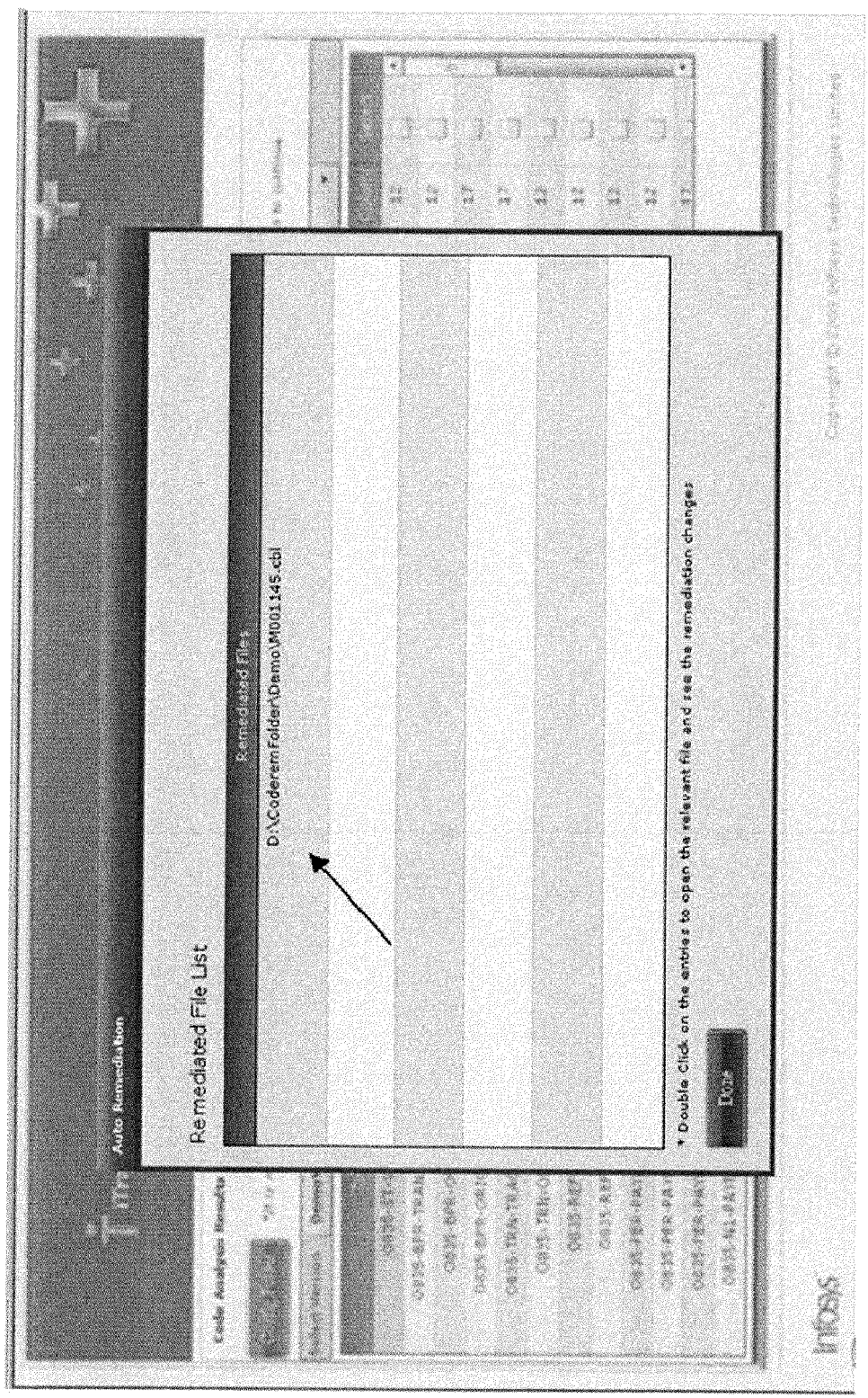
FIG. 25 is a screen shot of an exemplary user interface for automatic remediation.

FIG. 25 is a screen shot of an exemplary user interface 2500 for automatic remediation. Automatic remediation can proceed the same as manual remediation, but user input concerning various steps is not solicited. Instead, the process can proceed directly to the remediated files list (e.g., FIG. 23). A user can thus still be directed to the sections of code impacted by remediation.

Example 41

Exemplary User Interface: Remediation Progress

Figure 26:
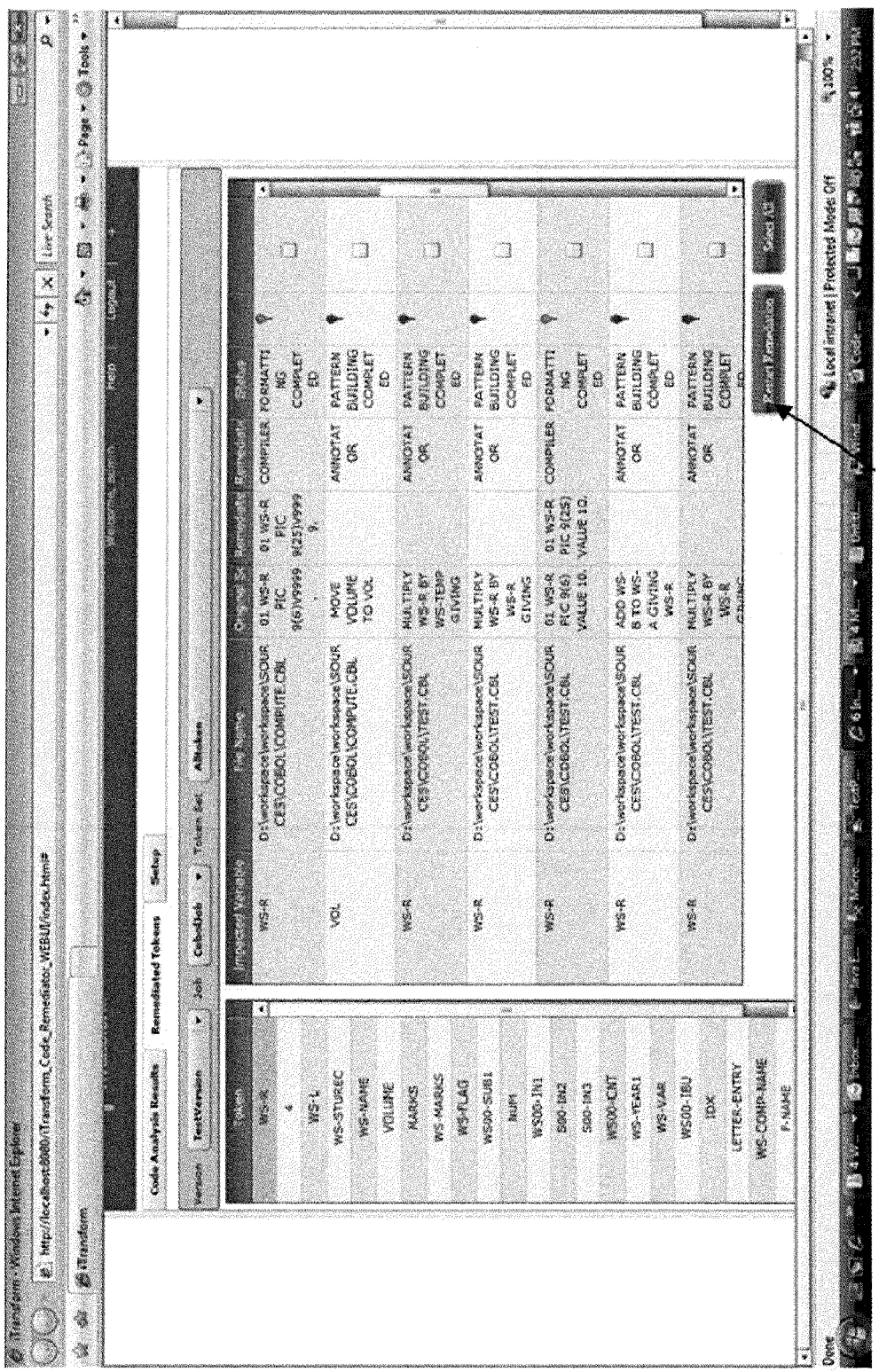
FIG. 26 is a screen shot of an exemplary user interface for showing overall remediation progress.

FIG. 26 is a screen shot of an exemplary user interface 2600 for showing overall remediation progress. In the interface 2600, the tokens that have been remediated are shown. A log of the token showing remediation status of the impact point and changed source code can be shown.

A "Restart Remediation" option can be provided by which the user can restart the entire remediation process. Existing changes can be lost. A user can make a back up of the remediation file to refer to prior changes.

Navigation to the remediation progress interface 2600 can be achieved by selection of a user interface element on the landing page 1600 of FIG. 16 (e.g., "the Remediated Tokens" tab).

Example 42

Exemplary Execution of Remediation Technologies: Size Change

FIGS. 27-31 illustrate an exemplary execution of code remediation technologies. In the example, four stages are illustrated as performed by four components (e.g., scanner, annotator, analyzer, and translator). The example shows COBOL code, but the technologies can be applied to other languages.

In the example, an exemplary token search pattern is "STR_N3." The token search pattern is used because new regulations indicate that elements represented by N3 can now have a maximum length of 60. Accordingly, a size change function is used during remediation.

FIG. 2700 shows an impact point 2700 (e.g., source point) in a declaration statement of the COBOL program CBL19089 that has been found via a token search pattern. The variable "ASTR_N3_ID" is matched to the token search pattern "STR_N3."

An impacted variables list 2710 can be generated that list the impacted variables, files affected, and the change type. The list can be done before the scanning stage.

During scanning, copies of the impacted files can be made. Remediation can be done on the copied files. Such an operation can be based on the configuration setup for the source and destination. In the example, the tool has received a selection of the "Quick Auto Copy" method (e.g., from a user) to select the source folder and has specified a default destination (e.g., "D:\DEST") for new files generated. Results are shown in the table 2730.

Annotations can be created at run time and applied on the code. Annotations are sometimes called "patterns" and are written in a format that is programming language-independent. The format has its own grammar. For a given change type and impacted variable, the annotation applied is the same irrespective of whether the source code where the impacted variable is in COBOL, JAVA, or the like.

FIG. 28 shows an example table 2800 including an exemplary annotation. The variable is a memory storage unit. It can store a value of any type (e.g., string, numeric, etc.).

PARAMETER is a defined variable. The PARAMETERs used in the exemplary annotation are CHANGE_TYPE, STMT_TYPE, and IMPACT_LINE.

CHANGE_TYPE defines the change difference between the two versions of the code (e.g., unremediated v. remediated). In the example, 1001 means it is a size change.

STMT_TYPE defines the program statement type where the impact has occurred. In the example, 2001 means that it is a declaration statement.

IMPACT_LINE defines the line number of the program where the impact has occurred.

The annotations are broken down to a set of patterns and sequentially arranged for translation.

FIG. 29 shows an example 2900 in which analyzer output is shown for the annotation of FIG. 28 (the same annotation as that shown in FIG. 28). The output includes regular expressions that can be applied against the annotation to generate an analysis tree, which can be subsequently translated into remediated code.

FIG. 30 shows an example 3000 in which translation (e.g., "compiler") output is shown for the analyzer output of FIG. 29 (which is the same as that shown in FIG. 29). The annotation is the same as that of FIG. 28). The annotation is converted to the shown source code. In the example, the impact was found in COBOL code, so the translator converts the analyzer output to the COBOL source code format.

Figure 31:

FIG. 31 shows the difference between the old (e.g., original, unremediated) source code and the remediated source code. The 30 has been changed to a 60 in the COBOL declaration statement.

Example 43

Exemplary Execution of Remediation Technologies: Code Change

FIGS. 32-37 illustrate an exemplary execution of code remediation technologies. In the example, four stages are illustrated as performed by four components (e.g., scanner, annotator, analyzer, and translator). The example shows JAVA code, but the technologies can be applied to other languages.

In the example, an exemplary token search pattern is "\wCodeQual\w." "\w" is a regular expression and stands for any alphanumeric character (e.g., [a-zA-Z0-9]). The token search pattern is used because new regulations indicate that there is a code change for the element represented by CodeQual. The old values were 21, AD, FI, NI, PI, PP, and XV. The new allowed values are PI and XV. Accordingly, a code change function is used during remediation.

FIG. 32 shows a source code snippet 3200 with a plurality of impact points (e.g., source points) in an if statement of the JAVA program L2100REQ.JAVA that have been found via the token search pattern. Lines 28-45 are shown. Lines 28, 29, 31, 33, 35, 37, 39, and 41 are identified as impact points. The variable "strCodeQualifier" is matched to the token search pattern "wCodeQual\w."

FIG. 33 shows an impacted variables list 3300 that can be generated and lists the impacted variables, files affected, and the change type. The impacted method is also listed. The list can be done before the scanning stage.

During scanning, copies of the impacted files can be made. Remediation can be done on the copied files. Such an operation can be based on the configuration setup for the source and destination. In the example, the tool has received a selection of "Quick Auto Copy" method (e.g., from a user) to select the source folder and has specified a default destination (e.g., "D:\DEST") for new files generated. Results are shown in the table 3310.

Annotations can be created at run time and applied on the code. Annotations are sometimes called "patterns" and are written in a format that is programming language-independent. The format has its own grammar. For a given change type and impacted variable, the annotation applied is the same irrespective of whether the source code where the impacted variable is in COBOL, JAVA, or the like.

FIG. 34 shows an example table 3400 including an exemplary annotation. The variable is a memory storage unit. It can store a value of any type (e.g., string, numeric, etc.). In the example, CD_CHG_TYPE is a variable used to define the type of change required in the code. The value specified is DELETE. CD_LST is a variable used to define a list of values. The values specified are 21, AD, FI, NI, and PP.

PARAMETER is a defined variable. The PARAMETERs used in the exemplary annotation are CHANGE_TYPE, STMT_TYPE, and IMPACT_LINE_LST.

CHANGE_TYPE defines the change difference between the two versions of the code (e.g., unremediated v. remediated). In the example, 1009 means it is a code change.

STMT_TYPE defines the program statement type where the impact has occurred. In the example, 2003 means that it is an if block statement.

IMPACT_LINE_LST defines the list of impact point line numbers.

The functions can be action performers. The functions can be predefined. The function in the above example is CODECHANGE, which takes three parameters: impacted lines, type of change, and list of values. In the above example, the 'type of change' specified is 'DELETE' and the list of values are '21, AD, FI, NI,PP.' So, the CODE CHANGE function will check on the type of change. Because it is 'DELETE' in the example, it will delete lines in the conditional statement containing references to the values present in the list per the variable CD_LST. The remaining lines are rearranged to form a syntactically correct IF Block.

Figure 35:
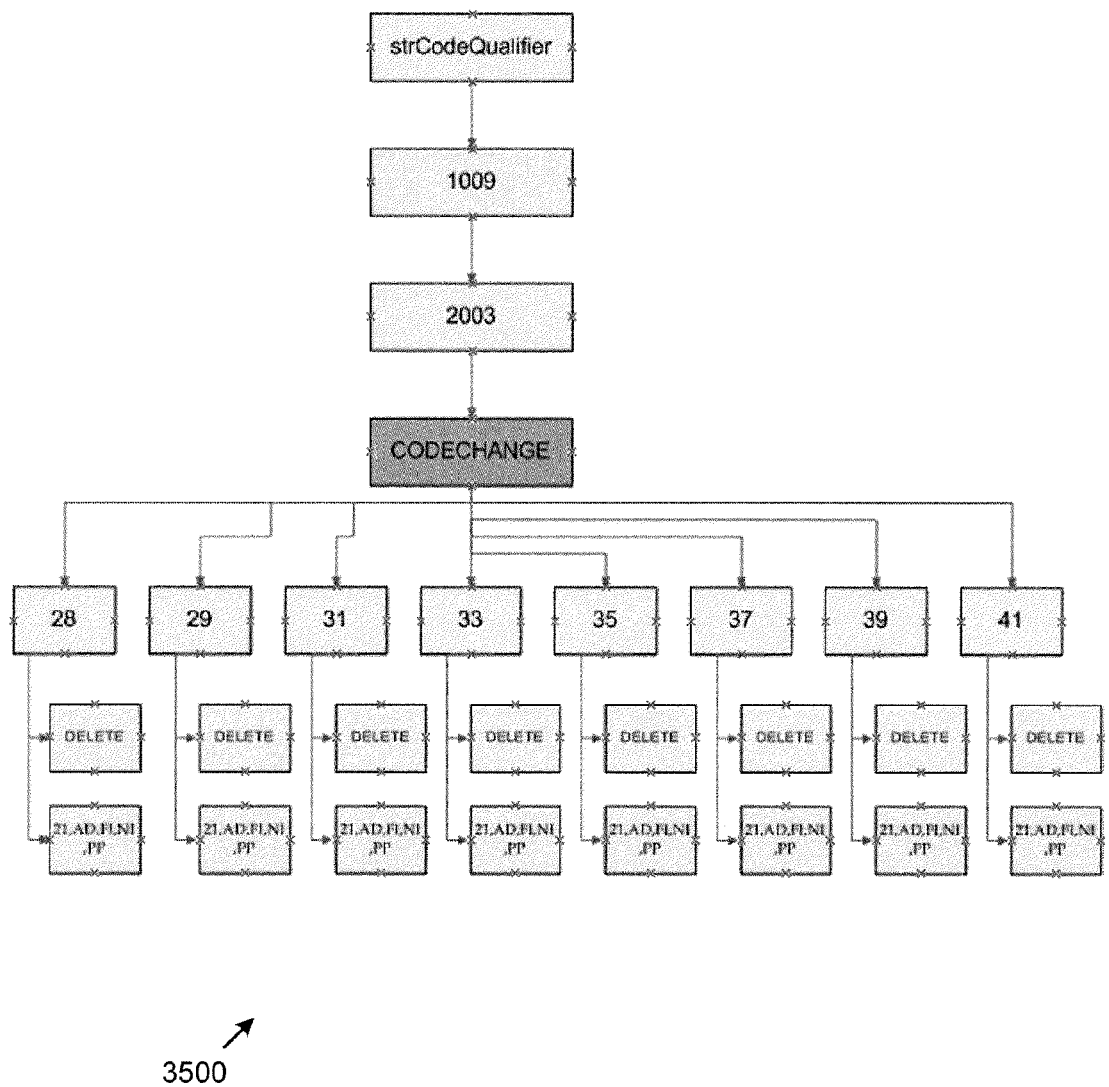

The annotations are broken down to a set of patterns and sequentially arranged for translation. FIG. 35 is a graphical illustration of how the analysis patterns are formed for consumption by the translator. In the example, an analysis tree

3500 contains a code change node with 8 children indicating the sections (e.g., line numbers) at which the code change function is to be executed. When processed, the 'delete' nodes result in deletion of the specified sections. Like the annotations, the analysis tree 3500 is also language-independent in that a same format can be used to represent code changes in a variety of programming languages (e.g., JAVA, COBOL, etc.).

Figure 36:

FIG. 36 shows an example remediated code snippet 3600 in which translation (e.g., "compiler") output is shown for the analysis tree 3500. The remediated code 3600 is based on the annotation shown in FIG. 34. The annotation is converted to the shown source code. In the example, the impact was found in JAVA code, so the translator converts the analyzer output to the JAVA source code format.

FIG. 37 shows the difference between the old (e.g., original, unremediated) source code 3700 and the remediated source code 3710. Lines having the obsolete code values have been deleted, and a syntactically correct "if" block has been formed.

As a result of the remediation, a test case was applied: Invoke identifyQualifier method by sending "NI" as the method parameter. The results under the old source code were "NAIC Identification." Under the new source code, the results were "UNKNOWN." Accordingly, the new source code complies with the new regulations because "NI" is not a permitted code value.

Example 44

Exemplary Analysis Tree Details

Figure 38:
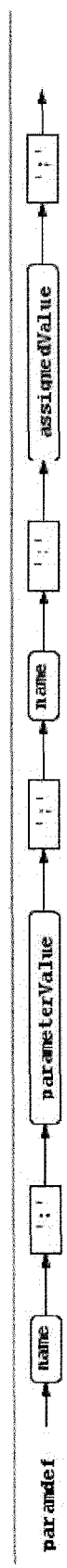
FIG. 38 is a block diagram of an exemplary analysis tree.
Figure 39:
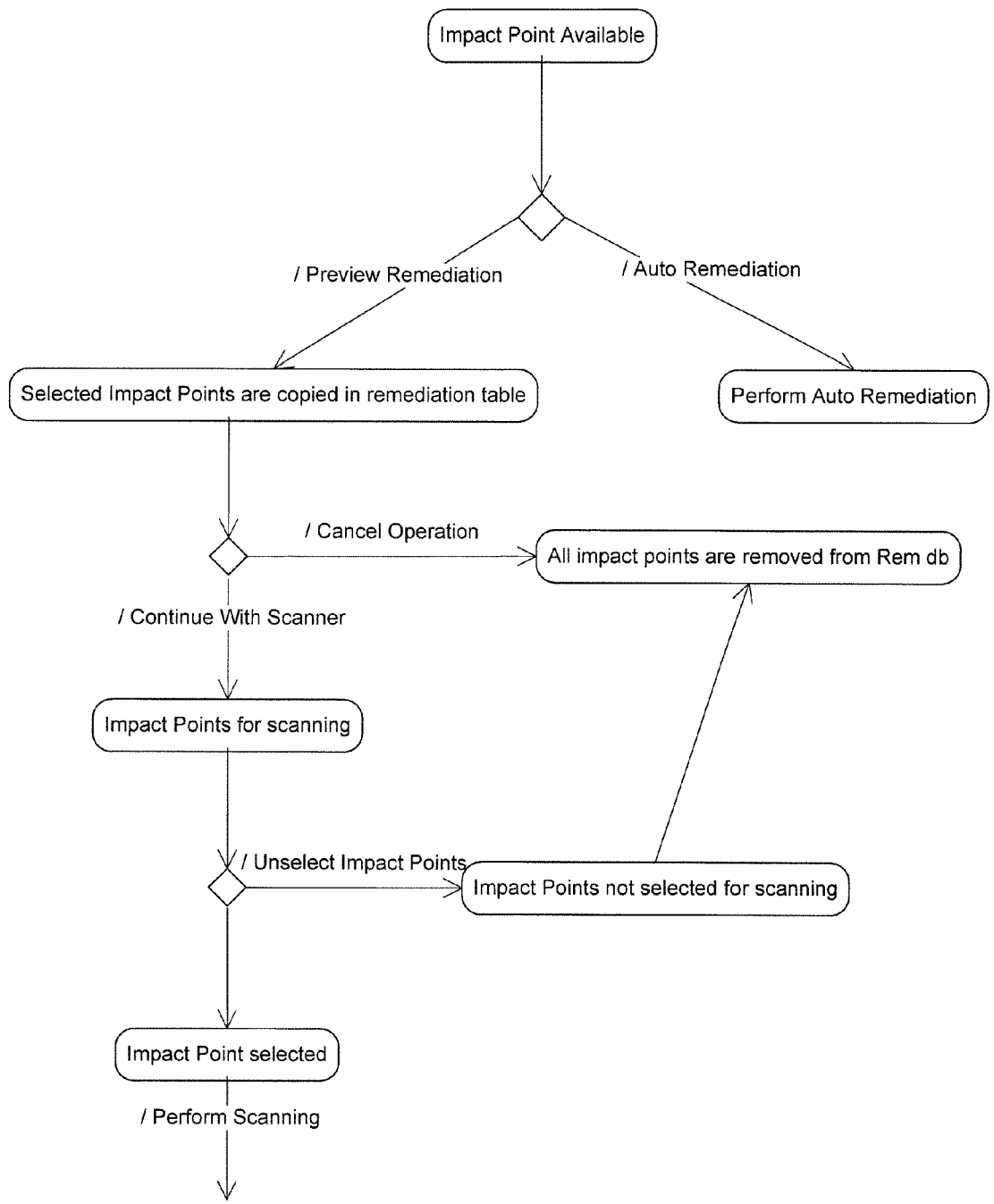
FIGS. 39, 40, 41, 42, 43, and 44 illustrate execution flow for an exemplary implementation of code remediation.
Figure 40:
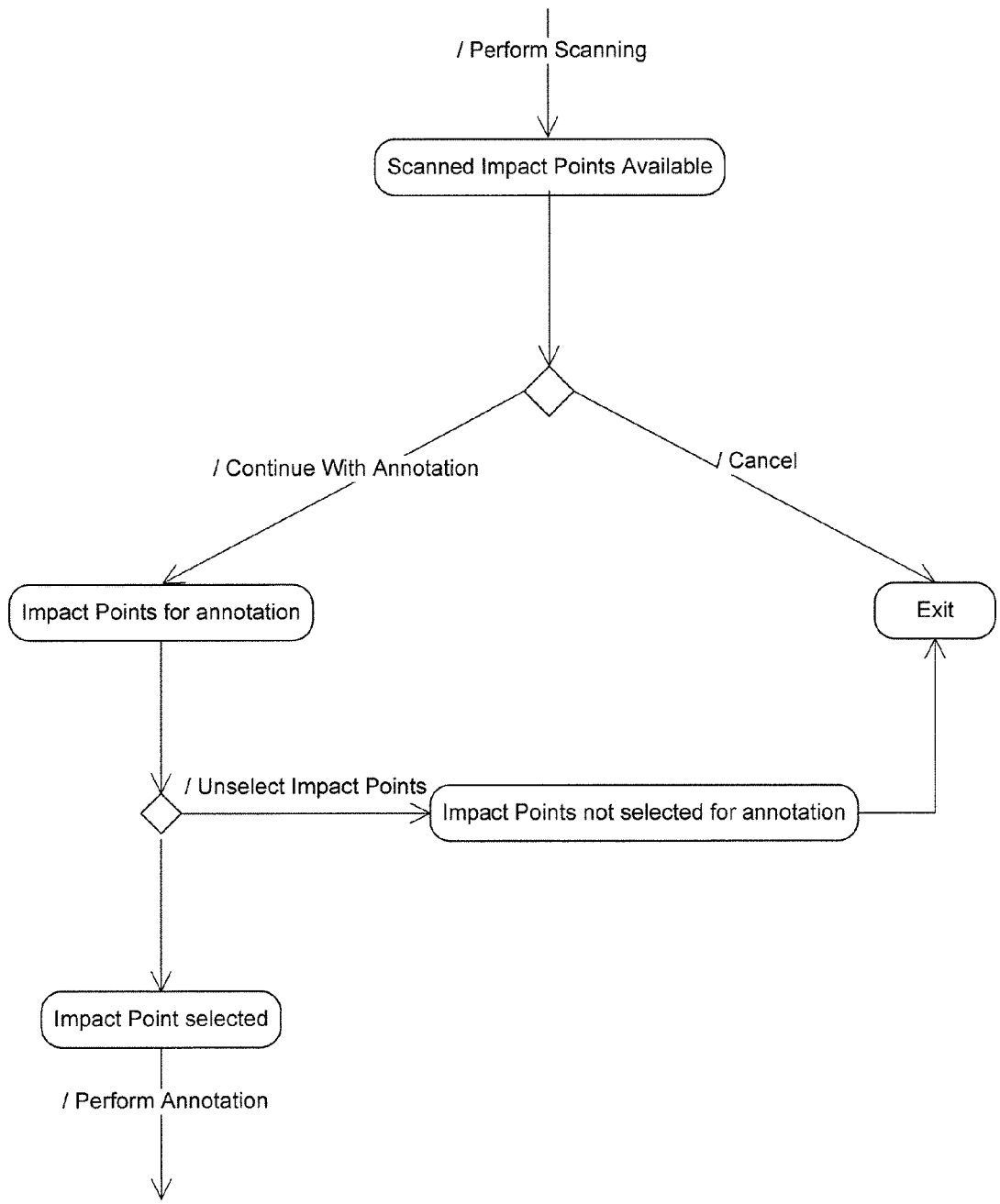
Figure 41:
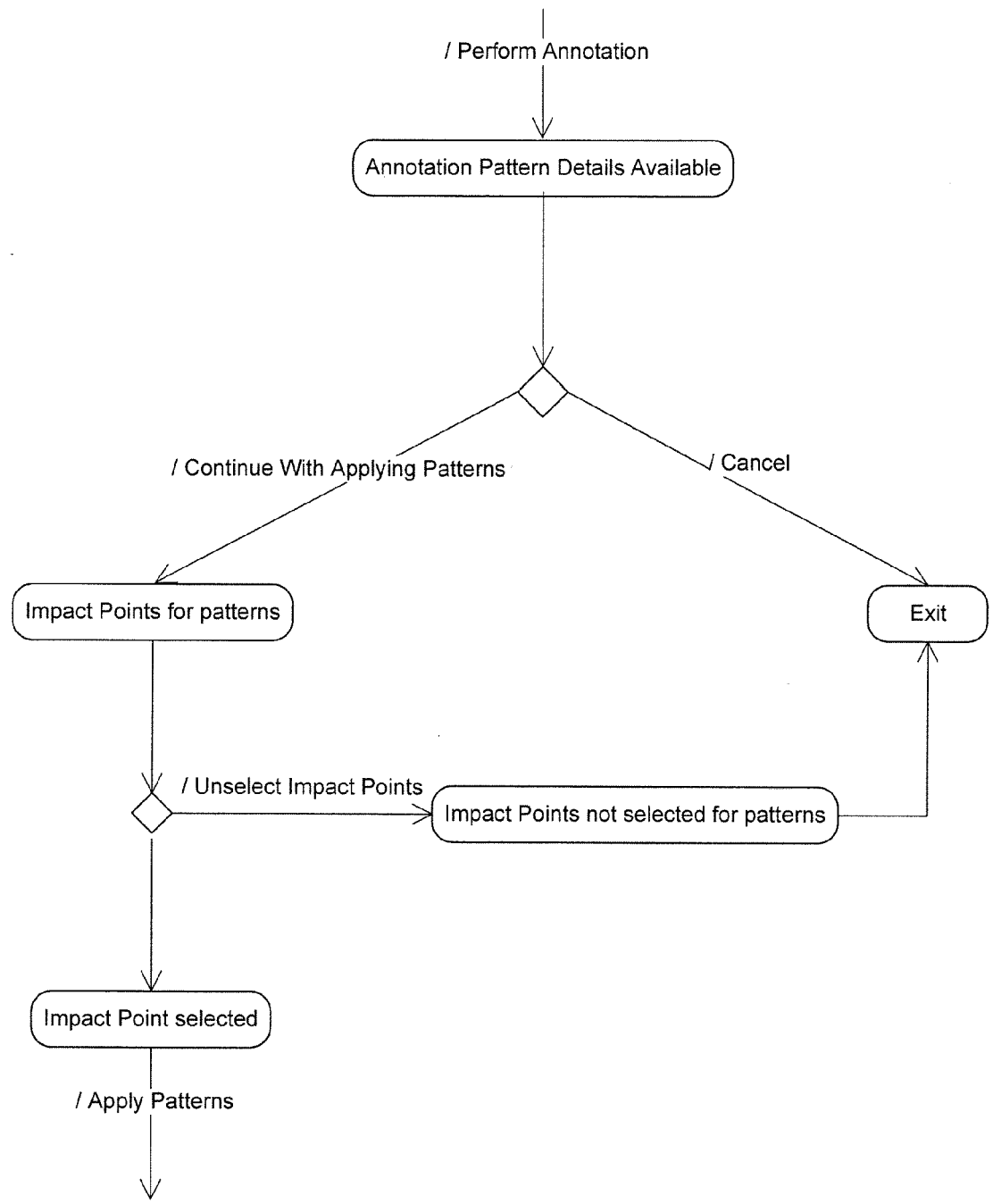
Figure 42:
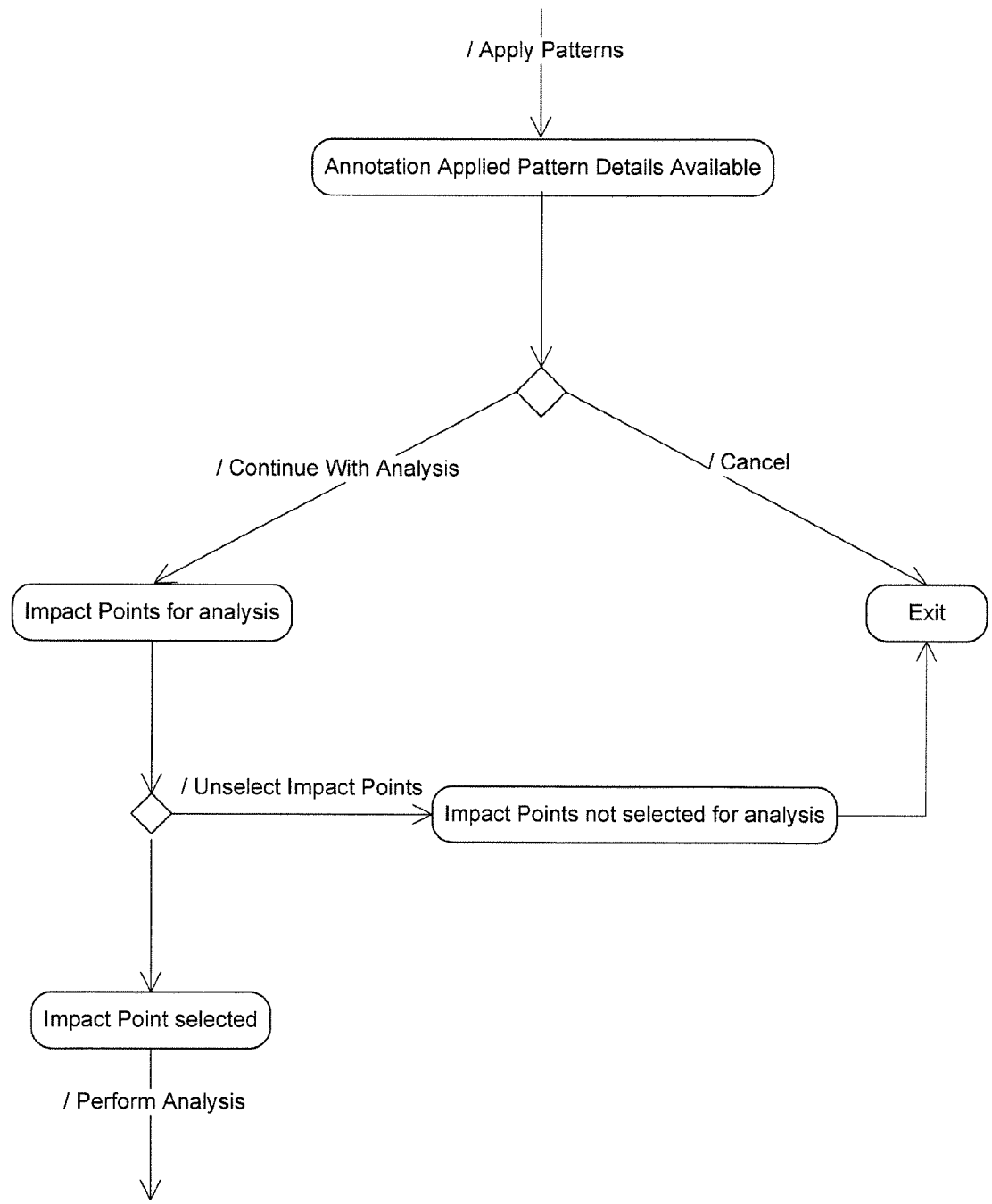
Figure 43:
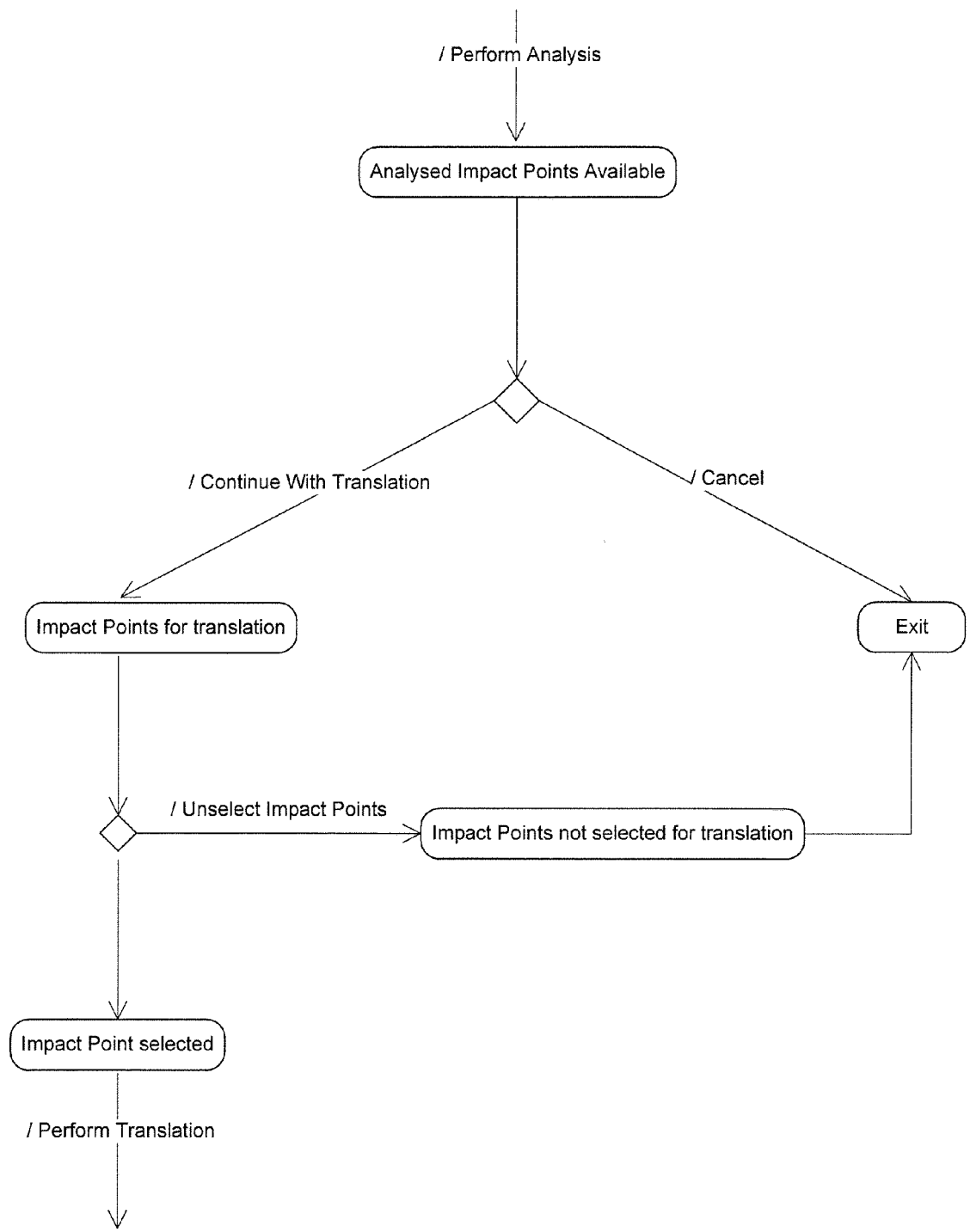
Figure 44:
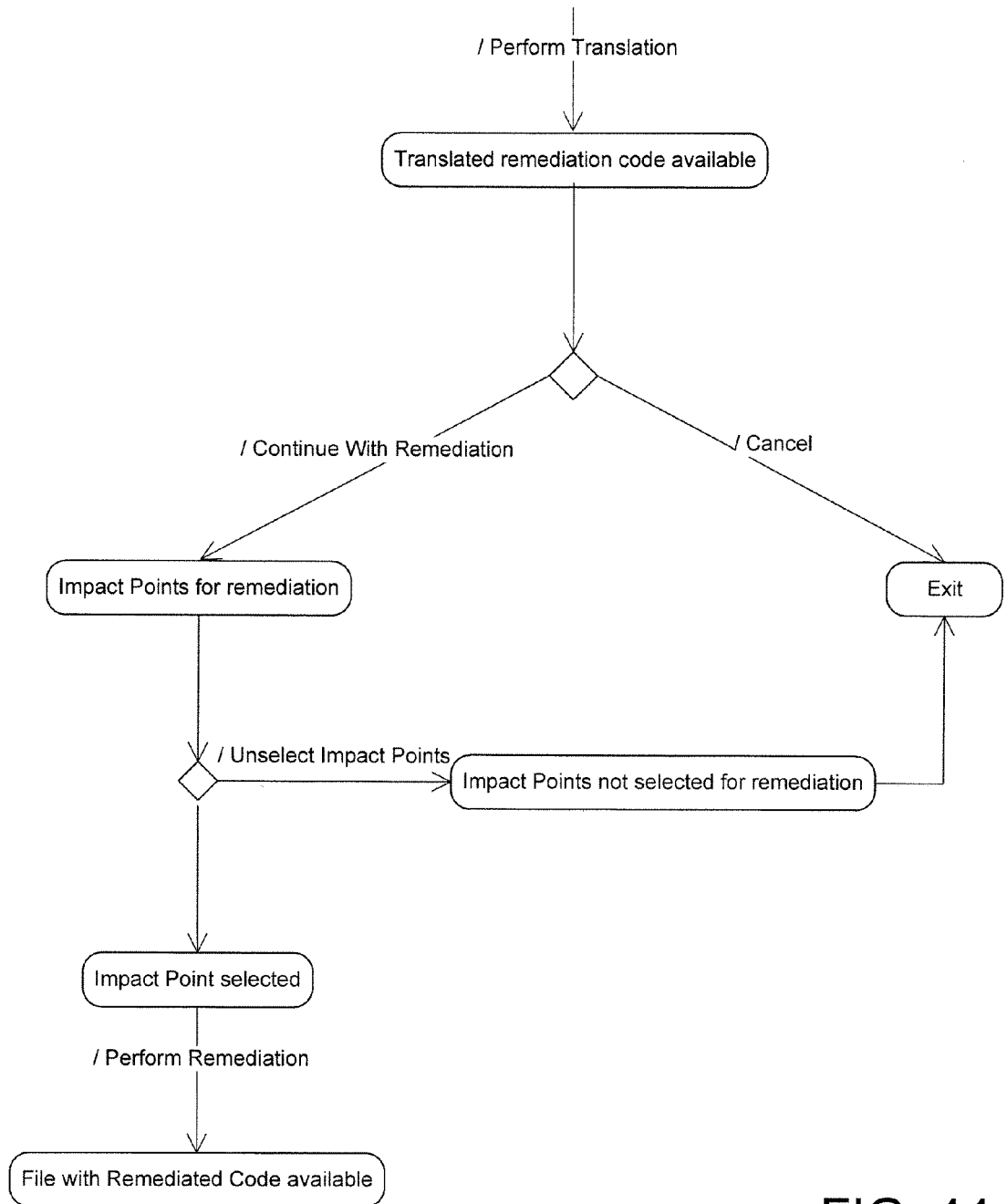
Figure 45:
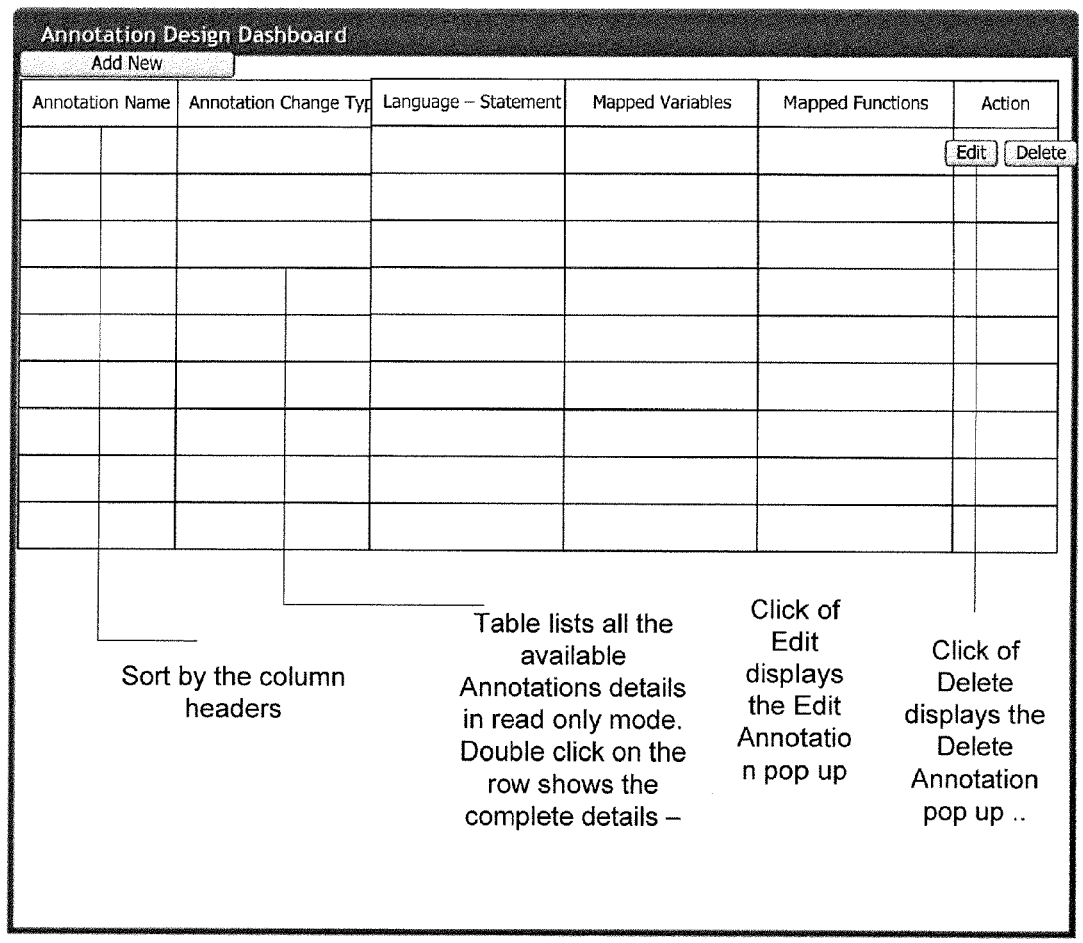

FIG. 38 is a block diagram of an exemplary pre-translation analysis tree 3800 for use in any of the examples herein. In the example, the tree has only one branch, but in other situations (e.g., involving conditional statements), multiple branches can be present.

The tree 3800 implements a parameter definition and contains name/value pairs separated by semicolons. The names and values are separated by colons. When processed during translation, the tree results in the parameter of name "parameterValue" being assigned the value "assignedValue."

Thus, the analysis tree can thus accomplish assignment of parameters to values during execution of change functions that generate language-specific remediated code.

Example 45

Exemplary Change Function: Sizechange

A sizechange change function can be implemented to remediate code containing variables declared to be a certain size. So, the function can be defined so that if a new size and impact line are provided, it will create a new declaration statement at the impact line with the new size that is provided.

So, determining that the statement type is a declaration statement, the sizechange change function can replace a declaration statement with a new declaration statement. So, in the case of COBOL, it can use the "PIC" declaration statement to declare a variable with the name of the token and of the size indicated by the new size provided to the change function.

Example 46

Exemplary Execution Flow

FIGS. 39-44 illustrate execution flow for an exemplary implementation of code remediation. Execution is shown from the time that an impact point is available. Various points at which a user can influence execution in a custom (e.g., "preview") remediation are shown.

Example 47

Exemplary Annotation Configuration

FIGS. 45-48 are screen shots of exemplary user interfaces for configuring annotation types. As described herein, annotations can be derived from rule conditions based on the Token Search Criteria and Token Search Results. The user interfaces for configuration annotation types can provide a dashboard to help in defining rule conditions.

The user interface features include Add New Annotation, Edit Existing Annotation, and Delete Existing Annotation from the dashboard.

Figure 46:
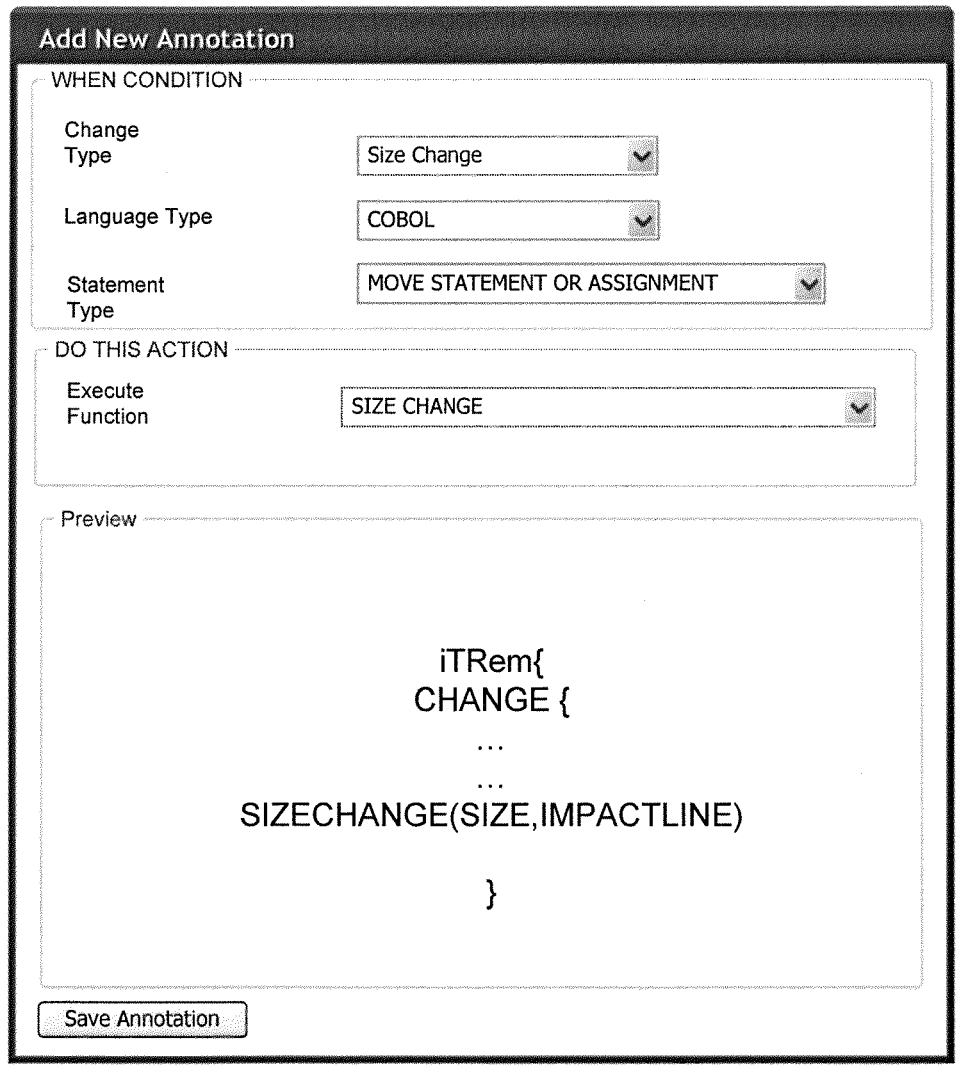
Figure 48:
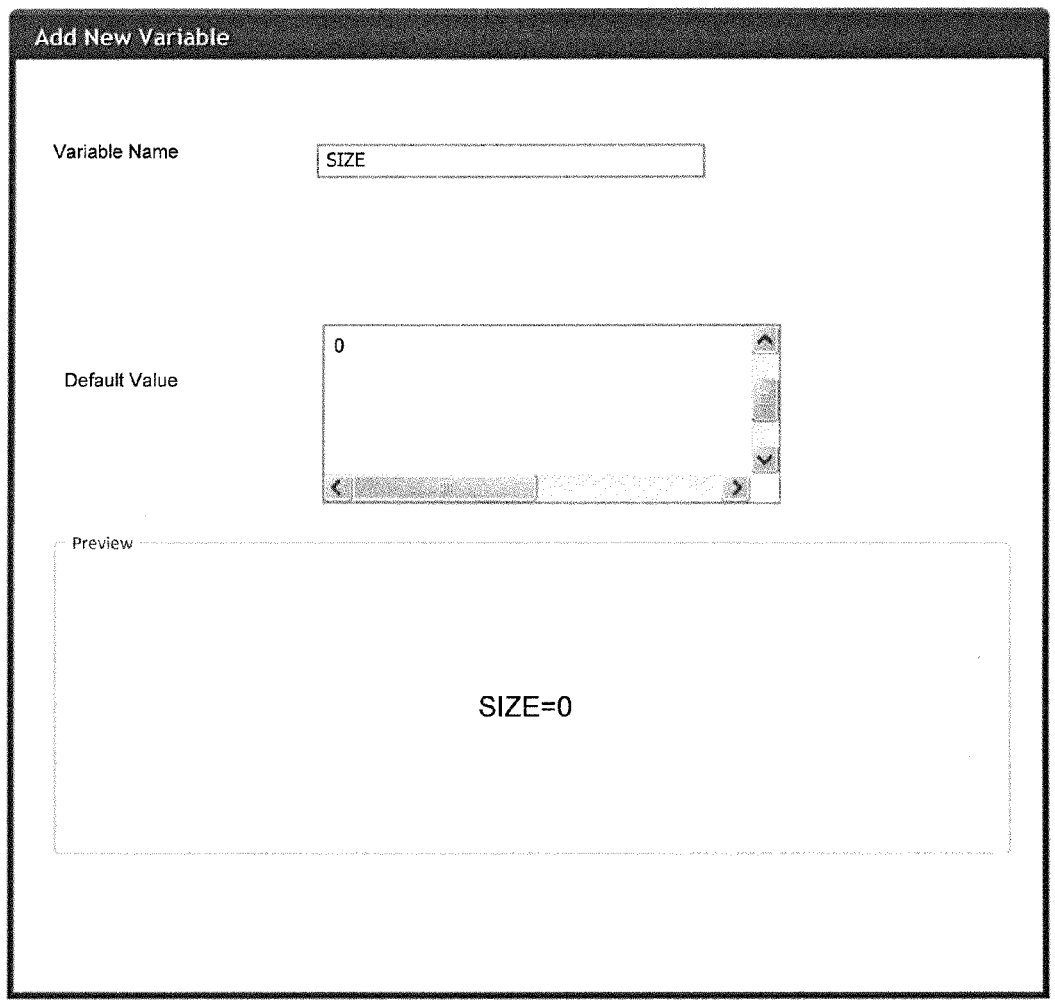

As shown in FIG. 46, the Add New Annotation user interface can define when the annotation is applied and the action to be taken (e.g., rule conditions) and a preview box to view the annotation being created. Upon activation of "Save Annotation," a new annotation is saved.

Annotations can comprise functions and associated variables. The Add New Function user interface shown in FIG. 47 can create functions. The Add New Variable user interface show in in FIG. 48 can create an associated variable.

Example 48

Exemplary Remediation Knowledge Base Design

Figure 49:
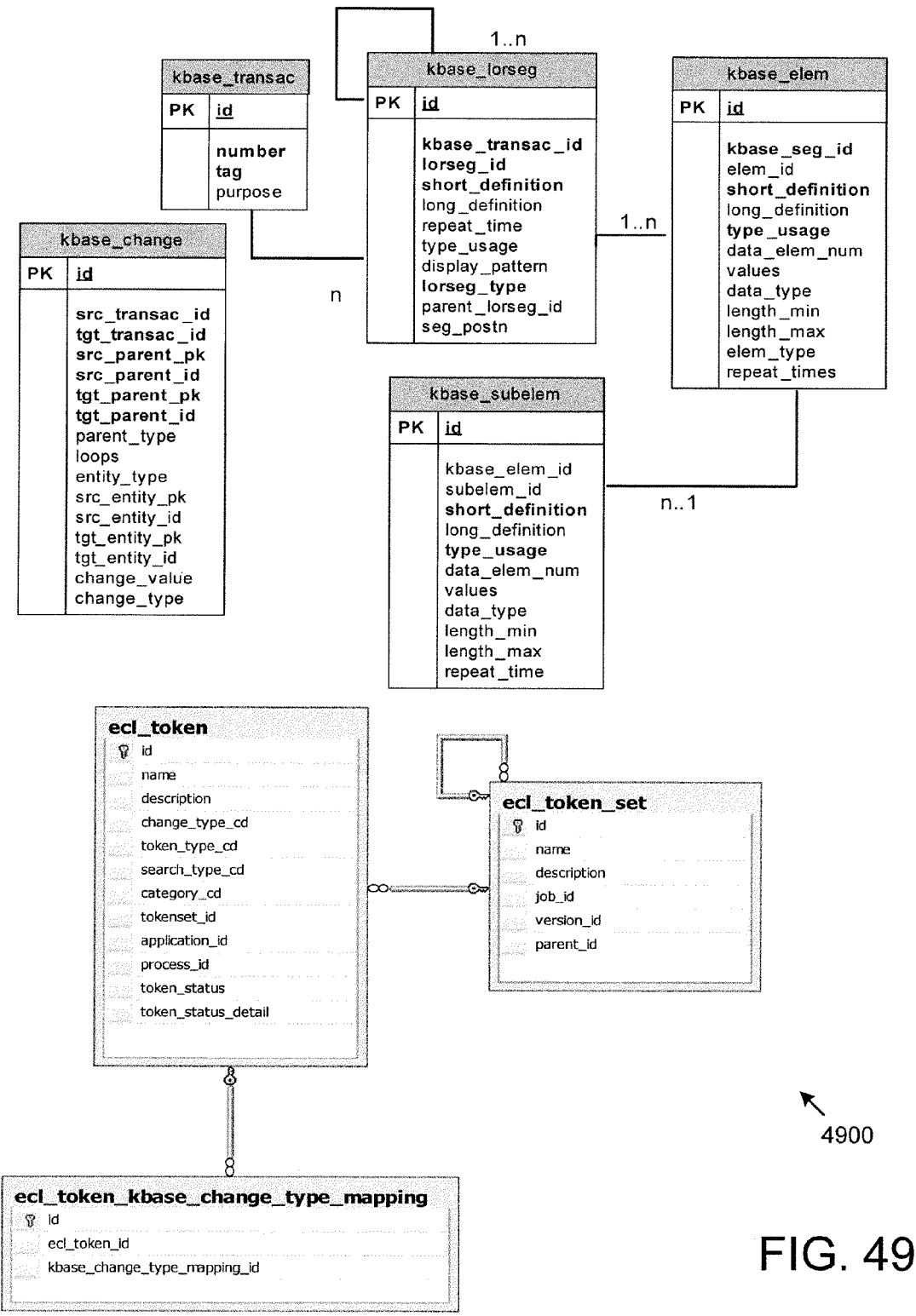
FIG. 49 is a block diagram showing an exemplary database design for a remediation knowledge base.

FIG. 49 is a block diagram showing an exemplary database design for a remediation knowledge base applied to a HIPAA 4010 to HIPAA 5010 remediation. A description of illustrated tables is as follows:

| Entity (Table) name | Entity (Table) description | Example |
|---|---|---|
| kbase_transac | Defines the business purpose and the properties of the HIPPA transaction | 270 (number), v4010(tag), Eligibility Enquiry (purpose) |
| kbase_lorseg | Defines the business details of the first layer of the transaction. This is also commonly called the loops or segments. | 2100B(short definition), Receiver Name(long definition), multiple(repeat time), mandatory(type_usage) and loop(lorseg_type) |

| Entity (Table) name | Entity (Table) description | Example |
|---|---|---|
| kbase_elem | Defines the business details of the second layer of the transaction. This is also commonly called the elements. | NM104(short definition), First Name(long definition), single(repeat time), optional(type_usage), characters(data_type), 1(length_min) and 90(length_max) |
| kbase_subelem | Defines the business details of the third layer of the transaction. This is also commonly called the sub-elements. | |
| kbase_change | Defines the changes identified at any business layer. The changes are between the two versions of the business transaction. The src_* columns contains the details for the previous version and the tgt_* columns contains the details for the new version. | NM104 has a maximum length change. |
| ecl_token_set | Defines the groups which contain the tokens. The groups are created for a particular code base analysis. | Elg_2000_set (name), eligibility search group(description) |
| ecl_token | Defines the search patterns to search for code base impacts. These code base impacts are the source points for the remediation. | *Str_N3* (name), Pattern to search impact points for the size based change occurring in the address information(description), size(change_type_cd), wildcard(search_type) |
| ecl_token_kbase_change_type_mapping | Defines the mapping between the tokens and the kbase tables. Useful to map the code analysis results to the particular kbase change. | |

Example 49

Exemplary Database Design

Figure 50:
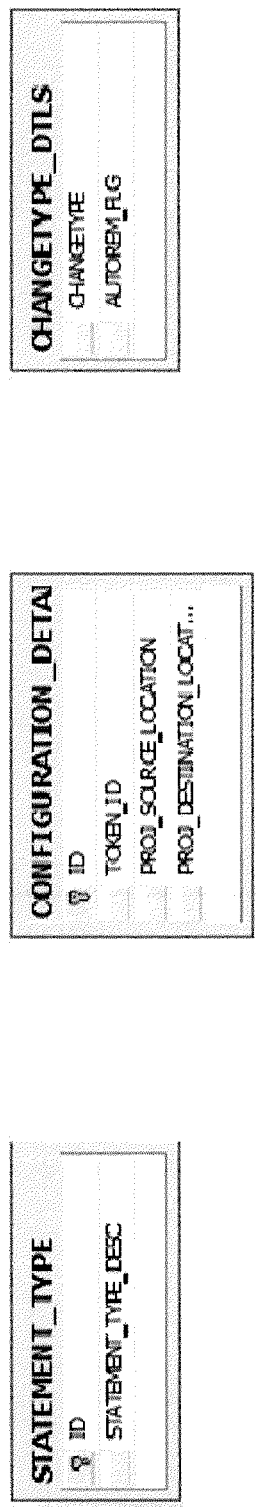
FIGS. 50, 51, and 52 are block diagrams showing an exemplary database design for a code remediation tool.
Figure 51:
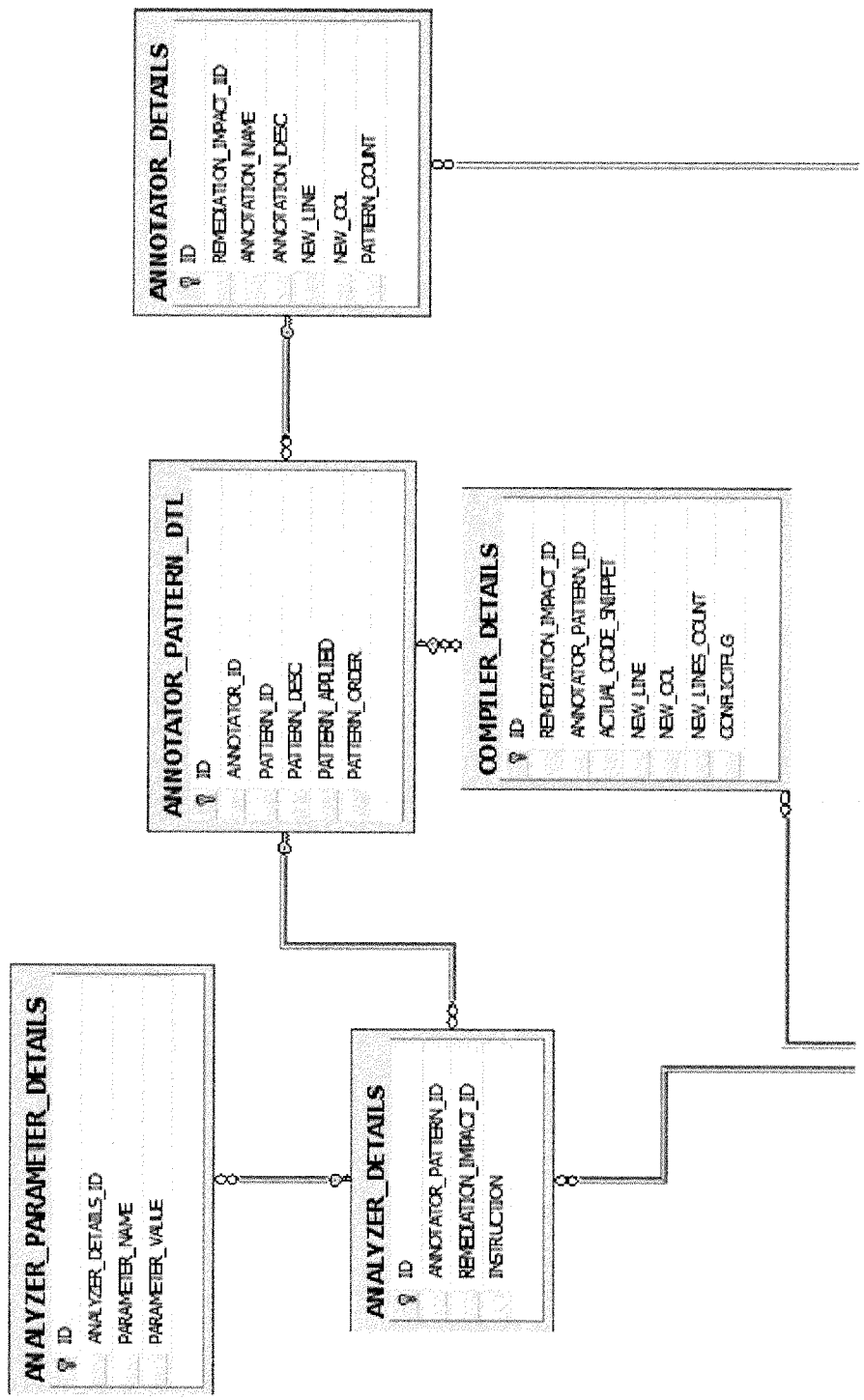
Figure 52:
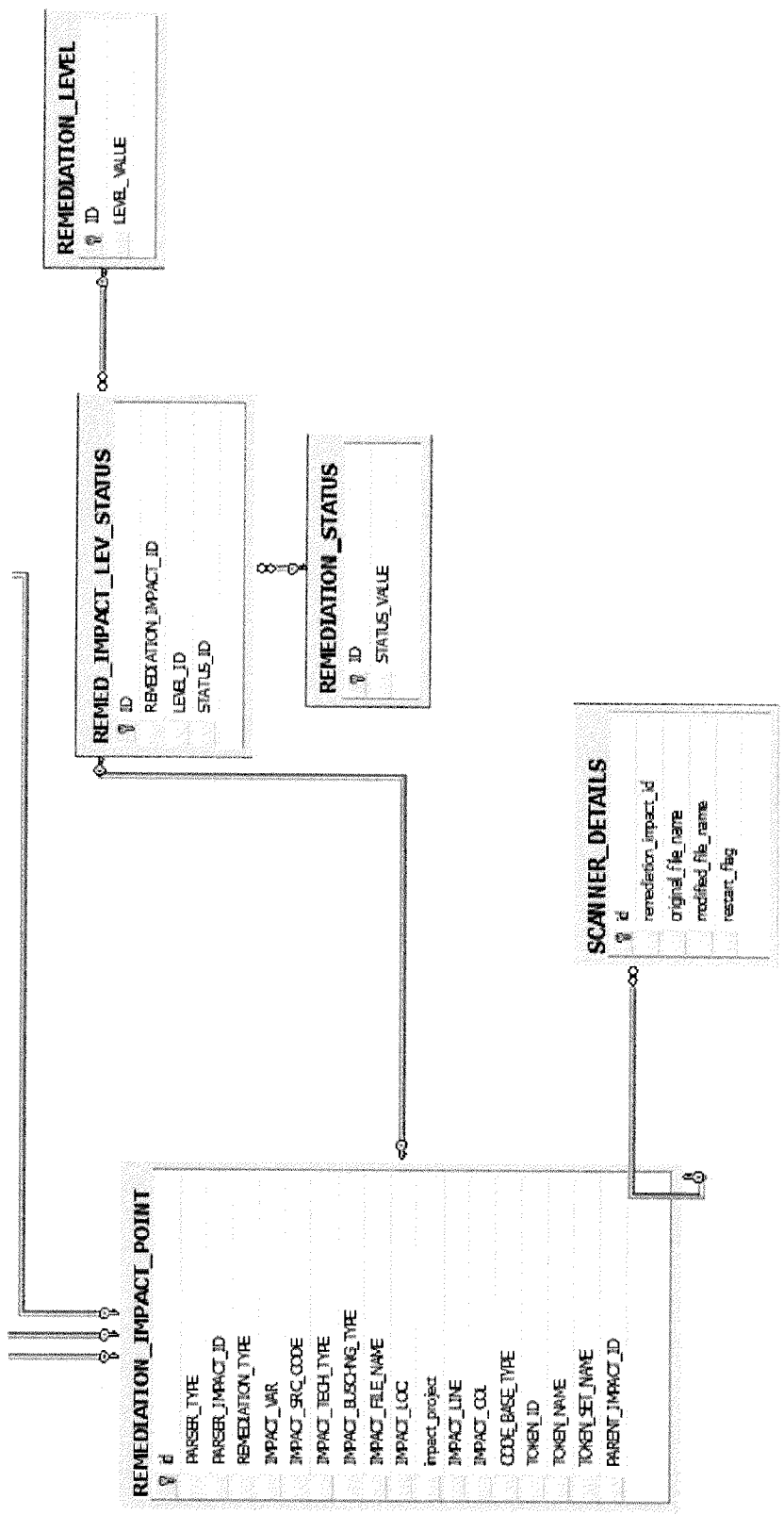

FIGS. 50-52 are block diagrams showing an exemplary database design for a code remediation tool. Such tables can store transactional data of the remediation process. Data results from stages of the remediation process for a token (e.g., scanner, annotator, analyzer, and translator) can be stored in the tables.

For example, in FIG. 51, the ANNOTATOR_DETAILS table can store the results of the annotation process. In FIG. 52, the SCANNER_DETAILS table can store the results of the scanning process.

The tables can thus store results for the different stages of the remediation process for the token that have been put for remediation.

Example 50

Exemplary Call Flows

The code remediation tool can be implemented according to any of a number of architectures and developed in any of a number of programming languages. A possible language for development is the Java programming language. Model view controller (MVC) techniques can be used.

The view can be implemented as the user interface, and the controller can be implemented as an orchestrator (e.g., an orchestrate impact analysis results function call). Calls can come in from a user interface layer (e.g., triggered by actions of a user), to the orchestrator (e.g., the controller). The orchestrator can make corresponding method calls on business services, which performs business logic. The business logic can then call the DAO layer which interacts with the database (e.g., knowledge base). The DAO layer can interact with the database to retrieve results of an impact analysis (e.g., impact points). When it returns back, the user can see the results (e.g., impact points) displayed. Other functions can be similarly implemented.

Example 51

Exemplary Token Search Patterns

In any of the examples herein, token search patterns can be specified by regular expressions. Exemplary token search patterns include the following:
ST_VERSION_ID01*
BPR-TRANS_HANDLG-CODE\d
BPR-ORIG-COMP[0-9]
PER-PAYER-COMM-NBR
REF-PAYEE-ID
LX-ASSNG-NB\w TS3FACLTYCD\d
REF-RECVR-ID
[a-zA-z]PER-PAYER-COM\d
CLP-CLM-STATUS-CD
CLM-IND
CLM-FILNG
PAYOR-CNTL-NBR
NM1-PATNM-ID
NM1-CORPT
APER-PAYER-COM Regular expressions supported can include the following:
\d=to allow any digit
\w=to allow A-Z,a-z,0-9
*=any preceding character zero or multiples
[ ]=match anything inside the brackets Example 52

Exemplary Computing Environment

The techniques and solutions described herein can be performed by software, hardware, or both of a computing environment, such as one or more computing devices. For example, computing devices include server computers, desktop computers, laptop computers, notebook computers, netbooks, tablet devices, mobile devices, and other types of computing devices.

Figure 53:
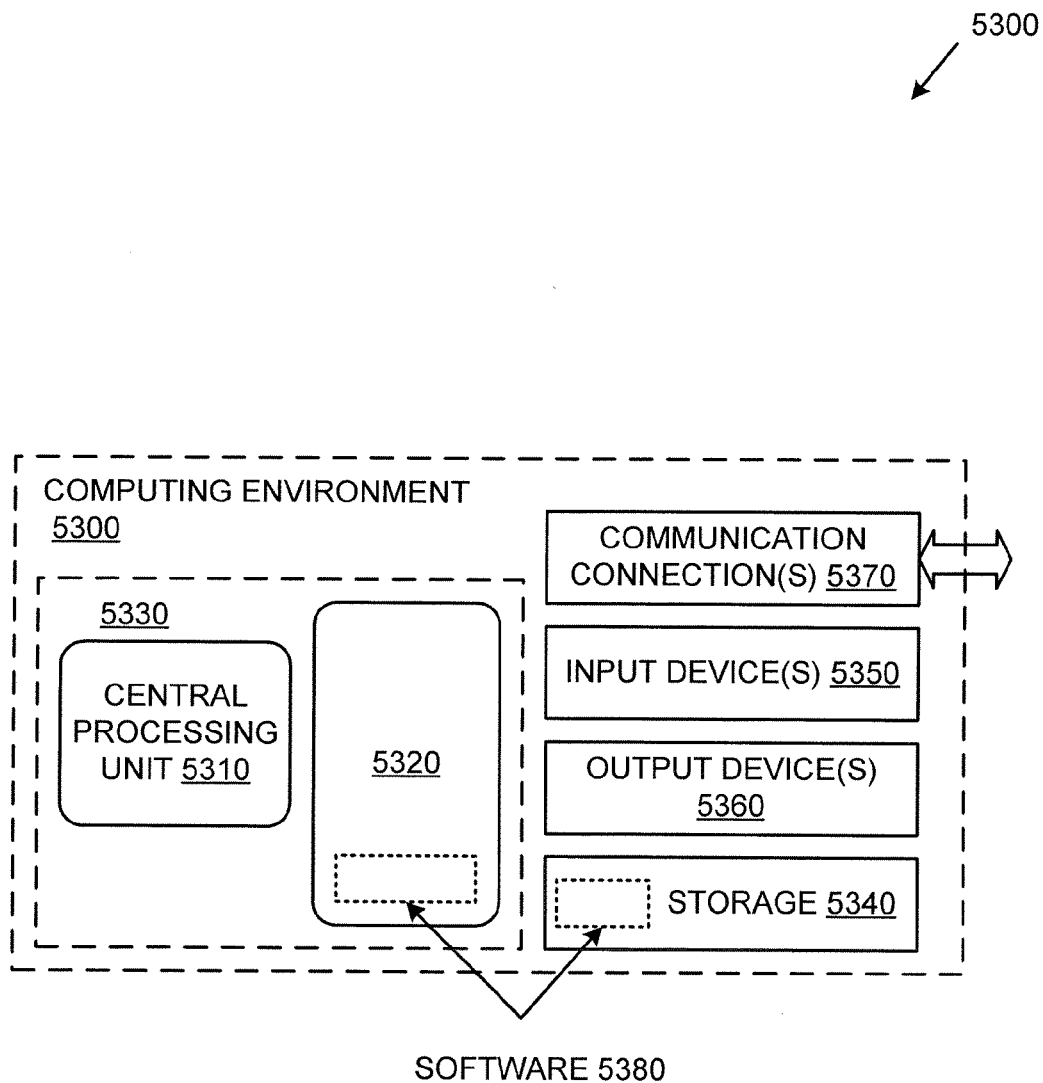
FIG. 53 is a block diagram of an exemplary computing environment suitable for implementing any of the technologies described herein.

FIG. 53 illustrates a generalized example of a suitable computing environment 5300 in which the described technologies can be implemented. The computing environment 5300 is not intended to suggest any limitation as to scope of use or functionality, as the technologies may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the code remediation described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 53, the computing environment 5300 includes at least one processing unit 5310 coupled to memory 5320. In FIG. 53, this basic configuration 5330 is included within a dashed line. The processing unit 5310 executes computer-executable instructions and may be a real or a virtual processor (e.g., ultimately executed on a real processor). In a multi-processing system, multiple processing units execute computer-executable instructions to increase processing power. The memory 5320 may be volatile memory (e.g., registers, cache, RAM), non-volatile memory (e.g., ROM, EEPROM, flash memory, etc.), or some combination of the two. The memory 5320 can store software 5380 implementing any of the technologies described herein.

A computing environment may have additional features. For example, the computing environment 5300 includes storage 5340, one or more input devices 5350, one or more output devices 5360, and one or more communication connections 5370. An interconnection mechanism (not shown) such as a bus, controller, or network interconnects the components of the computing environment 5300. Typically, operating system software (not shown) provides an operating environment for other software executing in the computing environment 5300, and coordinates activities of the components of the computing environment 5300.

The storage 5340 may be removable or non-removable, and includes magnetic disks, magnetic tapes or cassettes, optical media, CD-ROMs, CD-RWs, DVDs, or any other computer-readable media which can be used to store information and which can be accessed within the computing environment 5300. The storage 5340 can store software 5380 containing instructions for any of the technologies described herein.

The input device(s) 5350 may be a touch input device such as a keyboard, mouse, pen, or trackball, a voice input device, a scanning device, or another device that provides input to the computing environment 5300. For audio, the input device(s) 5350 may be a sound card or similar device that accepts audio input in analog or digital form, or a CD-ROM reader that provides audio samples to the computing environment. The output device(s) 5360 may be a display, printer, speaker, CD-writer, or another device that provides output from the computing environment 5300.

The communication connection(s) 5370 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Storing in Non-Transitory Computer-Readable Media

Any of the computer-readable media herein can be non-transitory (e.g., memory, hard disk or other magnetic media, optical media, CD-ROM, CD-RW, DVD, or the like).

Methods in Computer-Readable Storage Devices

Any of the methods described herein can be implemented by computer-executable instructions stored in one or more computer-readable storage devices (e.g., memory, hard disk or other magnetic media, optical media, CD-ROM, CD-RW, DVD, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of these claims.

I claim:

1. A method implemented at least in part by a computing device, the method comprising:
   (a) receiving source code to be remediated in light of a regulation set affecting logic of the source code, wherein the source code is of a programming language;
   (b) generating a plurality of language-independent annotations for the source code to be remediated, wherein the language-independent annotations are of a format having a grammar that forms an executable language and wherein the executable language comprises at least one change function and one or more parameters for the change function, wherein the annotations comprise:
      an indication of a token representing a constant or a variable name appearing in the source code;
      parameters comprising an indication of a change type associated with the token, an indication of a statement type associated with the token, and an indication of an impact location associated with the token; and
      an indication of a new value associated with the token;
   (c) based on the language-independent annotations, outputting a language-independent analysis tree comprising breaking down the annotations into a set of patterns and sequentially arranging the patterns for translation, wherein the analysis tree comprises nodes specifying the indication of the token and the parameters; and
   (d) generating a remediated version of the source code, wherein generating the remediated version comprises translating the annotations, wherein the translating comprises consuming the parameters of the analysis tree, and applying the parameters from the annotations to the change function indicated in the annotations, wherein the change function generates source code comprising the new value associated with the token complying with the regulation set in the programming language of the source code and outputting lines of remediated source code in the programming language of the source code according to the plurality of language-independent annotations, wherein the remediated version complies with the regulation set.

2. The method of claim 1 further comprising:
inserting the plurality of language-independent annotations into the source code to be remediated as comments according to syntax of the programming language.

3. The method of claim 1 wherein generating the plurality of language-independent annotations comprises generating a language-independent annotation specifying a language-independent change function name.

4. The method of claim 3 wherein:
generating the remediated version of the source code comprises generating, with a change function indicated by the language-independent change function name, source code according to syntax of the programming language.

5. The method of claim 1 further comprising:
in a remediation tool, detecting code that cannot be remediated by logic of the remediation tool;
responsive to detecting code that cannot be remediated, raising an exception for an impact point at which the code that cannot be remediated appears; and
displaying an indication of the exception.

6. The method of claim 1, wherein the indication of the change function comprises a language-independent change function name, and the method further comprises:
deleting some lines of code in a conditional statement; and
modifying remaining lines to form a syntactically correct conditional statement.

7. The method of claim 1, further comprising:
in a user interface, displaying a representation of a candidate remediation to the source code;
receiving, via the user interface, an indication of whether the candidate remediation is to be processed; and
responsive to receiving an indication that the candidate remediation is not to be processed, omitting to further process the candidate remediation for remediation.

8. The method of claim 1, further comprising:
in a user interface, displaying a representation of a candidate remediation to the source code as proposed remediated source code;
receiving, via the user interface, modification of the proposed remediated source code; and
responsive to receiving the modification, remediating the source code according to the modification.

9. The method of claim 1 further comprising:
identifying, via a token search pattern, an impact point at a location in the source code at which a program variable or constant affected by the regulation set appears in the source code; and
wherein generating the plurality of language-independent annotations comprises generating a language-independent annotation for the impact point.

10. The method of claim 9, further comprising:
in a user interface, displaying a representation of the impact point; and
receiving, via the user interface, an indication of whether the impact point is to be processed.

11. The method of claim 1 further comprising:
scanning the source code to be remediated, wherein the scanning identifies one or more portions to be modified based on token search patterns matching variables or constants in the source code to be remediated.

12. The method of claim 1 wherein:
the regulation set specifies a field size associated with International Classification of Diseases, 10th Revision, Clinical Modification; and at least one of the plurality of language-independent annotations specifies the field size.

13. One or more non-transitory computer-readable storage devices comprising computer-executable instructions that when executed cause a computer to perform a method comprising:
(a) receiving source code to be remediated in light of a regulation set affecting logic of the source code, wherein the source code is of a programming language;
(b) generating a plurality of language-independent annotations for the source code to be remediated, wherein the language-independent annotations are of a format having a grammar that forms an executable language and wherein the executable language comprises at least one change function and one or more parameters for the change function, wherein the annotations comprise:
an indication of a token representing a constant or a variable name appearing in the source code;
parameters comprising an indication of a change type associated with the token, an indication of a statement type associated with the token, and an indication of an impact location associated with the token; and
an indication of a new value associated with the token;
(c) based on the language-independent annotations, outputting a language-independent analysis tree comprising breaking down the annotations into a set of patterns and sequentially arranging the patterns for translation, wherein the analysis tree comprises nodes specifying the indication of the token and the parameters; and
(d) generating a remediated version of the source code, wherein generating the remediated version comprises translating the annotations wherein the translating comprises consuming the parameters of the analysis tree, for applying the parameters from the annotations to the change function indicated in the annotations, wherein the change function generates source code comprising the new value associated with the token complying with the regulation set in the programming language of the source code and outputting lines of remediated source code in the programming language of the source code according to the plurality of language-independent annotations, wherein the remediated version complies with the regulation set.

14. A system comprising:
one or more processors coupled to memory;
an annotation engine configured to generate programming-language-independent annotations based on source code to be remediated of a programming language, wherein the programming-language-independent annotations are of a format having a grammar that forms an executable language and wherein the executable language comprises at least one change function and one or more parameters for the change function, wherein the annotations comprise:
an indication of a token representing a constant or a variable name appearing in the source code;
parameters comprising an indication of a change type associated with the token, an indication of a statement type associated with the token, and an indication of an impact location associated with the token; and
an indication of a new value associated with the token;
a language-independent analysis engine configured to generate a language-independent pre-translation analysis tree data structure based on the programming-language-independent annotations, wherein the language-independent analysis tree comprises breaking down the annotations into a set of patterns and sequentially arranging the patterns for translation, and wherein the analysis tree comprises nodes specifying the indication of the token and the parameters; and
a translation engine configured to generate remediated code in the programming language according to the programming-language-independent annotations as represented by the pre-translation analysis tree data structure, comprising consuming the parameters of the analysis tree data structure and applying the one or more parameters from the annotations to the change function indicated in the annotations, wherein the change function generates source code comprising the new value associated with the token complying with the regulation set in the programming language of the source code.

15. The system of claim 14, further comprising:
a user interface orchestrator configured to present detected impact points of the source code to be remediated in a list comprising user interface elements for indicating respective of the detected impact points of the source code as to be omitted from further remediation processing, wherein further remediation processing is halted according to the user interface elements.

16. The system of claim 14 further comprising a knowledge base comprising remediation intelligence.

17. The system of claim 14 further comprising a code analysis results repository comprising tokens representing sets of references to impact points within the source code to be remediated.

18. One or more non-transitory computer-readable storage media comprising computer-executable instructions causing a computer to perform a method comprising:
(a) receiving source code implementing electronic claim processing logic according to an old version of healthcare regulations, wherein the source code is to be remediated to comply with claim processing in light of a new version of healthcare regulations, and the source code is of a programming language out of a plurality of possible programming languages;
(b) searching the source code for one or more instances of a token search pattern indicative of a variable name or constant name affected by claim processing migration to the new version of healthcare regulations;
(c) responsive to finding the one or more instances of the token search pattern, generating an impact point record, wherein the impact point record indicates the variable name or constant name affected by claim processing migration to the new version of healthcare regulations and a location in the source code at which the variable name or constant name occurs;
(d) generating a language-independent annotation for the source code, wherein the language-independent annotation is of a format having a grammar that forms an executable language, wherein the annotation comprises:
a token that indicates the variable name or constant name affected by claim processing migration to the new version of healthcare regulations, the location in the source code at which the variable name or constant name occurs, a change function, and one or more parameters associated with the change function, wherein the parameters associated with the change function comprise an indication of a change type associated with the token, an indication of a statement type associated with the token, and an indication of an impact location associated with the token;
(e) based on the language-independent annotation, outputting a language-independent analysis tree comprising breaking down the annotations into a set of patterns and sequentially arranging the patterns for translation, wherein the analysis tree comprises nodes specifying the indication of the token and the parameters; and (f) generating a remediated version of the source code, wherein generating the remediated version comprises translating the annotation, wherein the translating comprises consuming the parameters of the analysis tree and applying the one or more parameters to the change function, wherein the change function generates source code in the programming language based on the source code to be remediated comprising the new value associated with the token and complying with claim processing in light of the new version of healthcare regulations according to the language-independent annotation.

* * * * *